United States Patent
Kuppuswamy et al.

(12) 
(10) Patent No.: US 11,369,949 B2
(45) Date of Patent: *Jun. 28, 2022

(54) METALLOCENES WITH SI—SI BRIDGES

(71) Applicant: ExxonMobil Chemical Patents Inc., Baytown, TX (US)

(72) Inventors: Subramaniam Kuppuswamy, Mont Belvieu, TX (US); Matthew W. Holtcamp, Huffman, TX (US); Matthew S. Bedoya, Humble, TX (US); Laughlin G. McCullough, League City, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 214 days.

This patent is subject to a terminal disclaimer.

(21) Appl. No.: 16/425,230

(22) Filed: May 29, 2019

(65) Prior Publication Data

US 2019/0366315 A1 Dec. 5, 2019

Related U.S. Application Data

(60) Provisional application No. 62/680,358, filed on Jun. 4, 2018.

(51) Int. Cl.
*C07F 17/00* (2006.01)
*C08F 4/64* (2006.01)
(Continued)

(52) U.S. Cl.
CPC ....... *B01J 31/1608* (2013.01); *B01J 31/2295* (2013.01); *C08F 4/65912* (2013.01);
(Continued)

(58) Field of Classification Search
CPC .......... C07F 7/00; C07F 7/02; C08F 4/65927; C08F 4/659; C08F 4/65908; C08F 4/65916; C08F 210/16; C08F 2500/38
See application file for complete search history.

(56) References Cited

U.S. PATENT DOCUMENTS 5,017,714 A * 5/1991 Welborn, Jr. ........... C08F 10/00 556/11
5,120,867 A * 6/1992 Welborn, Jr. ........... C08F 10/00 556/53

(Continued)

FOREIGN PATENT DOCUMENTS

CN 1289784 A * 4/2001 ............. C07F 17/00
EP 0 344 887 12/1989
(Continued)

OTHER PUBLICATIONS

Schafer, Andre et al. (2017) "Synthesis and Structure of [2]Tetrelocenophanes," *Eur. Jrnl. Inorg. Chem.*, pp. 35-38.
(Continued)

*Primary Examiner* — Rip A Lee

(57) ABSTRACT

The present disclosure provides bridged metallocene catalyst compounds comprising —Si—Si— bridges, catalyst systems comprising such compounds, and uses thereof. Catalyst compounds of the present disclosure can be hafnium-containing compounds having one or more cyclopentadiene ligand(s) substituted with one or more silyl neopentyl groups and linked with an Si—Si-containing bridge. In another class of embodiments, the present disclosure is directed to polymerization processes to produce polyolefin polymers from catalyst systems comprising one or more olefin polymerization catalysts, at least one activator, and an optional support.

47 Claims, 4 Drawing Sheets

(51) Int. Cl.
    *C08F 4/659*     (2006.01)
    *C08F 4/76*     (2006.01)
    *B01J 31/16*     (2006.01)
    *B01J 31/22*     (2006.01)
    *C08F 210/16*     (2006.01)
    *C08F 4/6592*     (2006.01)

(52) U.S. Cl.
    CPC ...... *C08F 4/65916* (2013.01); *C08F 4/65927* (2013.01); *C08F 210/16* (2013.01); *B01J 2531/49* (2013.01); *B01J 2540/62* (2013.01)

(56) References Cited

U.S. PATENT DOCUMENTS

| | | | |
|---|---|---|---|
| 5,153,157 A | 10/1992 | Hlatky et al. | |
| 5,453,410 A | 9/1995 | Holthammer et al. | |
| 5,700,896 A | 12/1997 | Dolle et al. | |
| 5,739,366 A | 4/1998 | Imuta et al. | |
| 5,767,033 A | 6/1998 | Imuta et al. | |
| 6,124,413 A | 9/2000 | Banzi et al. | |
| 6,211,105 B1 | 4/2001 | Holtcamp | |
| 6,391,991 B1 | 5/2002 | Resconi et al. | |
| 6,984,703 B1 | 1/2006 | Biagini et al. | |
| 7,385,015 B2 | 6/2008 | Holtcamp | |
| 8,609,793 B2* | 12/2013 | Buck | C08F 210/16 526/943 |
| 8,637,616 B2 | 1/2014 | Buck et al. | |
| 8,658,556 B2 | 2/2014 | Stewart | |
| 9,040,643 B2 | 5/2015 | Buck et al. | |
| 9,657,122 B2 | 5/2017 | Tse et al. | |
| 10,730,038 B2* | 8/2020 | Holtcamp | C07F 17/00 |
| 10,882,925 B2* | 1/2021 | Yang | C07F 17/00 |
| 10,889,663 B2* | 1/2021 | Yang | C08F 210/14 |
| 10,913,808 B2* | 2/2021 | Holtcamp | C08F 210/16 |
| 2003/0104928 A1 | 6/2003 | Holtcamp | 502/103 |
| 2006/0142147 A1 | 6/2006 | Royo et al. | 502/117 |
| 2018/0237554 A1* | 8/2018 | Holtcamp | C08F 2/34 |
| 2018/0237558 A1* | 8/2018 | McCullough | C08F 10/02 |
| 2018/0237559 A1* | 8/2018 | Kuppuswamy | C08F 10/02 |
| 2019/0040167 A1* | 2/2019 | Holtcamp | C08F 210/16 |
| 2019/0040168 A1 | 2/2019 | Hoitcamp et al. | |
| 2019/0144571 A1* | 5/2019 | Yang | C07F 17/00 526/129 |
| 2019/0263953 A1* | 8/2019 | Li | C08J 5/18 |
| 2019/0367649 A1* | 12/2019 | Holtcamp | C08F 210/16 |

FOREIGN PATENT DOCUMENTS

| | | | |
|---|---|---|---|
| EP | 0573120 | 11/1998 | |
| WO | 1994/007928 | 4/1994 | |
| WO | 1995/014044 | 5/1995 | |
| WO | 2013/151863 | 10/2013 | |
| WO | WO2013-0151863 | 10/2013 | ............ C08F 210/16 |
| WO | 2018/067259 | 4/2018 | |

OTHER PUBLICATIONS

Stadelhofer et al. (1975) Darstellung und Eigenschaften von Alkylmetallcyclopentadienderivaten des Aluminiums, Galiiums und Indiums, Journal of Organometallic Chemistry, v.84(1) pp. C1-C4.

Girolami, Gregory S. (1994) "A Simple "Back of the Envelope" Method for Estimating the Densities and Molecular Volumes of Liquids and Solids," Journal of Chemical Education, v.71 (11), pp. 962-964.

\* cited by examiner

METALLOCENES WITH SI—SI BRIDGES

PRIORITY CLAIM

This application claims priority to and the benefit of U.S. Ser. No. 62/680,358, filed Jun. 4, 2018 and is incorporated by reference in its entirety.

FIELD OF THE INVENTION

The present disclosure provides bridged metallocene catalyst compounds comprising —Si—Si— bridges, catalyst systems comprising such compounds, and uses thereof.

BACKGROUND OF THE INVENTION

Polyolefins are widely used commercially because of their robust physical properties. For example, various types of polyethylenes, including high density, low density, and linear low density polyethylenes, are some of the most commercially useful. Polyolefins are typically prepared with a catalyst that polymerizes olefin monomers. Therefore, there is interest in finding new catalysts and catalyst systems that provide polymers having improved properties.

Low density polyethylene is generally prepared at high pressure using free radical initiators, or in gas phase processes using Ziegler-Natta or vanadium catalysts. Low density polyethylene typically has a density in the range of 0.916 g/cm$^3$ to 0.940 g/cm$^3$. Typical low density polyethylene produced using free radical initiators is referred to in the industry as "LDPE". LDPE is also referred to as "branched" or "heterogeneously branched" polyethylene because of the relatively large number of long chain branches extending from the main polymer backbone. Polyethylene in the same density range, e.g., 0.916 g/cm$^3$ to 0.940 g/cm$^3$, which is linear and does not contain long chain branching, is referred to as "linear low density polyethylene" ("LLDPE") and is typically produced by conventional Ziegler-Natta catalysts or with metallocene catalysts. "Linear" means that the polyethylene has few, if any, long chain branches, typically referred to as a g'$_{vis}$ value of 0.97 or above, such as 0.98 or above. Polyethylenes having still greater density are the high density polyethylenes ("HDPEs"), e.g., polyethylenes having densities greater than 0.940 g/cm$^3$, and are generally prepared with Ziegler-Natta catalysts or chrome catalysts. Very low density polyethylenes ("VLDPEs") can be produced by a number of different processes yielding polyethylenes having a density less than 0.916 g/cm$^3$, typically 0.890 g/cm$^3$ to 0.915 g/cm$^3$ or 0.900 g/cm$^3$ to 0.915 g/cm$^3$.

Polyolefins, such as polyethylene, which have high molecular weight, generally have desirable mechanical properties over their lower molecular weight counterparts. However, high molecular weight polyolefins can be difficult to process and can be costly to produce. Polyolefin compositions having a bimodal molecular weight distribution are desirable because they can combine the advantageous mechanical properties of a high molecular weight fraction of the composition with the improved processing properties of a low molecular weight fraction of the composition. Unless otherwise indicated, as used herein, "high molecular weight" is defined as a number average molecular weight (Mn) value of 20,000 g/mol or more. "Low molecular weight" is defined as an Mn value of less than 20,000 g/mol.

Polyolefins, such as polyethylene, typically have a comonomer, such as hexene, incorporated into the polyethylene backbone. These copolymers provide varying physical properties compared to polyethylene alone and are typically produced in a low pressure reactor, utilizing, for example, solution, slurry, or gas phase polymerization processes. Polymerization may take place in the presence of catalyst systems such as those using a Ziegler-Natta catalyst, a chromium based catalyst, or a metallocene catalyst. The comonomer content of a polyolefin (e.g., wt % of comonomer incorporated into a polyolefin backbone) influences the properties of the polyolefin (and composition of the copolymers) and is influenced by the polymerization catalyst. Unless otherwise indicated, as used herein, "low comonomer content" is defined as a polyolefin having less than 7 wt % of comonomer based upon the total weight of the polyolefin. As used herein, "high comonomer content" is defined as a polyolefin having greater than or equal to 7 wt % of comonomer based upon the total weight of the polyolefin.

A copolymer composition, such as a resin, has a composition distribution, which refers to the distribution of comonomer that forms short chain branches along the copolymer backbone. When the amount of short chain branches varies among the copolymer molecules, the composition is said to have a "broad" composition distribution. When the amount of comonomer per 1,000 carbons is similar among the copolymer molecules of different chain lengths, the composition distribution is said to be "narrow". Like comonomer content, the composition distribution influences the properties of a copolymer composition, for example, stiffness, toughness, environmental stress crack resistance, and heat sealing, among other properties. The composition distribution of a polyolefin composition may be readily measured by, for example, Temperature Rising Elution Fractionation (TREF) or Crystallization Analysis Fractionation (CRYSTAF).

For some purposes, polyolefin compositions would have broad composition distributions that include a first polyolefin component having low molecular weight and low comonomer content while a second polyolefin component has a high molecular weight and high comonomer content. Compositions having this broad orthogonal composition distribution (BOCD) in which the comonomer is incorporated predominantly in the high molecular weight chains can provide improved physical properties, for example toughness properties and environmental stress crack resistance (ESCR).

Also, like comonomer content, a composition distribution of a copolymer composition is influenced by the identity of the catalyst used to form the polyolefins of the composition. Ziegler-Natta catalysts and chromium based catalysts generally produce compositions with broad composition distributions, whereas metallocene catalysts typically produce compositions with narrow composition distributions. Nonetheless, polyolefin compositions formed by catalysts capable of forming high molecular weight polyolefins typically also have a broad molecular weight distribution (MWD), as indicated by high polydispersity indices, and/or the polyolefins are of such high molecular weight (e.g., Mw of 1,500,000) as to have processing difficulties due to hardness. Furthermore, catalysts capable of forming high molecular weight polyolefins typically have low productivity (e.g., amount of desirable polymer produced per a period of time).

BOCD behavior in a polymer composition has been associated with a good balance of mechanical and optical properties and has been an important goal in the development of new polymer products. For example, LLDPE film applications and products strive for a good balance of stiffness, toughness, optical properties (e.g., haze and gloss) and processability. For some LLDPE film applications, sealing performance is also important. Sealing performance is affected mainly by density, it improves as density gets lower, but density has the opposite effect on stiffness. Therefore, to achieve a balanced performance, there is usually a trade-off between stiffness and sealing performance. Thus, to improve sealing performance while maintaining good stiffness remains a challenge. Past efforts have shown that namely molecular weight distribution and comonomer distribution interdependence (MWD×CD) has a strong effect on sealing performance, with narrow CD resin by metallocene catalyst outperforming broad CD resin by conventional catalysts.

There is a need for catalysts having high productivity and capable of forming polyolefins, for example, with high molecular weight, high comonomer content, narrow polydispersity indices, and broad orthogonal composition distribution.

SUMMARY OF THE INVENTION

The present disclosure provides catalyst compounds represented by Formula (I):

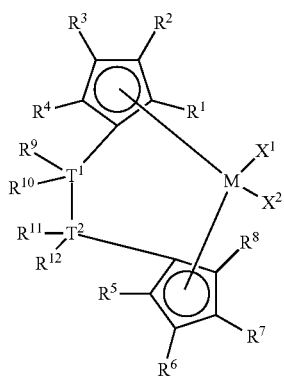

wherein:
M is a group 4 metal;
each of $R^1$, $R^2$, $R^3$, and $R^4$ is independently hydrogen, alkoxide, $C_1$ to $C_{40}$ substituted or unsubstituted hydrocarbyl, or —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl; wherein at least one of $R^1$, $R^2$, $R^3$, and $R^4$ is independently hydrogen, alkoxide, $C_1$ to $C_{40}$ substituted or unsubstituted hydrocarbyl, or —$R^{13}$—$SiR'_3$ or —$R^{13}$—$CR'_3$ where $R^{13}$ is $C_1$ to $C_4$ hydrocarbyl, and each R' is independently H or $C_1$ to $C_{20}$ substituted or unsubstituted hydrocarbyl and at least one R' is $C_1$ to $C_{20}$ substituted or unsubstituted hydrocarbyl;
each of $R^5$, $R^6$, $R^7$, and $R^8$ is independently hydrogen, alkoxide, $C_1$ to $C_{40}$ substituted or unsubstituted hydrocarbyl, —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl, or two or more of $R^5$, $R^6$, $R^7$, and $R^8$ form a substituted or unsubstituted, saturated, partially unsaturated or aromatic, cyclic or polycyclic substituent ring; wherein at least one of $R^5$, $R^6$, $R^7$, and $R^8$ is independently hydrogen, alkoxide, $C_1$ to $C_{40}$ substituted or unsubstituted hydrocarbyl, or —$R^{13}$—$SiR'_3$ or —$R^{13}$—$CR'_3$ where $R^{13}$ is $C_1$ to $C_4$ hydrocarbyl, and each R' is independently H or $C_1$ to $C_{20}$ substituted or unsubstituted hydrocarbyl and at least one R' is $C_1$ to $C_{20}$ substituted or unsubstituted hydrocarbyl; wherein at least one of $R^1$, $R^2$, $R^3$, $R^4$, $R^5$, $R^6$, $R^7$, and $R^8$ is, —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl;
each of $X^1$ and $X^2$ is independently a univalent anionic ligand, a diene ligand, an alkylidene ligand, or $X^1$ and $X^2$ are joined to form a metallocyclic ring;
each of $T^1$ and $T^2$ are independently Si or Ge;
each of $R^9$, $R^{10}$, $R^1$, and $R^{12}$ is independently hydrogen or a $C_1$-$C_{20}$ containing hydrocarbyl, substituted hydrocarbyl, halocarbyl, substituted halocarbyl, silylcarbyl, germylcarbyl, or $R^9$ and $R^{10}$ join to form a substituted or unsubstituted, saturated, partially unsaturated or aromatic, cyclic or polycyclic substituent, or $R^{11}$ and $R^{12}$ join to form a substituted or unsubstituted, saturated, partially unsaturated or aromatic, cyclic or polycyclic substituent.

In yet another embodiment, the present disclosure provides a catalyst system comprising an activator and a catalyst of the present disclosure.

In yet another embodiment, the present disclosure provides a catalyst system comprising an activator, a catalyst support, and a catalyst of the present disclosure.

In still another embodiment, the present disclosure provides a polymerization process comprising a) contacting one or more olefin monomers with a catalyst system comprising: i) an activator and ii) a catalyst of the present disclosure.

In still another embodiment, the present disclosure provides a polyolefin formed by a catalyst system and or method of the present disclosure.

DETAILED DESCRIPTION

Figure 1:
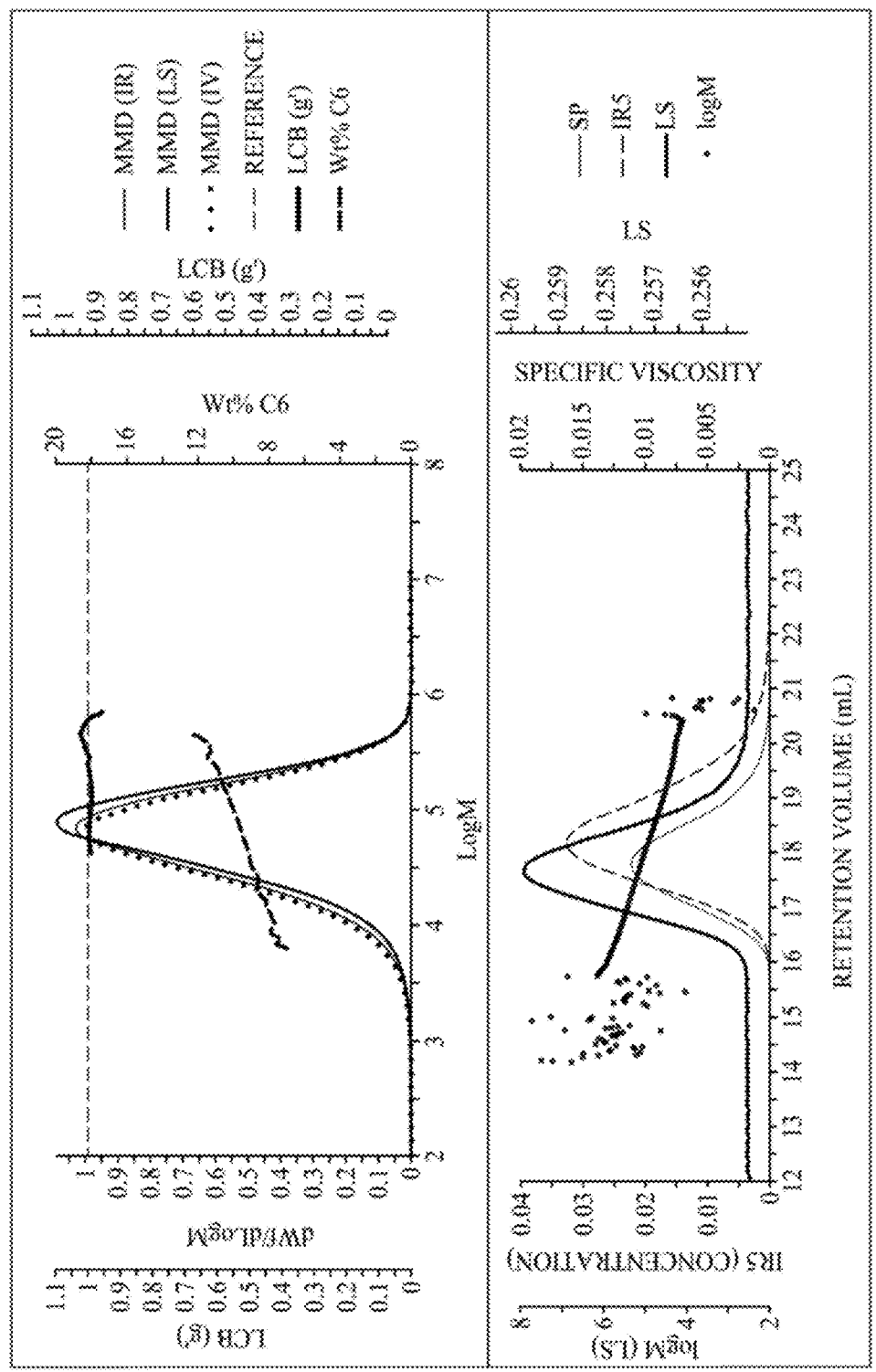
FIG. 1 is a gel permeation chromatography spectrum of the ethylene hexene copolymer formed by a catalyst system of the present disclosure, according to one embodiment.

The present disclosure provides catalyst compounds comprising —Si—Si— bridges, catalyst systems comprising such, and uses thereof. In at least one embodiment, the present disclosure is directed to metallocene compounds, metallocene-based-catalyst systems, and their use in polymerization processes to produce polyolefin polymers, such as polyethylene polymers and polypropylene polymers. Catalyst compounds of the present disclosure can be hafnium-containing compounds having one or more cyclopentadiene ligand(s) substituted with one or more silyl neopentyl group and linked with an Si—Si-containing bridge. In another class of embodiments, the present disclosure is directed to polymerization processes to produce polyolefin polymers from catalyst systems comprising one or more olefin polymerization catalysts, at least one activator, and an optional support.

For example, the present disclosure is directed to a polymerization process to produce a polyethylene polymer, the process comprising contacting a catalyst system comprising one or more metallocene catalysts, at least one activator, and at least one support, with ethylene and one or more $C_3$-$C_{10}$ alpha-olefin comonomers under polymerization conditions.

Catalysts, catalyst systems, and processes of the present disclosure can provide polyolefins at high productivity values (e.g., 18,000 gP/gCat/hour or greater), high Mw (e.g., 87,000 or greater), Mn values of 28,000 or greater, narrow PDI (e.g., about 3), high Mz values (e.g., 200,000 or greater). Catalysts, catalyst systems, and processes of the present disclosure can provide polymers having a high comonomer content (e.g., 7 wt % or greater), a g'vis value of 0.97 or greater, and a broad orthogonal composition distribution.

For the purposes of the present disclosure, the numbering scheme for the Periodic Table Groups is used as described in Chemical and Engineering News, 63(5), pg. 27 (1985). Therefore, a "group 4 metal" is an element from group 4 of the Periodic Table, e.g., Hf, Ti, or Zr.

The specification describes transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which, without being bound by theory, is believed to create a cation as a result of the removal of an anionic group, often referred to as a leaving group, from the transition metal.

As used herein, "olefin polymerization catalyst(s)" refers to any catalyst, typically an organometallic complex or compound that is capable of coordination polymerization addition where successive monomers are added in a monomer chain at the organometallic active center.

The terms "substituent," "radical," "group," and "moiety" may be used interchangeably.

As used herein, and unless otherwise specified, the term "$C_n$" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$ hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

"BOCD" refers to a Broad Orthogonal Composition Distribution in which the comonomer of a copolymer is incorporated predominantly in the high molecular weight chains or species of a polyolefin polymer or composition. The distribution of the short chain branches can be measured, for example, using Temperature Raising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights of polymer chains. BOCD has been described, for example, in U.S. Pat. No. 8,378,043, Col. 3, line 34, bridging Col. 4, line 19, and U.S. Pat. No. 8,476,392, line 43, bridging Col. 16, line 54.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" is used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of the present disclosure, ethylene shall be considered an α-olefin.

For purposes of the present disclosure and claims thereto, the term "substituted" means that a hydrogen group has been replaced with a heteroatom, or a heteroatom containing group. For example, a "substituted hydrocarbyl" is a radical made of carbon and hydrogen where at least one hydrogen is replaced by a heteroatom or heteroatom containing group.

As used herein, Mn is number average molecular weight, Mw is weight average molecular weight, and Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weight units (e.g., Mw, Mn, Mz) are g/mol.

Unless otherwise noted all melting points (Tm) are DSC second melt.

The following abbreviations may be used herein: dme is 1,2-dimethoxyethane, Me is methyl, Ph is phenyl, Et is ethyl, Pr is propyl, iPr is isopropyl, n-Pr is normal propyl, Bu is butyl, cPR is cyclopropyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, p-Me is para-methyl, Ph is phenyl, Bn is benzyl (i.e., $CH_2Ph$), THF (also referred to as thf) is tetrahydrofuran, RT is room temperature (and is 23° C. unless otherwise indicated), tol is toluene, EtOAc is ethyl acetate, and Cy is cyclohexyl.

A "catalyst system" comprises at least one catalyst compound and at least one activator. When "catalyst system" is used to describe such the catalyst compound/activator combination before activation, it means the unactivated catalyst complex (precatalyst) together with an activator and, optionally, a co-activator. When it is used to describe the combination after activation, it means the activated complex and the activator or other charge-balancing moiety. The transition metal compound may be neutral as in a precatalyst, or a charged species with a counter ion as in an activated catalyst system. For the purposes of the present disclosure, when catalyst systems are described as comprising neutral stable forms of the components, it is well understood by one of ordinary skill in the art, that the ionic form of the component is the form that reacts with the monomers to produce polymers.

In the description herein, the metallocene catalyst may be described as a catalyst precursor, a pre-catalyst compound, metallocene catalyst compound or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion. Activator and cocatalyst are also used interchangeably.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In at least one embodiment a co-activator can be pre-mixed with the transition metal compound to form an alkylated transition metal compound.

Non-coordinating anion (NCA) is an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

For purposes of the present disclosure, in relation to metallocene catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

For purposes of the present disclosure, "alkoxides" include those where the alkyl group is a $C_1$ to $C_{10}$ hydrocarbyl. The alkyl group may be straight chain, branched, or cyclic. The alkyl group may be saturated or unsaturated. In at least one embodiment, the alkyl group may comprise at least one aromatic group.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one halogen (such as Br, Cl, F or I) or at least one functional group, such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, or where at least one heteroatom has been inserted within a hydrocarbyl ring.

Certain abbreviations may be used to for the sake of brevity and include but are not limited to Me=methyl, Et=ethyl, Pr=propyl, Bu=butyl, Ph=phenyl, Cp=cyclopentadienyl, Cp*=pentamethyl cydopentadienyl, Ind=indenyl, etc.

The term "alkenyl" means a straight-chain, branched-chain, or cyclic hydrocarbon radical having one or more double bonds. These alkenyl radicals may be optionally substituted. Examples of suitable alkenyl radicals can include ethenyl, propenyl, allyl, 1,4-butadienyl cyclopropenyl, cyclobutenyl, cyclopentenyl, cyclohexenyl, cyclooctenyl, and the like, including their substituted analogues.

The term "alkoxy" or "alkoxide" means an alkyl ether or aryl ether radical wherein the term alkyl is as defined above. Examples of suitable alkyl ether radicals can include methoxy, ethoxy, n-propoxy, iso-propoxy, n-butoxy, iso-butoxy, sec-butoxy, tert-butoxy, phenoxyl, and the like.

The term "aryl" or "aryl group" means a six carbon aromatic ring and the substituted variants thereof, such as phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom-substituted ring.

The term "continuous" means a system that operates without interruption or cessation. For example, a continuous process to produce a polymer would be one where the reactants are continually introduced into one or more reactors and polymer product is continually withdrawn until the polymerization is stopped, e.g. at 300 minutes.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in Oliveira, J. V. et al. (2000) "High-Pressure Phase Equilibria for Polypropylene-Hydrocarbon Systems," *Ind. Eng. Chem. Res.*, v. 39, pp. 4627-4633.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, such as less than 10 wt %, such as less than 1 wt %, such as 0 wt %.

U.S. Pat. No. 9,290,593 ('593 Patent) teaches a BOCD Index. The BOCD Index may be defined by the following equation:

BOCD Index=(Content of SCB at the high molecular weight side−Content of SCB at the low molecular weight side)/(Content of SCB at the low molecular weight side), wherein the "Content of SCB at the high molecular weight side" means the content of the SCB (the number of branches/1,000 carbon atoms) included in a polymer chain having a molecular weight of Mw of the polyolefin or more and 1.3×Mw or less, and the "Content of SCB at the low molecular weight side" means the content of the SCB (the number of branches/1000 carbon atoms) included in a polymer chain having a molecular weight of 0.7×Mw of the polyolefin or more and less than Mw. The BOCD Index defined by the equation above may be in the range of 1 to 5, such as 2 to 4, such as 2 to 3.5. See, also, FIG. 1 and FIG. 2 of the '593 Patent (characterizing BOCD polymer structures using GPC-FTIR data).

The breadth of the composition distribution is characterized by the $T_{75}$-$T_{25}$ value, wherein $T_{25}$ is the temperature at which 25% of the eluted polymer is obtained and $T_{75}$ is the temperature at which 75% of the eluted polymer is obtained in a TREF experiment as described herein. The composition distribution is further characterized by the $F_{80}$ value, which is the fraction of polymer that elutes below 80° C. in a TREF-LS experiment as described herein. A higher $F_{80}$ value indicates a higher fraction of comonomer in the polymer molecule. An orthogonal composition distribution is defined by a $M_{60}/M_{90}$ value that is greater than 1, wherein $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

In at least one embodiment, a polymer has a BOCD characterized in that the $T_{75}$-$T_{25}$ value is 1 or greater, 2.0 or greater, 2.5 or greater, 4.0 or greater, 5.0 or greater, 7.0 or greater, 10.0 or greater, 11.5 or greater, 15.0 or greater, 17.5 or greater, 20.0 or greater, 25.0 or greater, 30.0 or greater, 35.0 or greater, 40.0 or greater, or 45.0 or greater, wherein $T_{25}$ is the temperature at which 25% of the eluted polymer is obtained and $T_{75}$ is the temperature at which 75% of the eluted polymer is obtained in a TREF experiment as described herein.

The polymers as described herein may further have a BOCD characterized in that $M_{60}/M_{90}$ value is 1.5 or greater, 2.0 or greater, 2.25 or greater, 2.50 or greater, 3.0 or greater, 3.5 or greater, 4.0 or greater, 4.5 or greater, or 5.0 or greater, wherein $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

Additionally, the polymers as described herein may further have a BOCD characterized in that $F_{80}$ value is 1% or greater, 2% or greater, 3% or greater, 4% or greater, 5% or greater, 6% or greater, 7% or greater, 10% or greater, 11% or greater, 12% or greater, or 15% or greater, wherein $F_{80}$ is the fraction of polymer that elutes below 80° C.

Transition Metal Complexes

In at least one embodiment, the present disclosure relates to novel bridged metallocene transition metal complexes, where the complexes include at least one cyclopentadienyl ligand with particular combinations of substituents and bridged with, for example, an —Si—Si— group. In at least one embodiment, the bridge is characterized in that it has at least one functionality, either included in the bridge or bonded to it, this being a Si—Y or Ge—Y-type unity, such as Si—Y, Y being hydrocarbyl; such as Y is $C_1$-$C_{10}$ hydrocarbyl.

In at least one embodiment, a catalyst compound, and catalyst systems comprising such compounds, is represented by formula (I):

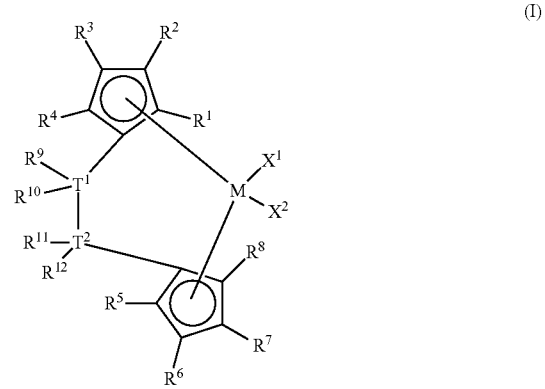

wherein:
M is a group 4 metal;
each of $R^1$, $R^2$, $R^3$, and $R^4$ is independently hydrogen, alkoxide, $C_1$ to $C_{40}$ substituted or unsubstituted hydrocarbyl, or —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl; wherein at least one of $R^1$, $R^2$, $R^3$, and $R^4$ is independently hydrogen, alkoxide, $C_1$ to $C_{40}$ substituted or unsubstituted hydrocarbyl, or —$R^{13}$—$SiR'_3$ or —$R^{13}$—$CR'_3$ where $R^{13}$ is $C_1$ to $C_4$ hydrocarbyl, and each R' is independently H or $C_1$ to $C_{20}$ substituted or unsubstituted hydrocarbyl and at least one R' is $C_1$ to $C_{20}$ substituted or unsubstituted hydrocarbyl;

each of $R^5$, $R^6$, $R^7$, and $R^8$ is independently hydrogen, alkoxide, $C_1$ to $C_{40}$ substituted or unsubstituted hydrocarbyl, —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl, or two or more of $R^5$, $R^6$, $R^7$, and $R^8$ form a substituted or unsubstituted, saturated, partially unsaturated or aromatic, cyclic or polycyclic substituent ring; wherein at least one of $R^5$, $R^6$, $R^7$, and $R^8$ is independently hydrogen, alkoxide, $C_1$ to $C_{40}$ substituted or unsubstituted hydrocarbyl, or —$R^{13}$—$SiR'_3$ or —$R^{13}$—$CR'_3$ where $R^{13}$ is $C_1$ to $C_4$ hydrocarbyl, and each R' is independently H or $C_1$ to $C_{20}$ substituted or unsubstituted hydrocarbyl and at least one R' is $C_1$ to $C_{20}$ substituted or unsubstituted hydrocarbyl; wherein at least one of $R^1$, $R^2$, $R^3$, $R^4$, $R^5$, $R^6$, $R^7$, and $R^8$ is, —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl;

each of $X^1$ and $X^2$ is independently a univalent anionic ligand, a diene ligand, an alkylidene ligand, or $X^1$ and $X^2$ are joined to form a metallocyclic ring;

each of $T^1$ and $T^2$ are independently Si or Ge;

each of $R^9$, $R^{10}$, $R^{11}$, and $R^{12}$ is independently hydrogen or a $C_1$-$C_{20}$ containing hydrocarbyl, substituted hydrocarbyl, halocarbyl, substituted halocarbyl, silylcarbyl, germylcarbyl, or $R^9$ and $R^{10}$ join to form a substituted or unsubstituted, saturated, partially unsaturated or aromatic, cyclic or polycyclic substituent, or $R^{11}$ and $R^{12}$ join to form a substituted or unsubstituted, saturated, partially unsaturated or aromatic, cyclic or polycyclic substituent.

In at least one embodiment, M is Hf, Zr or Ti, such as Hf or Zr, such as Hf.

In at least one embodiment, each $R^9$, $R^{10}$, $R^{11}$, $R^{12}$ is a methyl, ethyl, propyl, butyl, pentyl, hexyl, heptyl, octyl, nonyl, decyl, undecyl, or dodecyl group.

In at least one embodiment, —(($R^9$)($R^{10}$)$T^1$-$T^2$($R^{11}$)($R^{12}$))— wherein one or more of $T^1$ and $T^2$ is Si, and each of $R^9$, $R^{10}$, $R^{11}$, $R^{12}$ is independently $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl. For example, —(($R^9$)($R^{10}$)$T^1$-$T^2$($R^{11}$)($R^{12}$))— is the bridging group —($Me_2$)Si—Si($Me_2$)—.

In at least one embodiment, each of $R^1$ and $R^2$ together do not form a ring and or each of $R^3$ and $R^4$ together do not form a ring.

In at least one embodiment, each of $X^1$ and $X^2$ is independently selected from hydrocarbyl radicals having from 1 to 20 carbon atoms, hydrides, amides, alkoxides, sulfides, phosphides, halides, dienes, amines, phosphines, ethers, or a combination thereof, ($X^1$ and $X^2$ may form a part of a fused ring or a ring system). In at least one embodiment, each of $X^1$ and $X^2$ is independently selected from halide or $C_1$ to $C_5$ alkyl groups (such as methyl). In at least one embodiment, each $X^1$ and $X^2$ is selected from chloro, bromo, methyl, ethyl, propyl, butyl, pentyl, hexyl, heptyl, octyl, nonyl, decyl, undecyl, and dodecyl.

Alternatively, $X^1$ and $X^2$ may also be joined together to form an alkanediyl group or a conjugated $C_4$-$C_{40}$ diene ligand which is coordinated to M in a metallacyclopentene fashion; $X^1$ and $X^2$ may also be identical or different conjugated dienes, optionally substituted with one or more hydrocarbyl, tri (hydrocarbyl) silyl groups or tri (hydrocarbyl) silylhydrocarbyl groups, said dienes having up to 30 atoms not counting hydrogen and forming a π-complex with M.

Exemplary groups suitable for $X^1$ and or $X^2$ include 1,4-diphenyl, 1,3-butadiene, 1,3-pentadiene, 2-methyl 1,3-pentadiene, 2,4-hexadiene, 1-phenyl, 1,3-pentadiene, 1,4-dibenzyl, 1,3-butadiene, 1,4-ditolyl-1,3-butadiene, 1,4-bis (trimethylsilyl)-1,3-butadiene, and 1,4-dinaphthyl-1,3-butadiene; such as $X^1$ and $X^2$ are identical and are a $C_1$-$C_3$ alkyl or alkoxy group, a $C_6$-$C_{10}$ aryl or aryloxy group, a $C_2$-$C_4$ alkenyl group, a $C_7$-$C_{10}$ arylalkyl group, a $C_7$-$C_{12}$ alkylaryl group, or a halogen atom, such as chlorine.

In at least one embodiment, the 2 position of the cyclopentadienyl group or groups, e.g., $R^1$, $R^4$, $R^5$, or $R^8$, of formula (I), may be independently selected from hydrogen, methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, or a substituted or unsubstituted phenyl, particularly methyl, ethyl, n-propyl, isopropyl, n-butyl, isobutyl, sec-butyl, tert-butyl, more particularly hydrogen or methyl.

In at least one embodiment, the 2 position of the cyclopentadienyl group or groups, e.g., $R^1$, $R^4$, $R^5$, or $R^8$, of formula (I), is hydrogen.

In at least one embodiment, $R^1$, $R^2$, $R^3$, and $R^4$ are the same or different radicals as described for $R^5$, $R^6$, $R^7$, and $R^8$, but including hydrogen, and where one or more of these pairs of substituents can be joined together into a saturated, unsaturated or aromatic fused ring.

In at least one embodiment, $R^1$, $R^2$, $R^3$, $R^4$, $R^5$, $R^6$, $R^7$, and $R^8$ of formula (I) may be identical or different and are each independently a hydrogen atom, a halogen atom, a $C_1$-$C_{10}$ alkyl group (methyl, ethyl, propyl, butyl, pentyl, hexyl, heptyl, octyl, nonyl, decyl, undecyl, dodecyl or an isomer thereof) which may be halogenated, or a $C_6$-$C_{10}$ aryl group which may be halogenated, wherein at least one of $R^1$, $R^2$, $R^3$, $R^4$, $R^5$, $R^6$, $R^7$, and $R^8$ is, —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl.

In at least one embodiment, $R^1$, $R^2$, $R^3$, $R^4$, $R^5$, $R^6$, $R^7$, and $R^8$ of formula (I) are identical or different and independently selected from a hydrogen atom, $C_2$-$C_{20}$ alkyl group (such as $C_3$ to $C_{16}$, such as $C_4$ to $C_{12}$, such as butyl, pentyl, hexyl, heptyl, octyl, nonyl, decyl, undecyl, dodecyl and isomers thereof) which may be halogenated, a $C_6$-$C_{10}$ aryl group which may be halogenated, wherein at least one of $R^1$, $R^2$, $R^3$, $R^4$, $R^5$, $R^6$, $R^7$, and $R^8$ is, —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl. In at least one embodiment, $R^1$, $R^2$, $R^3$, $R^4$, $R^5$, $R^6$, $R^7$, and $R^8$ may be the same or different and are each independently a butyl group, an aryl group, an isopropyl group, or a fluoroalkyl group, such as wherein each of $R^1$, $R^2$, $R^3$, $R^4$, $R^5$, $R^6$, $R^7$, and $R^8$ is selected from the group consisting of methyl, ethyl, propyl, isopropyl, n-propyl, n-butyl-, iso-butyl-, and tert-butyl groups, wherein at least one of $R^1$, $R^2$, $R^3$, $R^4$, $R^5$, $R^6$, $R^7$, and $R^8$ is, —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl.

In at least one embodiment, $R^1$, $R^2$, $R^3$, $R^4$, $R^5$, $R^6$, $R^7$, and $R^8$ may be the same or different and are each independently a methyl group, ethyl group, propyl group, butyl group, an aryl group, an isopropyl group, or a fluoroalkyl group, such as wherein each of $R^1$, $R^2$, $R^3$, $R^4$, $R^5$, $R^6$, $R^7$, and $R^8$ is independently selected from the group consisting of methyl, ethyl, propyl, butyl, aryl, isopropyl, n-propyl, n-butyl-, iso-butyl-, and tert-butyl groups, and $R^1$, $R^2$, $R^3$, $R^4$, $R^5$, $R^6$, $R^7$, and $R^8$ may be independently substituted with —NR'$_2$, —SR', —OR', —OSiR'$_3$, —CH$_2$SiR'$_3$ or a —PR'$_2$ radical, wherein R' is one of a hydrogen atom, halogen atom, a C$_1$-C$_{10}$ alkyl group, or a C$_6$-C$_{10}$ aryl group, such as wherein each of R$^1$, R$^2$, R$^3$, R$^4$, R$^5$, R$^6$, R$^7$, and R$^8$ is independently —CH$_2$SiR'$_3$ wherein R' is a C$_1$-C$_{10}$ alkyl group, particularly methyl group, ethyl group, propyl, butyl group, an aryl group, isopropyl, n-propyl, n-butyl-, isobutyl-, and tert-butyl, such as methyl, wherein at least one of R$^1$, R$^2$, R$^3$, R$^4$, R$^5$, R$^6$, R$^7$, and R$^8$ is, —R$^{13}$—SiR'$_3$ or —R$^{13}$—CR'$_3$ where R$^{13}$ is C$_1$ to C$_4$ hydrocarbyl, and each R' is independently C$_1$ to C$_{20}$ substituted or unsubstituted hydrocarbyl.

In at least one embodiments, R$^1$ and R$^5$ is a —CH$_2$SiR'$_3$ group and each of R$^2$, R$^3$, R$^4$, R$^6$, R$^7$, and R$^8$ is hydrogen.

In another embodiment, R$^1$ and R$^6$ is a —CH$_2$SiR'$_3$ group and each of R$^2$, R$^3$, R$^4$, R$^5$, R$^7$, and R$^8$ is hydrogen.

In another embodiment, R$^2$ and R$^5$ is a —CH$_2$SiR'$_3$ group and each of R$^1$, R$^3$, R$^4$, R$^6$, R$^7$, and R$^8$ is hydrogen.

In another embodiments, R$^2$ and R$^6$ is a —CH$_2$SiR'$_3$ group and each of R$^1$, R$^3$, R$^4$, R$^5$, R$^7$, and R$^8$ is hydrogen.

In yet another embodiment, each of R$^1$, R$^2$, R$^3$, R$^4$, R$^5$, R$^6$, R$^7$, and R$^8$ is independently a hydrogen atom or a substituted or unsubstituted, branched or unbranched C$_1$-C$_{20}$ alkyl group, such as a C$_2$-C$_{20}$ alkyl group, wherein at least one of R$^1$, R$^2$, R$^3$, R$^4$, R$^5$, R$^6$, R$^7$, and R$^8$ is, —R$^{13}$—SiR'$_3$ or —R$^{13}$—CR'$_3$ where R$^{13}$ is C$_1$ to C$_4$ hydrocarbyl, and each R' is independently C$_1$ to C$_{20}$ substituted or unsubstituted hydrocarbyl.

In another embodiment, each of R$^1$, R$^2$, R$^3$, and R$^4$ is independently substituted or unsubstituted, branched or unbranched C$_1$-C$_{20}$ alkyl, such as C$_1$-C$_5$ alkyl, R$^5$ is —CH$_2$SiR'$_3$, and R$^6$, R$^7$, and R$^8$ is hydrogen.

In another embodiment, R$^1$, R$^2$, R$^3$, and R$^4$ is independently substituted or unsubstituted, branched or unbranched C$_1$-C$_{20}$ alkyl, such as C$_1$-C$_5$ alkyl, R$^6$ is —CH$_2$SiR'$_3$, and R$^5$, R$^7$, and R$^8$ is hydrogen.

In still other embodiments, —((R$^9$)(R$^{10}$)T$^1$-T$^2$(R$^{11}$)(R$^{12}$))— is the bridging group —(Me$_2$)Si—Si(Me$_2$)—.

Transition metal complexes include Zr-based or Hf-based complexes. Additionally, some such transition metal complexes are bridged by a dialkyldisiladiyl group.

Transition metal complexes of the present disclosure are represented by formula (I) above, wherein M can be selected from the group consisting of titanium, zirconium, and hafnium, such as zirconium or hafnium, such as hafnium; R$^4$ and R$^8$ are identical or different, and are independently one of a hydrogen atom, a C$_1$-C$_{10}$ alkyl group (such as methyl, ethyl, butyl, pentyl, hexyl, heptyl, octyl, nonyl, decyl, undecyl, dodecyl and isomers thereof), or a halogen atom (such as Cl, Br, F or I).

In at least one embodiment of a transition metal complex represented by formula (I), —((R$^9$)(R$^{10}$)T$^1$-T$^2$(R$^{11}$)(R$^{12}$))— is —(R")$_2$Si—Si(R")$_2$— wherein one or more of T$^1$ and T$^2$ is Si and the R" groups may be the same or different and are each independently selected from hydrogen or C$_1$-C$_{10}$ alkyl, such as C$_1$-C$_2$ alkyl (e.g., methyl or ethyl).

More specifically, in certain embodiments, each X$^1$ and X$^2$ may be the same or different and are each independently a C$_1$-C$_{10}$ alkyl group, such as C$_1$-C$_2$ alkyl, such as methyl; each of R$^2$ and R$^6$ may be the same or different and are independently hydrogen or —CH$_2$SiR'$_3$ wherein R' may be the same or different and are each independently C$_1$-C$_{10}$ alkyl, such as C$_1$-C$_2$ alkyl, such as methyl; each of R$^1$, R$^3$, R$^4$, R$^5$, R$^7$, and R$^8$ may be the same or different and are each independently hydrogen or C$_1$-C$_{10}$ alkyl, such as each is hydrogen; —((R$^9$)(R$^{10}$)T$^1$—T$^2$(R$^{11}$)(R$^{12}$))— is —(R")$_2$Si—Si(R")$_2$— wherein one or more of T$^1$ and T$^2$ is Si, and each R" may be the same or different and are each independently hydrogen or C$_1$-C$_{10}$ alkyl, such as methyl.

In at least one embodiment, transition metal complexes according to formula (I) include those wherein X$^1$ and X$^2$ are methyl; each of R$^2$ and R$^6$ is —CH$_2$SiR'$_3$ wherein R' is methyl; each of R$^1$, R$^3$, R$^4$, R$^5$, R$^7$, and R$^8$ is hydrogen; —((R$^9$)(R$^{10}$)T$^1$—T$^2$(R$^{11}$)(R$^{12}$))— is —(CH$_3$)$_2$Si—Si(CH$_3$)$_2$—; and M is hafnium.

In at least one embodiment, transition metal complexes according to formula (I) include those wherein X$^1$ and X$^2$ are methyl; each R$^1$, R$^2$, R$^3$, R$^4$, R$^5$, R$^6$, R$^7$, and R$^8$ are methyl groups, wherein at least one of R$^1$, R$^2$, R$^3$, R$^4$, R$^5$, R$^6$, R$^7$, and R$^8$ is, —R$^{13}$—SiR'$_3$ or —R$^{13}$—CR'$_3$ where R$^{13}$ is C$_1$ to C$_4$ hydrocarbyl, and each R' is independently C$_1$ to C$_{20}$ substituted or unsubstituted hydrocarbyl. —((R$^9$)(R$^{10}$)T$^1$—T$^2$(R$^{11}$)(R$^{12}$))— is —(CH$_3$)$_2$Si—Si(CH$_3$)$_2$—. M is hafnium.

The following hafnium-containing metallocenes and their zirconium-containing analogs include: rac-tetramethyldisilyl-bis(trimethylsilylmethylcyclopentadienyl) hafnium dimethyl, meso-tetramethyldisilyl-bis(trimethylsilylmethylcyclopentadienyl) hafnium dimethyl.

Likewise, while the dimethyl-substituted compounds (—Hf(CH$_3$)$_2$ and —Zr(CH$_3$)$_2$) are enumerated above, the compounds can be where each of the methyl groups are replaced with ethyl groups (e.g., —HfEt$_2$ and —ZrEt$_2$), n-propyl groups (e.g., —HfPr$_2$ and —ZrPr$_2$), n-butyl groups (e.g., —HfBu$_2$ and —ZrBu$_2$), benzyl groups (e.g., —Hf(Bz)$_2$ and —Zr(Bz)$_2$), phenyl groups (e.g., —HfPh$_2$ and —ZrPh$_2$), trimethylsilylmethyl groups (e.g., —Hf(CH$_2$SiMe$_3$)$_2$ and —Zr(CH$_2$SiMe$_3$)$_2$), neopentyl groups (e.g., —Hf(CH$_2$CMe$_3$)$_2$ and —Zr(CH$_2$CMe$_3$)$_2$), chloride atoms (e.g., —HfCl$_2$ and —ZrCl$_2$).

In at least one embodiment, the catalyst compound represented by formula (I) is selected from: Rac/meso-Me$_4$Si$_2$(3-Me$_3$SiCH$_2$Cp)$_2$HfCl$_2$, Rac/meso-Et$_4$Si$_2$(3-Me$_3$SiCH$_2$Cp)$_2$HfCl$_2$, Rac/meso-$^i$Pr$_4$Si$_2$(3-Me$_3$SiCH$_2$Cp)$_2$HfCl$_2$, Rac/meso-Ph$_4$Si$_2$(3-Me$_3$SiCH$_2$Cp)$_2$HfCl$_2$, Rac/meso-Me$_2$Ph$_2$Si$_2$(3-Me$_3$SiCH$_2$Cp)$_2$HfCl$_2$, Rac/meso-Me$_4$Si$_2$(3-Et$_3$SiCH$_2$Cp)$_2$HfCl$_2$, Rac/meso-Et$_4$Si$_2$(3-Et$_3$SiCH$_2$Cp)$_2$HfCl$_2$, Rac/meso-$^i$Pr$_4$Si$_2$(3-Et$_3$SiCH$_2$Cp)$_2$HfCl$_2$, Rac/meso-Ph$_4$Si$_2$(3-Et$_3$SiCH$_2$Cp)$_2$HfCl$_2$, Rac/meso-Me$_2$Ph$_2$Si$_2$(3-Et$_3$SiCH$_2$Cp)$_2$HfCl$_2$, Rac/meso-Me$_4$Si$_2$(3-Cy$_3$SiCH$_2$Cp)$_2$HfCl$_2$, Rac/meso-Et$_4$Si$_2$(3-Cy$_3$SiCH$_2$Cp)$_2$HfCl$_2$, Rac/meso-$^i$Pr$_4$Si$_2$(3-Cy$_3$SiCH$_2$Cp)$_2$HfCl$_2$, Rac/meso-Ph$_4$Si$_2$(3-Cy$_3$SiCH$_2$Cp)$_2$HfCl$_2$, Rac/meso-Me$_2$Ph$_2$Si$_2$(3-Cy$_3$SiCH$_2$Cp)$_2$HfCl$_2$, Rac/meso-Me$_4$Si$_2$(3-Me$_2$PhSiCH$_2$Cp)$_2$HfCl$_2$, Rac/meso-Et$_4$Si$_2$(3-Me$_2$PhSiCH$_2$Cp)$_2$HfCl$_2$, Rac/meso-$^i$Pr$_4$Si$_2$(3-Me$_2$PhSiCH$_2$Cp)$_2$HfCl$_2$, Rac/meso-Ph$_4$Si$_2$(3-Me$_2$PhSiCH$_2$Cp)$_2$HfCl$_2$, Rac/meso-Me$_2$Ph$_2$Si$_2$(3-Me$_2$PhSiCH$_2$Cp)$_2$HfCl$_2$, Rac/meso-Me$_4$Si$_2$(3-MePh$_2$SiCH$_2$Cp)$_2$HfCl$_2$, Rac/meso-Et$_4$Si$_2$(3-MePh$_2$SiCH$_2$Cp)$_2$HfCl$_2$, Rac/meso-$^i$Pr$_4$Si$_2$(3-MePh$_2$SiCH$_2$Cp)$_2$HfCl$_2$, Rac/meso-Ph$_4$Si$_2$(3-MePh$_2$SiCH$_2$Cp)$_2$HfCl$_2$, Rac/meso-Me$_2$Ph$_2$Si$_2$(3-MePh$_2$SiCH$_2$Cp)$_2$HfCl$_2$, Rac/meso-Me$_4$Si$_2$(3-Ph$_3$SiCH$_2$Cp)$_2$HfCl$_2$, Rac/meso-Et$_4$Si$_2$(3-Ph$_3$SiCH$_2$Cp)$_2$HfCl$_2$, Rac/meso-$^i$Pr$_4$Si$_2$(3-Ph$_3$SiCH$_2$Cp)$_2$HfCl$_2$, Rac/meso-Ph$_4$Si$_2$(3-Ph$_3$SiCH$_2$Cp)$_2$HfCl$_2$, Rac/meso-Me$_2$Ph$_2$Si$_2$(3-Me$_3$SiCH$_2$Cp)HfCl$_2$, Me$_4$Si$_2$(2,3,4,5-Me$_4$Cp)(3-Me$_3$SiCH$_2$Cp)HfCl$_2$, Et$_4$Si$_2$(2,3,4,5-Me$_4$Cp)(3-Me$_3$SiCH$_2$Cp)HfCl$_2$, $^i$Pr$_4$Si$_2$(2,3,4,5-Me$_4$Cp)(3-Me$_3$SiCH$_2$Cp)HfCl$_2$, Ph$_4$Si$_2$(2,3,4,5-Me$_4$Cp)(3-

Me₃SiCH₂Cp)HfCl₂, Me₂Ph₂Si₂(2,3,4,5-Me₄Cp)(3-Me₃SiCH₂Cp)HfCl₂, Me₄Si₂(2,3,4,5-Me₄Cp)(3-Et₃SiCH₂Cp)HfCl₂, Et₄Si₂(2,3,4,5-Me₄Cp)(3-Et₃SiCH₂Cp)HfCl₂, ⁱPr₄Si₂(2,3,4,5-Me₄Cp)(3-Et₃SiCH₂Cp)HfCl₂, Ph₄Si₂(2,3,4,5-Me₄Cp)(3-Et₃SiCH₂Cp)HfCl₂, Me₂Ph₂Si₂(2,3,4,5-Me₄Cp)(3-Et₃SiCH₂Cp)HfCl₂, Me₄Si₂(2,3,4,5-Me₄Cp)(3-Cy₃SiCH₂Cp)HfCl₂, Et₄Si₂(2,3,4,5-Me₄Cp)(3-Cy₃SiCH₂Cp)HfCl₂, ⁱPr₄Si₂(2,3,4,5-Me₄Cp)(3-Cy₃SiCH₂Cp)HfCl₂, Ph₄Si₂(2,3,4,5-Me₄Cp)(3-Cy₃SiCH₂Cp)HfMe₂, Me₂Ph₂Si₂(2,3,4,5-Me₄Cp)(3-Cy₃SiCH₂Cp)HfCl₂, Me₄Si₂(2,3,4,5-Me₄Cp)(3-Me₂PhSiCH₂Cp)HfCl₂, Et₄Si₂(2,3,4,5-Me₄Cp)(3-Me₂PhSiCH₂Cp)HfCl₂, ⁱPr₄Si₂(2,3,4,5-Me₄Cp)(3-Me₂PhSiCH₂Cp)HfCl₂, Ph₄Si₂(2,3,4,5-Me₄Cp)(3-Me₂PhSiCH₂Cp)HfCl₂, Me₂Ph₂Si₂(2,3,4,5-Me₄Cp)(3-Me₂PhSiCH₂Cp)HfCl₂, Me₄Si₂(2,3,4,5-Me₄Cp)(3-MePh₂SiCH₂Cp)HfCl₂, Et₄Si₂(2,3,4,5-Me₄Cp)(3-MePh₂SiCH₂Cp)HfCl₂, ⁱPr₄Si₂(2,3,4,5-Me₄Cp)(3-MePh₂SiCH₂Cp)HfCl₂, Ph₄Si₂(2,3,4,5-Me₄Cp)(3-MePh₂SiCH₂Cp)HfCl₂, Me₂Ph₂Si₂(2,3,4,5-Me₄Cp)(3-MePh₂SiCH₂Cp)HfCl₂, Me₄Si₂(2,3,4,5-Me₄Cp)(3-Ph₃SiCH₂Cp)HfCl₂, Et₄Si₂(2,3,4,5-Me₄Cp)(3-Ph₃SiCH₂Cp)HfCl₂, ⁱPr₄Si₂(2,3,4,5-Me₄Cp)(3-Ph₃SiCH₂Cp)HfCl₂, Ph₄Si₂(2,3,4,5-Me₄Cp)(3-Ph₃SiCH₂Cp)HfCl₂, Me₂Ph₂Si₂(2,3,4,5-Me₄Cp)(3-Ph₃SiCH₂Cp)HfCl₂, Me₄Si₂(Cp)(3-Me₃SiCH₂Cp)HfCl₂, Et₄Si₂(Cp)(3-Me₃SiCH₂Cp)HfCl₂, ⁱPr₄Si₂(Cp)(3-Me₃SiCH₂Cp)HfCl₂, Ph₄Si₂(Cp)(3-Me₃SiCH₂Cp)HfCl₂, Me₂Ph₂Si₂(Cp)(3-Me₃SiCH₂Cp)HfCl₂, Me₄Si₂(Cp)(3-Et₃SiCH₂Cp)HfCl₂, Et₄Si₂(Cp)(3-Et₃SiCH₂Cp)HfCl₂, ⁱPr₄Si₂(Cp)(3-Et₃SiCH₂Cp)HfCl₂, Ph₄Si₂(Cp)(3-Et₃SiCH₂Cp)HfCl₂, Me₂Ph₂Si₂(Cp)(3-Et₃SiCH₂Cp)HfCl₂, Me₄Si₂(Cp)(3-Cy₃SiCH₂Cp)HfCl₂, Et₄Si₂(Cp)(3-Cy₃SiCH₂Cp)HfCl₂, ⁱPr₄Si₂(Cp)(3-Cy₃SiCH₂Cp)HfCl₂, Ph₄Si₂(Cp)(3-Cy₃SiCH₂Cp)HfCl₂, Me₂Ph₂Si₂(Cp)(3-Cy₃SiCH₂Cp)HfCl₂, Me₄Si₂(Cp)(3-Me₂PhSiCH₂Cp)HfCl₂, Et₄Si₂(Cp)(3-Me₂PhSiCH₂Cp)HfCl₂, ⁱPr₄Si₂(Cp)(3-Me₂PhSiCH₂Cp)HfCl₂, Ph₄Si₂(Cp)(3-Me₂PhSiCH₂Cp)HfCl₂, Me₂Ph₂Si₂(Cp)(3-Me₂PhSiCH₂Cp)HfCl₂, MePh₂SiCH₂Cp)HfCl₂, Me₄Si₂(Cp)(3-Ph₃SiCH₂Cp)HfCl₂, Et₄Si₂(Cp)(3-Ph₃SiCH₂Cp)HfCl₂, ⁱPr₄Si₂(Cp)(3-Ph₃SiCH₂Cp)HfCl₂, Ph₄Si₂(Cp)(3-Ph₃SiCH₂Cp)HfCl₂, Me₂Ph₂Si₂(Cp)(3-Ph₃SiCH₂Cp)HfCl₂, Rac/meso-Me₄Si₂(3-Me₃SiCH₂Cp)(3-Et₃SiCH₂Cp)HfCl₂, Rac/meso-Et₄Si₂(3-Me₃SiCH₂Cp)(3-Et₃SiCH₂Cp)HfCl₂, Rac/meso-ⁱPr₄Si₂(3-Me₃SiCH₂Cp)(3-Et₃SiCH₂Cp)HfCl₂, Rac/meso-Ph₄Si₂(3-Me₃SiCH₂Cp)(3-Et₃SiCH₂Cp)HfCl₂, Rac/meso-Me₂Ph₂Si₂(3-Me₃SiCH₂Cp)(3-Et₃SiCH₂Cp)HfCl₂, Rac/meso-Me₄Si₂(3-Et₃SiCH₂Cp)(3-Cy₃SiCH₂Cp)HfCl₂, Rac/meso-Et₄Si₂(3-Et₃SiCH₂Cp)(3-Cy₃SiCH₂Cp)HfCl₂, Rac/meso-ⁱPr₄Si₂(3-Et₃SiCH₂Cp)(3-Cy₃SiCH₂Cp)HfCl₂, Rac/meso-Ph₄Si₂(3-Et₃SiCH₂Cp)(3-Cy₃SiCH₂Cp)HfCl₂, Rac/meso-Me₂Ph₂Si₂(3-Et₃SiCH₂Cp)(3-Cy₃SiCH₂Cp)HfCl₂, Rac/meso-Me₄Si₂(3-Cy₃SiCH₂Cp)(3-Me₂PhSiCH₂Cp)HfCl₂, Rac/meso-Et₄Si₂(3-Cy₃SiCH₂Cp)(3-Me₂PhSiCH₂Cp)HfCl₂, Rac/meso-ⁱPr₄Si₂(3-Cy₃SiCH₂Cp)(3-Me₂PhSiCH₂Cp)HfCl₂, Rac/meso-Ph₄Si₂(3-Cy₃SiCH₂Cp)(3-Me₂PhSiCH₂Cp)HfCl₂, Rac/meso-Me₂Ph₂Si₂(3-Cy₃SiCH₂Cp)(3-Me₂PhSiCH₂Cp)HfCl₂, Rac/meso-Me₄Si₂(3-Me₂PhSiCH₂Cp)(3-MePh₂SiCH₂Cp)HfCl₂, Rac/meso-Et₄Si₂(3-Me₂PhSiCH₂Cp)(3-MePh₂SiCH₂Cp)HfCl₂, Rac/meso-ⁱPr₄Si₂(3-Me₂PhSiCH₂Cp)(3-MePh₂SiCH₂Cp)HfCl₂, Rac/meso-Ph₄Si₂(3-Me₂PhSiCH₂Cp)(3-MePh₂SiCH₂Cp)HfCl₂, Rac/meso-Me₂Ph₂Si₂(3-Me₂PhSiCH₂Cp)(3-MePh₂SiCH₂Cp)HfCl₂, Rac/meso-Me₄Si₂(3-MePh₂SiCH₂Cp)(3-Ph₃SiCH₂Cp)HfCl₂, Rac/meso-Et₄Si₂(3-MePh₂SiCH₂Cp)(3-Ph₃SiCH₂Cp)HfCl₂, Rac/meso-ⁱPr₄Si₂(3-MePh₂SiCH₂Cp)(3-Ph₃SiCH₂Cp)HfCl₂, Rac/meso-Ph₄Si₂(3-MePh₂SiCH₂Cp)(3-Ph₃SiCH₂Cp)HfCl₂, Rac/meso-Me₂Ph₂Si₂(3-MePh₂SiCH₂Cp)(3-Ph₃SiCH₂Cp)HfCl₂, Rac/meso-Me₄Si₂(3-Ph₃SiCH₂Cp)₂HfCl₂, Rac/meso-Et₄Si₂(3-Ph₃SiCH₂Cp)₂HfCl₂, Rac/meso-ⁱPr₄Si₂(3-Ph₃SiCH₂Cp)₂HfCl₂, Rac/meso-Ph₄Si₂(3-Ph₃SiCH₂Cp)₂HfCl₂ and Rac/meso-Me₂Ph₂Si₂(3-Ph₃SiCH₂Cp)₂HfCl₂.

In at least one embodiment, the catalyst compound represented by formula (I) is selected from: Rac/meso-Me₄Si₂(3-Me₃SiCH₂Cp)₂HfMe₂, Rac/meso-Et₄Si₂(3-Me₃SiCH₂Cp)₂HfMe₂, Rac/meso-ⁱPr₄Si₂(3-Me₃SiCH₂Cp)₂HfMe₂, Rac/meso-Ph₄Si₂(3-Me₃SiCH₂Cp)₂HfMe₂, Rac/meso-Me₂Ph₂Si₂(3-Me₃SiCH₂Cp)₂HfMe₂, Rac/meso-Me₄Si₂(3-Et₃SiCH₂Cp)₂HfMe₂, Rac/meso-Et₄Si₂(3-Et₃SiCH₂Cp)₂HfMe₂, Rac/meso-ⁱPr₄Si₂(3-Et₃SiCH₂Cp)₂HfMe₂, Rac/meso-Ph₄Si₂(3-Et₃SiCH₂Cp)₂HfMe₂, Rac/meso-Me₂Ph₂Si₂(3-Et₃SiCH₂Cp)₂HfMe₂, Rac/meso-Me₄Si₂(3-Cy₃SiCH₂Cp)₂HfMe₂, Rac/meso-Et₄Si₂(3-Cy₃SiCH₂Cp)₂HfMe₂, Rac/meso-ⁱPr₄Si₂(3-Cy₃SiCH₂Cp)₂HfMe₂, Rac/meso-Ph₄Si₂(3-Cy₃SiCH₂Cp)₂HfMe₂, Rac/meso-Me₂Ph₂Si₂(3-Cy₃SiCH₂Cp)₂HfMe₂, Rac/meso-Me₄Si₂(3-Me₂PhSiCH₂Cp)₂HfMe₂, Rac/meso-Et₄Si₂(3-Me₂PhSiCH₂Cp)₂HfMe₂, Rac/meso-ⁱPr₄Si₂(3-Me₂PhSiCH₂Cp)₂HfMe₂, Rac/meso-Ph₄Si₂(3-Me₂PhSiCH₂Cp)₂HfMe₂, Rac/meso-Me₂Ph₂Si₂(3-Me₂PhSiCH₂Cp)₂HfMe₂, Rac/meso-Me₄Si₂(3-MePh₂SiCH₂Cp)₂HfMe₂, Rac/meso-Et₄Si₂(3-MePh₂SiCH₂Cp)₂HfMe₂, Rac/meso-ⁱPr₄Si₂(3-MePh₂SiCH₂Cp)₂HfMe₂, Rac/meso-Ph₄Si₂(3-MePh₂SiCH₂Cp)₂HfMe₂, Rac/meso-Me₂Ph₂Si₂(3-MePh₂SiCH₂Cp)₂HfMe₂, Rac/meso-Me₄Si₂(3-Ph₃SiCH₂Cp)₂HfMe₂, Rac/meso-Et₄Si₂(3-Ph₃SiCH₂Cp)₂HfMe₂, Rac/meso-ⁱPr₄Si₂(3-Ph₃SiCH₂Cp)₂HfMe₂, Rac/meso-Ph₄Si₂(3-Ph₃SiCH₂Cp)₂HfMe₂, Rac/meso-Me₂Ph₂Si₂(3-Ph₃SiCH₂Cp)₂HfMe₂, Me₄Si₂(2,3,4,5-Me₄Cp)(3-Me₃SiCH₂Cp)HfMe₂, Et₄Si₂(2,3,4,5-Me₄Cp)(3-Me₃SiCH₂Cp)HfMe₂, ⁱPr₄Si₂(2,3,4,5-Me₄Cp)(3-Me₃SiCH₂Cp)HfMe₂, Ph₄Si₂(2,3,4,5-Me₄Cp)(3-Me₃SiCH₂Cp)HfMe₂, Me₂Ph₂Si₂(2,3,4,5-Me₄Cp)(3-Me₃SiCH₂Cp)HfMe₂, Me₄Si₂(2,3,4,5-Me₄Cp)(3-Et₃SiCH₂Cp)HfMe₂, Et₄Si₂(2,3,4,5-Me₄Cp)(3-Et₃SiCH₂Cp)HfMe₂, ⁱPr₄Si₂(2,3,4,5-Me₄Cp)(3-Et₃SiCH₂Cp)HfMe₂, Ph₄Si₂(2,3,4,5-Me₄Cp)(3-Et₃SiCH₂Cp)HfMe₂, Me₂Ph₂Si₂(2,3,4,5-Me₄Cp)(3-Et₃SiCH₂Cp)HfMe₂, Me₄Si₂(2,3,4,5-Me₄Cp)(3-Cy₃SiCH₂Cp)HfMe₂, Et₄Si₂(2,3,4,5-Me₄Cp)(3-Cy₃SiCH₂Cp)HfMe₂, ⁱPr₄Si₂(2,3,4,5-Me₄Cp)(3-Cy₃SiCH₂Cp)HfMe₂, Ph₄Si₂(2,3,4,5-Me₄Cp)(3-Cy₃SiCH₂Cp)HfMe₂, Me₂Ph₂Si₂(2,3,4,5-Me₄Cp)(3-Cy₃SiCH₂Cp)HfMe₂, Me₄Si₂(2,3,4,5-Me₄Cp)(3-Me₂PhSiCH₂Cp)HfMe₂, Et₄Si₂(2,3,4,5-Me₄Cp)(3-Me₂PhSiCH₂Cp)HfMe₂, ⁱPr₄Si₂(2,3,4,5-Me₄Cp)(3-Me₂PhSiCH₂Cp)HfMe₂, Ph₄Si₂(2,3,4,5-Me₄Cp)(3-Me₂PhSiCH₂Cp)HfMe₂, Me₂Ph₂Si₂(2,3,4,5-Me₄Cp)(3-Me₂PhSiCH₂Cp)HfMe₂, Me₄Si₂(2,3,4,5-Me₄Cp)(3-MePh₂SiCH₂Cp)HfMe₂, Et₄Si₂(2,3,4,5-Me₄Cp)(3-MePh₂SiCH₂Cp)HfMe₂, ⁱPr₄Si₂(2,3,4,5-Me₄Cp)(3-MePh₂SiCH₂Cp)HfMe₂, Ph₄Si₂(2,3,4,5-Me₄Cp)(3-MePh₂SiCH₂Cp)HfMe₂, Me₂Ph₂Si₂(2,3,4,5-Me₄Cp)(3-MePh₂SiCH₂Cp)HfMe₂, Me₄Si₂(2,3,4,5-Me₄Cp)(3-Ph₃SiCH₂Cp)HfMe₂, Et₄Si₂(2,3,4,5-Me₄Cp)(3-Ph₃SiCH₂Cp)HfMe₂, ⁱPr₄Si₂(2,3,4,5-Me₄Cp)(3-

Ph₃SiCH₂Cp)HfMe₂, Ph₃SiCH₂Cp)HfMe₂, Ph₃SiCH₂Cp)HfMe₂, Et₄Si₂(Cp)(3-Me₃SiCH₂Cp)HfMe₂, Me₃SiCH₂Cp)HfMe₂, Ph₄Si₂(Cp)(3-Me₃SiCH₂Cp)HfMe₂, Me₂Ph₂Si₂(Cp)(3-Me₃SiCH₂Cp)HfMe₂, Me₄Si₂(Cp)(3-Et₃SiCH₂Cp)HfMe₂, Et₄Si₂(Cp)(3-Et₃SiCH₂Cp)HfMe₂, ⁱPr₄Si₂(Cp)(3-Et₃SiCH₂Cp)HfMe₂, Ph₄Si₂(Cp)(3-Et₃SiCH₂Cp)HfMe₂, Me₂Ph₂Si₂(Cp)(3-Et₃SiCH₂Cp)HfMe₂, Me₄Si₂(Cp)(3-Cy₃SiCH₂Cp)HfMe₂, Et₄Si₂(Cp)(3-Cy₃SiCH₂Cp)HfMe₂, ⁱPr₄Si₂(Cp)(3-Cy₃SiCH₂Cp)HfMe₂, Ph₄Si₂(Cp)(3-Cy₃SiCH₂Cp)HfMe₂, Me₂Ph₂Si₂(Cp)(3-Cy₃SiCH₂Cp)HfMe₂, Me₄Si₂(Cp)(3-Me₂PhSiCH₂Cp)HfMe₂, Et₄Si₂(Cp)(3-Me₂PhSiCH₂Cp)HfMe₂, ⁱPr₄Si₂(Cp)(3-Me₂PhSiCH₂Cp)HfMe₂, Ph₄Si₂(Cp)(3-Me₂PhSiCH₂Cp)HfMe₂, Me₂Ph₂Si₂(Cp)(3-Me₂PhSiCH₂Cp)HfMe₂, MePh₂SiCH₂Cp)HfMe₂, Me₄Si₂(Cp)(3-Ph₃SiCH₂Cp)HfMe₂, Et₄Si₂(Cp)(3-Ph₃SiCH₂Cp)HfMe₂, ⁱPr₄Si₂(Cp)(3-Ph₃SiCH₂Cp)HfMe₂, Ph₄Si₂(Cp)(3-Ph₃SiCH₂Cp)HfMe₂, Me₂Ph₂Si₂(Cp)(3-Ph₃SiCH₂Cp)HfMe₂, Rac/meso-Me₄Si₂(3-Me₃SiCH₂Cp)(3-Et₃SiCH₂Cp)HfMe₂, Rac/meso-Et₄Si₂(3-Me₃SiCH₂Cp)(3-Et₃SiCH₂Cp)HfMe₂, Rac/meso-ⁱPr₄Si₂(3-Me₃SiCH₂Cp)(3-Et₃SiCH₂Cp)HfMe₂, Rac/meso-Ph₄Si₂(3-Me₃SiCH₂Cp)(3-Et₃SiCH₂Cp)HfMe₂, Rac/meso-Me₂Ph₂Si₂(3-Me₃SiCH₂Cp)(3-Et₃SiCH₂Cp)HfMe₂, Rac/meso-Me₄Si₂(3-Et₃SiCH₂Cp)(3-Cy₃SiCH₂Cp)HfMe₂, Rac/meso-Et₄Si₂(3-Et₃SiCH₂Cp)(3-Cy₃SiCH₂Cp)HfMe₂, Rac/meso-ⁱPr₄Si₂(3-Et₃SiCH₂Cp)(3-Cy₃SiCH₂Cp)HfMe₂, Rac/meso-Ph₄Si₂(3-Et₃SiCH₂Cp)(3-Cy₃SiCH₂Cp)HfMe₂, Rac/meso-Me₂Ph₂Si₂(3-Et₃SiCH₂Cp)(3-Cy₃SiCH₂Cp)HfMe₂, Rac/meso-Me₄Si₂(3-Cy₃SiCH₂Cp)(3-Me₂PhSiCH₂Cp)HfMe₂, Rac/meso-Et₄Si₂(3-Cy₃SiCH₂Cp)(3-Me₂PhSiCH₂Cp)HfMe₂, Rac/meso-ⁱPr₄Si₂(3-Cy₃SiCH₂Cp)(3-Me₂PhSiCH₂Cp)HfMe₂, Rac/meso-Ph₄Si₂(3-Cy₃SiCH₂Cp)(3-Me₂PhSiCH₂Cp)HfMe₂, Rac/meso-Me₂Ph₂Si₂(3-Cy₃SiCH₂Cp)(3-Me₂PhSiCH₂Cp)HfMe₂, Rac/meso-Me₄Si₂(3-Me₂PhSiCH₂Cp)(3-MePh₂SiCH₂Cp)HfMe₂, Rac/meso-Et₄Si₂(3-Me₂PhSiCH₂Cp)(3-MePh₂SiCH₂Cp)HfMe₂, Rac/meso-ⁱPr₄Si₂(3-Me₂PhSiCH₂Cp)(3-MePh₂SiCH₂Cp)HfMe₂, Rac/meso-Ph₄Si₂(3-Me₂PhSiCH₂Cp)(3-MePh₂SiCH₂Cp)HfMe₂, Rac/meso-Me₂Ph₂Si₂(3-Me₂PhSiCH₂Cp)(3-MePh₂SiCH₂Cp)HfMe₂, Rac/meso-Me₄Si₂(3-MePh₂SiCH₂Cp)(3-Ph₃SiCH₂Cp)HfMe₂, Rac/meso-Et₄Si₂(3-MePh₂SiCH₂Cp)(3-Ph₃SiCH₂Cp)HfMe₂, Rac/meso-ⁱPr₄Si₂(3-MePh₂SiCH₂Cp)(3-Ph₃SiCH₂Cp)HfMe₂, Rac/meso-Ph₄Si₂(3-MePh₂SiCH₂Cp)(3-Ph₃SiCH₂Cp)HfMe₂, Rac/meso-Me₂Ph₂Si₂(3-MePh₂SiCH₂Cp)(3-Ph₃SiCH₂Cp)HfMe₂, Rac/meso-Me₄Si₂(3-Ph₃SiCH₂Cp)₂HfMe₂, Rac/meso-Et₄Si₂(3-Ph₃SiCH₂Cp)₂HfMe₂, Rac/meso-ⁱPr₄Si₂(3-Ph₃SiCH₂Cp)₂HfMe₂, Rac/meso-Ph₄Si₂(3-Ph₃SiCH₂Cp)₂HfMe₂ and Rac/meso-Me₂Ph₂Si₂(3-Ph₃SiCH₂Cp)₂HfMe₂.

In at least one embodiment, the catalyst compound represented by formula (I) is selected from: Rac/meso-Me₄Si₂(3-Me₃SiCH₂Cp)₂HfBu₂, Rac/meso-Et₄Si₂(3-Me₃SiCH₂Cp)₂HfBu₂, Rac/meso-ⁱPr₄Si₂(3-Me₃SiCH₂Cp)₂HfBu₂, Rac/meso-Ph₄Si₂(3-Me₃SiCH₂Cp)₂HfBu₂, Rac/meso-Me₂Ph₂Si₂(3-Me₃SiCH₂Cp)₂HfBu₂, Rac/meso-Me₄Si₂(3-Et₃SiCH₂Cp)₂HfBu₂, Rac/meso-Et₄Si₂(3-Et₃SiCH₂Cp)₂HfBu₂, Rac/meso-ⁱPr₄Si₂(3-Et₃SiCH₂Cp)₂HfBu₂, Rac/meso-Ph₄Si₂(3-Et₃SiCH₂Cp)₂HfBu₂, Rac/meso-Me₂Ph₂Si₂(3-Et₃SiCH₂Cp)₂HfBu₂, Rac/meso-Me₄Si₂(3-Cy₃SiCH₂Cp)₂HfBu₂, Rac/meso-Et₄Si₂(3-Cy₃SiCH₂Cp)₂HfBu₂, Rac/meso-ⁱPr₄Si₂(3-Cy₃SiCH₂Cp)₂HfBu₂, Rac/meso-Ph₄Si₂(3-Cy₃SiCH₂Cp)₂HfBu₂, Rac/meso-Me₂Ph₂Si₂(3-Cy₃SiCH₂Cp)₂HfBu₂, Rac/meso-Me₄Si₂(3-Me₂PhSiCH₂Cp)₂HfBu₂, Rac/meso-Et₄Si₂(3-Me₂PhSiCH₂Cp)₂HfBu₂, Rac/meso-ⁱPr₄Si₂(3-Me₂PhSiCH₂Cp)₂HfBu₂, Rac/meso-Ph₄Si₂(3-Me₂PhSiCH₂Cp)₂HfBu₂, Rac/meso-Me₂Ph₂Si₂(3-Me₂PhSiCH₂Cp)₂HfBu₂, Rac/meso-Me₄Si₂(3-MePh₂SiCH₂Cp)₂HfBu₂, Rac/meso-Et₄Si₂(3-MePh₂SiCH₂Cp)₂HfBu₂, Rac/meso-ⁱPr₄Si₂(3-MePh₂SiCH₂Cp)₂HfBu₂, Rac/meso-Ph₄Si₂(3-MePh₂SiCH₂Cp)₂HfBu₂, Rac/meso-Me₂Ph₂Si₂(3-MePh₂SiCH₂Cp)₂HfBu₂, Rac/meso-Me₄Si₂(3-Ph₃SiCH₂Cp)₂HfBu₂, Rac/meso-Et₄Si₂(3-Ph₃SiCH₂Cp)₂HfBu₂, Rac/meso-ⁱPr₄Si₂(3-Ph₃SiCH₂Cp)₂HfBu₂, Rac/meso-Ph₄Si₂(3-Ph₃SiCH₂Cp)₂HfBu₂, Rac/meso-Me₂Ph₂Si₂(3-Ph₃SiCH₂Cp)₂HfBu₂, Me₄Si₂(2,3,4,5-Me₄Cp)(3-Me₃SiCH₂Cp)HfBu₂, Et₄Si₂(2,3,4,5-Me₄Cp)(3-Me₃SiCH₂Cp)HfBu₂, ⁱPr₄Si₂(2,3,4,5-Me₄Cp)(3-Me₃SiCH₂Cp)HfBu₂, Ph₄Si₂(2,3,4,5-Me₄Cp)(3-Me₃SiCH₂Cp)HfBu₂, Me₂Ph₂Si₂(2,3,4,5-Me₄Cp)(3-Me₃SiCH₂Cp)HfBu₂, Me₄Si₂(2,3,4,5-Me₄Cp)(3-Et₃SiCH₂Cp)HfBu₂, Et₄Si₂(2,3,4,5-Me₄Cp)(3-Et₃SiCH₂Cp)HfBu₂, ⁱPr₄Si₂(2,3,4,5-Me₄Cp)(3-Et₃SiCH₂Cp)HfBu₂, Ph₄Si₂(2,3,4,5-Me₄Cp)(3-Et₃SiCH₂Cp)HfBu₂, Me₂Ph₂Si₂(2,3,4,5-Me₄Cp)(3-Et₃SiCH₂Cp)HfBu₂, Me₄Si₂(2,3,4,5-Me₄Cp)(3-Cy₃SiCH₂Cp)HfBu₂, Et₄Si₂(2,3,4,5-Me₄Cp)(3-Cy₃SiCH₂Cp)HfBu₂, ⁱPr₄Si₂(2,3,4,5-Me₄Cp)(3-Cy₃SiCH₂Cp)HfBu₂, Ph₄Si₂(2,3,4,5-Me₄Cp)(3-Cy₃SiCH₂Cp)HfBu₂, Me₂Ph₂Si₂(2,3,4,5-Me₄Cp)(3-Cy₃SiCH₂Cp)HfBu₂, Me₄Si₂(2,3,4,5-Me₄Cp)(3-Me₂PhSiCH₂Cp)HfBu₂, Et₄Si₂(2,3,4,5-Me₄Cp)(3-Me₂PhSiCH₂Cp)HfBu₂, ⁱPr₄Si₂(2,3,4,5-Me₄Cp)(3-Me₂PhSiCH₂Cp)HfBu₂, Ph₄Si₂(2,3,4,5-Me₄Cp)(3-Me₂PhSiCH₂Cp)HfBu₂, Me₂Ph₂Si₂(2,3,4,5-Me₄Cp)(3-Me₂PhSiCH₂Cp)HfBu₂, Me₄Si₂(2,3,4,5-Me₄Cp)(3-MePh₂SiCH₂Cp)HfBu₂, Et₄Si₂(2,3,4,5-Me₄Cp)(3-MePh₂SiCH₂Cp)HfBu₂, ⁱPr₄Si₂(2,3,4,5-Me₄Cp)(3-MePh₂SiCH₂Cp)HfBu₂, Ph₄Si₂(2,3,4,5-Me₄Cp)(3-MePh₂SiCH₂Cp)HfBu₂, Me₂Ph₂Si₂(2,3,4,5-Me₄Cp)(3-MePh₂SiCH₂Cp)HfBu₂, Me₄Si₂(2,3,4,5-Me₄Cp)(3-Ph₃SiCH₂Cp)HfBu₂, Et₄Si₂(2,3,4,5-Me₄Cp)(3-Ph₃SiCH₂Cp)HfBu₂, ⁱPr₄Si₂(2,3,4,5-Me₄Cp)(3-Ph₃SiCH₂Cp)HfBu₂, Ph₄Si₂(2,3,4,5-Me₄Cp)(3-Ph₃SiCH₂Cp)HfBu₂, Me₂Ph₂Si₂(2,3,4,5-Me₄Cp)(3-Ph₃SiCH₂Cp)HfBu₂, Me₄Si₂(Cp)(3-Me₃SiCH₂Cp)HfBu₂, Et₄Si₂(Cp)(3-Me₃SiCH₂Cp)HfBu₂, ⁱPr₄Si₂(Cp)(3-Me₃SiCH₂Cp)HfBu₂, Ph₄Si₂(Cp)(3-Me₃SiCH₂Cp)HfBu₂, Me₂Ph₂Si₂(Cp)(3-Me₃SiCH₂Cp)HfBu₂, Me₄Si₂(Cp)(3-Et₃SiCH₂Cp)HfBu₂, Et₄Si₂(Cp)(3-Et₃SiCH₂Cp)HfBu₂, ⁱPr₄Si₂(Cp)(3-Et₃SiCH₂Cp)HfBu₂, Ph₄Si₂(Cp)(3-Et₃SiCH₂Cp)HfBu₂, Me₂Ph₂Si₂(Cp)(3-Et₃SiCH₂Cp)HfBu₂, Me₄Si₂(Cp)(3-Cy₃SiCH₂Cp)HfBu₂, Et₄Si₂(Cp)(3-Cy₃SiCH₂Cp)HfBu₂, ⁱPr₄Si₂(Cp)(3-Cy₃SiCH₂Cp)HfBu₂, Ph₄Si₂(Cp)(3-Cy₃SiCH₂Cp)HfBu₂, Me₂Ph₂Si₂(Cp)(3-Cy₃SiCH₂Cp)HfBu₂, Me₄Si₂(Cp)(3-Me₂PhSiCH₂Cp)HfBu₂, Et₄Si₂(Cp)(3-Me₂PhSiCH₂Cp)HfBu₂, ⁱPr₄Si₂(Cp)(3-Me₂PhSiCH₂Cp)HfBu₂, Ph₄Si₂(Cp)(3-Me₂PhSiCH₂Cp)HfBu₂, Me₂Ph₂Si₂(Cp)(3-Me₂PhSiCH₂Cp)HfBu₂, MePh₂SiCH₂Cp)HfBu₂, Me₄Si₂(Cp)(3-Ph₃SiCH₂Cp)HfBu₂, Et₄Si₂(Cp)(3-Ph₃SiCH₂Cp)HfBu₂, ⁱPr₄Si₂(Cp)(3-Ph₃SiCH₂Cp)HfBu₂, Ph₄Si₂(Cp)(3-Ph₃SiCH₂Cp)HfBu₂, Me₂Ph₂Si₂(Cp)(3-Ph₃SiCH₂Cp)HfBu₂, Rac/meso-Me₄Si₂(3-Me₃SiCH₂Cp)(3-Et₃SiCH₂Cp)HfBu₂, Rac/meso-Et₄Si₂(3-Me₃SiCH₂Cp)(3-Et₃SiCH₂Cp)HfBu₂, Rac/meso-ⁱPr₄Si₂(3-Me₃SiCH₂Cp)(3-Et₃SiCH₂Cp)HfBu₂, Rac/meso-Ph₄Si₂

(3-Me₃SiCH₂Cp)(3-Et₃SiCH₂Cp)HfBu₂, Rac/meso-Me₂Ph₂Si₂(3-Me₃SiCH₂Cp)(3-Et₃SiCH₂Cp)HfBu₂, Rac/meso-Me₄Si₂(3-Et₃SiCH₂Cp)(3-Cy₃SiCH₂Cp)HfBu₂, Rac/meso-Et₄Si₂(3-Et₃SiCH₂Cp)(3-Cy₃SiCH₂Cp)HfBu₂, Rac/meso-$^i$Pr₄Si₂(3-Et₃SiCH₂Cp)(3-Cy₃SiCH₂Cp)HfBu₂, Rac/meso-Ph₄Si₂(3-Et₃SiCH₂Cp)(3-Cy₃SiCH₂Cp)HfBu₂, Rac/meso-Me₂Ph₂Si₂(3-Et₃SiCH₂Cp)(3-Cy₃SiCH₂Cp)HfBu₂, Rac/meso-Me₄Si₂(3-Cy₃SiCH₂Cp)(3-Me₂PhSiCH₂Cp)HfBu₂, Rac/meso-Et₄Si₂(3-Cy₃SiCH₂Cp)(3-Me₂PhSiCH₂Cp)HfBu₂, Rac/meso-$^i$Pr₄Si₂(3-Cy₃SiCH₂Cp)(3-Me₂PhSiCH₂Cp)HfBu₂, Rac/meso-Ph₄Si₂(3-Cy₃SiCH₂Cp)(3-Me₂PhSiCH₂Cp)HfBu₂, Rac/meso-Me₂Ph₂Si₂(3-Cy₃SiCH₂Cp)(3-Me₂PhSiCH₂Cp)HfBu₂, Rac/meso-Me₄Si₂(3-Me₂PhSiCH₂Cp)(3-MePh₂SiCH₂Cp)HfBu₂, Rac/meso-Et₄Si₂(3-Me₂PhSiCH₂Cp)(3-MePh₂SiCH₂Cp)HfBu₂, Rac/meso-$^i$Pr₄Si₂(3-Me₂PhSiCH₂Cp)(3-MePh₂SiCH₂Cp)HfBu₂, Rac/meso-Ph₄Si₂(3-Me₂PhSiCH₂Cp)(3-MePh₂SiCH₂Cp)HfBu₂, Rac/meso-Me₂Ph₂Si₂(3-Me₂PhSiCH₂Cp)(3-MePh₂SiCH₂Cp)HfBu₂, Rac/meso-Me₄Si₂(3-MePh₂SiCH₂Cp)(3-Ph₃SiCH₂Cp)HfBu₂, Rac/meso-Et₄Si₂(3-MePh₂SiCH₂Cp)(3-Ph₃SiCH₂Cp)HfBu₂, Rac/meso-$^i$Pr₄Si₂(3-MePh₂SiCH₂Cp)(3-Ph₃SiCH₂Cp)HfBu₂, Rac/meso-Ph₄Si₂(3-MePh₂SiCH₂Cp)(3-Ph₃SiCH₂Cp)HfBu₂, Rac/meso-Me₂Ph₂Si₂(3-MePh₂SiCH₂Cp)(3-Ph₃SiCH₂Cp)HfBu₂, Rac/meso-Me₄Si₂(3-Ph₃SiCH₂Cp)₂HfBu₂, Rac/meso-Et₄Si₂(3-Ph₃SiCH₂Cp)₂HfBu₂, Rac/meso-$^i$Pr₄Si₂(3-Ph₃SiCH₂Cp)₂HfBu₂, Rac/meso-Ph₄Si₂(3-Ph₃SiCH₂Cp)₂HfBu₂ and Rac/meso-Me₂Ph₂Si₂(3-Ph₃SiCH₂Cp)₂HfBu₂.

In at least one embodiment, the catalyst compound represented by formula (I) is selected from: Rac/meso-Me₄Si₂(3-Me₃SiCH₂Cp)₂HfPh₂, Rac/meso-Et₄Si₂(3-Me₃SiCH₂Cp)₂HfPh₂, Rac/meso-$^i$Pr₄Si₂(3-Me₃SiCH₂Cp)₂HfPh₂, Rac/meso-Ph₄Si₂(3-Me₃SiCH₂Cp)₂HfPh₂, Rac/meso-Me₂Ph₂Si₂(3-Me₃SiCH₂Cp)₂HfPh₂, Rac/meso-Me₄Si₂(3-Et₃SiCH₂Cp)₂HfPh₂, Rac/meso-Et₄Si₂(3-Et₃SiCH₂Cp)₂HfPh₂, Rac/meso-$^i$Pr₄Si₂(3-Et₃SiCH₂Cp)₂HfPh₂, Rac/meso-Ph₄Si₂(3-Et₃SiCH₂Cp)₂HfPh₂, Rac/meso-Me₂Ph₂Si₂(3-Et₃SiCH₂Cp)₂HfPh₂, Rac/meso-Me₄Si₂(3-Cy₃SiCH₂Cp)₂HfPh₂, Rac/meso-Et₄Si₂(3-Cy₃SiCH₂Cp)₂HfPh₂, Rac/meso-$^i$Pr₄Si₂(3-Cy₃SiCH₂Cp)₂HfPh₂, Rac/meso-Ph₄Si₂(3-Cy₃SiCH₂Cp)₂HfPh₂, Rac/meso-Me₂Ph₂Si₂(3-Cy₃SiCH₂Cp)₂HfPh₂, Rac/meso-Me₄Si₂(3-Me₂PhSiCH₂Cp)₂HfPh₂, Rac/meso-Et₄Si₂(3-Me₂PhSiCH₂Cp)₂HfPh₂, Rac/meso-$^i$Pr₄Si₂(3-Me₂PhSiCH₂Cp)₂HfPh₂, Rac/meso-Ph₄Si₂(3-Me₂PhSiCH₂Cp)₂HfPh₂, Rac/meso-Me₂Ph₂Si₂(3-Me₂PhSiCH₂Cp)₂HfPh₂, Rac/meso-Me₄Si₂(3-MePh₂SiCH₂Cp)₂HfPh₂, Rac/meso-Et₄Si₂(3-MePh₂SiCH₂Cp)₂HfPh₂, Rac/meso-$^i$Pr₄Si₂(3-MePh₂SiCH₂Cp)₂HfPh₂, Rac/meso-Ph₄Si₂(3-MePh₂SiCH₂Cp)₂HfPh₂, Rac/meso-Me₂Ph₂Si₂(3-MePh₂SiCH₂Cp)₂HfPh₂, Rac/meso-Me₄Si₂(3-Ph₃SiCH₂Cp)₂HfPh₂, Rac/meso-Et₄Si₂(3-Ph₃SiCH₂Cp)₂HfPh₂, Rac/meso-$^i$Pr₄Si₂(3-Ph₃SiCH₂Cp)₂HfPh₂, Rac/meso-Ph₄Si₂(3-Ph₃SiCH₂Cp)₂HfPh₂, Rac/meso-Me₂Ph₂Si₂(3-Ph₃SiCH₂Cp)₂HfPh₂, Me₄Si₂(2,3,4,5-Me₄Cp)(3-Me₃SiCH₂Cp)HfPh₂, Et₄Si₂(2,3,4,5-Me₄Cp)(3-Me₃SiCH₂Cp)HfPh₂, $^i$Pr₄Si₂(2,3,4,5-Me₄Cp)(3-Me₃SiCH₂Cp)HfPh₂, Ph₄Si₂(2,3,4,5-Me₄Cp)(3-Me₃SiCH₂Cp)HfPh₂, Me₂Ph₂Si₂(2,3,4,5-Me₄Cp)(3-Me₃SiCH₂Cp)HfPh₂, Me₄Si₂(2,3,4,5-Me₄Cp)(3-Et₃SiCH₂Cp)HfPh₂, Et₄Si₂(2,3,4,5-Me₄Cp)(3-Et₃SiCH₂Cp)HfPh₂, $^i$Pr₄Si₂(2,3,4,5-Me₄Cp)(3-Et₃SiCH₂Cp)HfPh₂, Ph₄Si₂(2,3,4,5-Me₄Cp)(3-Et₃SiCH₂Cp)HfPh₂, Me₂Ph₂Si₂(2,3,4,5-Me₄Cp)(3-Et₃SiCH₂Cp)HfPh₂, Me₄Si₂(2,3,4,5-Me₄Cp)(3-Cy₃SiCH₂Cp)HfPh₂, Et₄Si₂(2,3,4,5-Me₄Cp)(3-Cy₃SiCH₂Cp)HfPh₂, $^i$Pr₄Si₂(2,3,4,5-Me₄Cp)(3-Cy₃SiCH₂Cp)HfPh₂, Ph₄Si₂(2,3,4,5-Me₄Cp)(3-Cy₃SiCH₂Cp)HfPh₂, Me₂Ph₂Si₂(2,3,4,5-Me₄Cp)(3-Cy₃SiCH₂Cp)HfPh₂, Me₄Si₂(2,3,4,5-Me₄Cp)(3-Me₂PhSiCH₂Cp)HfPh₂, Et₄Si₂(2,3,4,5-Me₄Cp)(3-Me₂PhSiCH₂Cp)HfPh₂, $^i$Pr₄Si₂(2,3,4,5-Me₄Cp)(3-Me₂PhSiCH₂Cp)HfPh₂, Ph₄Si₂(2,3,4,5-Me₄Cp)(3-Me₂PhSiCH₂Cp)HfPh₂, Me₂Ph₂Si₂(2,3,4,5-Me₄Cp)(3-Me₂PhSiCH₂Cp)HfPh₂, Me₄Si₂(2,3,4,5-Me₄Cp)(3-MePh₂SiCH₂Cp)HfPh₂, Et₄Si₂(2,3,4,5-Me₄Cp)(3-MePh₂SiCH₂Cp)HfPh₂, $^i$Pr₄Si₂(2,3,4,5-Me₄Cp)(3-MePh₂SiCH₂Cp)HfPh₂, Ph₄Si₂(2,3,4,5-Me₄Cp)(3-MePh₂SiCH₂Cp)HfPh₂, Me₂Ph₂Si₂(2,3,4,5-Me₄Cp)(3-MePh₂SiCH₂Cp)HfPh₂, Me₄Si₂(2,3,4,5-Me₄Cp)(3-Ph₃SiCH₂Cp)HfPh₂, Et₄Si₂(2,3,4,5-Me₄Cp)(3-Ph₃SiCH₂Cp)HfPh₂, $^i$Pr₄Si₂(2,3,4,5-Me₄Cp)(3-Ph₃SiCH₂Cp)HfPh₂, Ph₄Si₂(2,3,4,5-Me₄Cp)(3-Ph₃SiCH₂Cp)HfPh₂, Me₂Ph₂Si₂(2,3,4,5-Me₄Cp)(3-Ph₃SiCH₂Cp)HfPh₂, Me₄Si₂(Cp)(3-Me₃SiCH₂Cp)HfPh₂, Et₄Si₂(Cp)(3-Me₃SiCH₂Cp)HfPh₂, $^i$Pr₄Si₂(Cp)(3-Me₃SiCH₂Cp)HfPh₂, Ph₄Si₂(Cp)(3-Me₃SiCH₂Cp)HfPh₂, Me₂Ph₂Si₂(Cp)(3-Me₃SiCH₂Cp)HfPh₂, Me₄Si₂(Cp)(3-Et₃SiCH₂Cp)HfPh₂, Et₄Si₂(Cp)(3-Et₃SiCH₂Cp)HfPh₂, $^i$Pr₄Si₂(Cp)(3-Et₃SiCH₂Cp)HfPh₂, Ph₄Si₂(Cp)(3-Et₃SiCH₂Cp)HfPh₂, Me₂Ph₂Si₂(Cp)(3-Et₃SiCH₂Cp)HfPh₂, Me₄Si₂(Cp)(3-Cy₃SiCH₂Cp)HfPh₂, Et₄Si₂(Cp)(3-Cy₃SiCH₂Cp)HfPh₂, $^i$Pr₄Si₂(Cp)(3-Cy₃SiCH₂Cp)HfPh₂, Ph₄Si₂(Cp)(3-Cy₃SiCH₂Cp)HfPh₂, Me₂Ph₂Si₂(Cp)(3-Cy₃SiCH₂Cp)HfMe₂, Me₄Si₂(Cp)(3-Me₂PhSiCH₂Cp)HfMe₂, Et₄Si₂(Cp)(3-Me₂PhSiCH₂Cp)HfPh₂, $^i$Pr₄Si₂(Cp)(3-Me₂PhSiCH₂Cp)HfPh₂, Ph₄Si₂(Cp)(3-Me₂PhSiCH₂Cp)HfPh₂, Me₂Ph₂Si₂(Cp)(3-Me₂PhSiCH₂Cp)HfPh₂, MePh₂SiCH₂Cp)HfPh₂, Me₄Si₂(Cp)(3-Ph₃SiCH₂Cp)HfPh₂, Et₄Si₂(Cp)(3-Ph₃SiCH₂Cp)HfPh₂, $^i$Pr₄Si₂(Cp)(3-Ph₃SiCH₂Cp)HfPh₂, Ph₄Si₂(Cp)(3-Ph₃SiCH₂Cp)HfPh₂, Me₂Ph₂Si₂(Cp)(3-Ph₃SiCH₂Cp)HfPh₂, Rac/meso-Me₄Si₂(3-Me₃SiCH₂Cp)(3-Et₃SiCH₂Cp)HfPh₂, Rac/meso-Et₄Si₂(3-Me₃SiCH₂Cp)(3-Et₃SiCH₂Cp)HfPh₂, Rac/meso-$^i$Pr₄Si₂(3-Me₃SiCH₂Cp)(3-Et₃SiCH₂Cp)HfPh₂, Rac/meso-Ph₄Si₂(3-Me₃SiCH₂Cp)(3-Et₃SiCH₂Cp)HfPh₂, Rac/meso-Me₂Ph₂Si₂(3-Me₃SiCH₂Cp)(3-Et₃SiCH₂Cp)HfPh₂, Rac/meso-Me₄Si₂(3-Et₃SiCH₂Cp)(3-Cy₃SiCH₂Cp)HfPh₂, Rac/meso-Et₄Si₂(3-Et₃SiCH₂Cp)(3-Cy₃SiCH₂Cp)HfPh₂, Rac/meso-$^i$Pr₄Si₂(3-Et₃SiCH₂Cp)(3-Cy₃SiCH₂Cp)HfPh₂, Rac/meso-Ph₄Si₂(3-Et₃SiCH₂Cp)(3-Cy₃SiCH₂Cp)HfPh₂, Rac/meso-Me₂Ph₂Si₂(3-Et₃SiCH₂Cp)(3-Cy₃SiCH₂Cp)HfPh₂, Rac/meso-Me₄Si₂(3-Cy₃SiCH₂Cp)(3-Me₂PhSiCH₂Cp)HfPh₂, Rac/meso-Et₄Si₂(3-Cy₃SiCH₂Cp)(3-Me₂PhSiCH₂Cp)HfPh₂, Rac/meso-$^i$Pr₄Si₂(3-Cy₃SiCH₂Cp)(3-Me₂PhSiCH₂Cp)HfPh₂, Rac/meso-Ph₄Si₂(3-Cy₃SiCH₂Cp)(3-Me₂PhSiCH₂Cp)HfPh₂, Rac/meso-Me₂Ph₂Si₂(3-Cy₃SiCH₂Cp)(3-Me₂PhSiCH₂Cp)HfPh₂, Rac/meso-Me₄Si₂(3-Me₂PhSiCH₂Cp)(3-MePh₂SiCH₂Cp)HfPh₂, Rac/meso-Et₄Si₂(3-Me₂PhSiCH₂Cp)(3-MePh₂SiCH₂Cp)HfPh₂, Rac/meso-$^i$Pr₄Si₂(3-Me₂PhSiCH₂Cp)(3-MePh₂SiCH₂Cp)HfPh₂, Rac/meso-Ph₄Si₂(3-Me₂PhSiCH₂Cp)(3-MePh₂SiCH₂Cp)HfPh₂, Rac/meso-Me₂Ph₂Si₂(3-Me₂PhSiCH₂Cp)(3-MePh₂SiCH₂Cp)HfPh₂, Rac/meso-Me₄Si₂(3-MePh₂SiCH₂Cp)(3-Ph₃SiCH₂Cp)HfPh₂, Rac/meso-Et₄Si₂(3-MePh₂SiCH₂Cp)(3-Ph₃SiCH₂Cp)HfPh₂, Rac/meso-$^i$Pr₄Si₂(3-MePh₂SiCH₂Cp)(3-Ph₃SiCH₂Cp)HfPh₂, Rac/meso-Ph₄Si₂(3-MePh₂SiCH₂Cp)(3-Ph₃SiCH₂Cp)HfPh₂, Rac/meso- Me₂Ph₂Si₂(3-MePh₂SiCH₂Cp)(3-Ph₃SiCH₂Cp)HfPh₂, Rac/meso-Me₄Si₂(3-Ph₃SiCH₂Cp)₂HfPh₂, Rac/meso-Et₄Si₂(3-Ph₃SiCH₂Cp)₂HfPh₂, Rac/meso-$^i$Pr₄Si₂(3-Ph₃SiCH₂Cp)₂HfPh₂, Rac/meso-Ph₄Si₂(3-Ph₃SiCH₂Cp)₂HfPh₂ and Rac/meso-Me₂Ph₂Si₂(3-Ph₃SiCH₂Cp)₂HfPh₂.

In at least one embodiment, the catalyst compound represented by formula (I) is selected from: Rac/meso-Me₄Si₂(3-Me₃SiCH₂Cp)₂HfBn₂, Rac/meso-Et₄Si₂(3-Me₃SiCH₂Cp)₂HfBn₂, Rac/meso-$^i$Pr₄Si₂(3-Me₃SiCH₂Cp)₂HfBn₂, Rac/meso-Ph₄Si₂(3-Me₃SiCH₂Cp)₂HfBn₂, Rac/meso-Me₂Ph₂Si₂(3-Me₃SiCH₂Cp)₂HfBn₂, Rac/meso-Me₄Si₂(3-Et₃SiCH₂Cp)₂HfBn₂, Rac/meso-Et₄Si₂(3-Et₃SiCH₂Cp)₂HfBn₂, Rac/meso-$^i$Pr₄Si₂(3-Et₃SiCH₂Cp)₂HfBn₂, Rac/meso-Ph₄Si₂(3-Et₃SiCH₂Cp)₂HfBn₂, Rac/meso-Me₂Ph₂Si₂(3-Et₃SiCH₂Cp)₂HfBn₂, Rac/meso-Me₄Si₂(3-Cy₃SiCH₂Cp)₂HfBn₂, Rac/meso-Et₄Si₂(3-Cy₃SiCH₂Cp)₂HfBn₂, Rac/meso-$^i$Pr₄Si₂(3-Cy₃SiCH₂Cp)₂HfBn₂, Rac/meso-Ph₄Si₂(3-Cy₃SiCH₂Cp)₂HfBn₂, Rac/meso-Me₂Ph₂Si₂(3-Cy₃SiCH₂Cp)₂HfBn₂, Rac/meso-Me₄Si₂(3-Me₂PhSiCH₂Cp)₂HfBn₂, Rac/meso-Et₄Si₂(3-Me₂PhSiCH₂Cp)₂HfBn₂, Rac/meso-$^i$Pr₄Si₂(3-Me₂PhSiCH₂Cp)₂HfBn₂, Rac/meso-Ph₄Si₂(3-Me₂PhSiCH₂Cp)₂HfBn₂, Rac/meso-Me₂Ph₂Si₂(3-Me₂PhSiCH₂Cp)₂HfBn₂, Rac/meso-Me₄Si₂(3-MePh₂SiCH₂Cp)₂HfBn₂, Rac/meso-Et₄Si₂(3-MePh₂SiCH₂Cp)₂HfBn₂, Rac/meso-$^i$Pr₄Si₂(3-MePh₂SiCH₂Cp)₂HfBn₂, Rac/meso-Ph₄Si₂(3-MePh₂SiCH₂Cp)₂HfBn₂, Rac/meso-Me₂Ph₂Si₂(3-MePh₂SiCH₂Cp)₂HfBn₂, Rac/meso-Me₄Si₂(3-Ph₃SiCH₂Cp)₂HfBn₂, Rac/meso-Et₄Si₂(3-Ph₃SiCH₂Cp)₂HfBn₂, Rac/meso-$^i$Pr₄Si₂(3-Ph₃SiCH₂Cp)₂HfBn₂, Rac/meso-Ph₄Si₂(3-Ph₃SiCH₂Cp)₂HfBn₂, Rac/meso-Me₂Ph₂Si₂(3-Ph₃SiCH₂Cp)₂HfBn₂, Me₄Si₂(2,3,4,5-Me₄Cp)(3-Me₃SiCH₂Cp)HfBn₂, Et₄Si₂(2,3,4,5-Me₄Cp)(3-Me₃SiCH₂Cp)HfBn₂, $^i$Pr₄Si₂(2,3,4,5-Me₄Cp)(3-Me₃SiCH₂Cp)HfBn₂, Ph₄Si₂(2,3,4,5-Me₄Cp)(3-Me₃SiCH₂Cp)HfBn₂, Me₂Ph₂Si₂(2,3,4,5-Me₄Cp)(3-Me₃SiCH₂Cp)HfBn₂, Me₄Si₂(2,3,4,5-Me₄Cp)(3-Et₃SiCH₂Cp)HfBn₂, Et₄Si₂(2,3,4,5-Me₄Cp)(3-Et₃SiCH₂Cp)HfBn₂, $^i$Pr₄Si₂(2,3,4,5-Me₄Cp)(3-Et₃SiCH₂Cp)HfBn₂, Ph₄Si₂(2,3,4,5-Me₄Cp)(3-Et₃SiCH₂Cp)HfBn₂, Me₂Ph₂Si₂(2,3,4,5-Me₄Cp)(3-Et₃SiCH₂Cp)HfBn₂, Me₄Si₂(2,3,4,5-Me₄Cp)(3-Cy₃SiCH₂Cp)HfBn₂, Et₄Si₂(2,3,4,5-Me₄Cp)(3-Cy₃SiCH₂Cp)HfBn₂, $^i$Pr₄Si₂(2,3,4,5-Me₄Cp)(3-Cy₃SiCH₂Cp)HfBn₂, Ph₄Si₂(2,3,4,5-Me₄Cp)(3-Cy₃SiCH₂Cp)HfBn₂, Me₂Ph₂Si₂(2,3,4,5-Me₄Cp)(3-Cy₃SiCH₂Cp)HfBn₂, Me₄Si₂(2,3,4,5-Me₄Cp)(3-Me₂PhSiCH₂Cp)HfBn₂, Et₄Si₂(2,3,4,5-Me₄Cp)(3-Me₂PhSiCH₂Cp)HfBn₂, $^i$Pr₄Si₂(2,3,4,5-Me₄Cp)(3-Me₂PhSiCH₂Cp)HfBn₂, Ph₄Si₂(2,3,4,5-Me₄Cp)(3-Me₂PhSiCH₂Cp)HfBn₂, Me₂Ph₂Si₂(2,3,4,5-Me₄Cp)(3-Me₂PhSiCH₂Cp)HfBn₂, Me₄Si₂(2,3,4,5-Me₄Cp)(3-MePh₂SiCH₂Cp)HfBn₂, Et₄Si₂(2,3,4,5-Me₄Cp)(3-MePh₂SiCH₂Cp)HfBn₂, $^i$Pr₄Si₂(2,3,4,5-Me₄Cp)(3-MePh₂SiCH₂Cp)HfBn₂, Ph₄Si₂(2,3,4,5-Me₄Cp)(3-MePh₂SiCH₂Cp)HfBn₂, Me₂Ph₂Si₂(2,3,4,5-Me₄Cp)(3-MePh₂SiCH₂Cp)HfBn₂, Me₄Si₂(2,3,4,5-Me₄Cp)(3-Ph₃SiCH₂Cp)HfBn₂, Et₄Si₂(2,3,4,5-Me₄Cp)(3-Ph₃SiCH₂Cp)HfBn₂, $^i$Pr₄Si₂(2,3,4,5-Me₄Cp)(3-Ph₃SiCH₂Cp)HfBn₂, Ph₄Si₂(2,3,4,5-Me₄Cp)(3-Ph₃SiCH₂Cp)HfBn₂, Me₂Ph₂Si₂(2,3,4,5-Me₄Cp)(3-Ph₃SiCH₂Cp)HfBn₂, Me₄Si₂(Cp)(3-Me₃SiCH₂Cp)HfBn₂, Et₄Si₂(Cp)(3-Me₃SiCH₂Cp)HfBn₂, $^i$Pr₄Si₂(3-Me₃SiCH₂Cp)HfBn₂, Ph₄Si₂(Cp)(3-Me₃SiCH₂Cp)HfBn₂, Me₂Ph₂Si₂(Cp)(3-Me₃SiCH₂Cp)HfBn₂, Me₄Si₂(Cp)(3-Et₃SiCH₂Cp)HfBn₂, Et₄Si₂(Cp)(3-Et₃SiCH₂Cp)HfBn₂, $^i$Pr₄Si₂(Cp)(3-Et₃SiCH₂Cp)HfBn₂, Ph₄Si₂(Cp)(3-Et₃SiCH₂Cp)HfBn₂, Me₂Ph₂Si₂(Cp)(3-Et₃SiCH₂Cp)HfBn₂, Me₄Si₂(Cp)(3-Cy₃SiCH₂Cp)HfBn₂, Et₄Si₂(Cp)(3-Cy₃SiCH₂Cp)HfBn₂, $^i$Pr₄Si₂(Cp)(3-Cy₃SiCH₂Cp)HfBn₂, Ph₄Si₂(Cp)(3-Cy₃SiCH₂Cp)HfBn₂, Me₂Ph₂Si₂(Cp)(3-Cy₃SiCH₂Cp)HfBn₂, Me₄Si₂(Cp)(3-Me₂PhSiCH₂Cp)HfBn₂, Et₄Si₂(Cp)(3-Me₂PhSiCH₂Cp)HfBn₂, $^i$Pr₄Si₂(Cp)(3-Me₂PhSiCH₂Cp)HfBn₂, Ph₄Si₂(Cp)(3-Me₂PhSiCH₂Cp)HfBn₂, Me₂Ph₂Si₂(Cp)(3-Me₂PhSiCH₂Cp)HfBn₂, Me₄Si₂(Cp)(3-MePh₂SiCH₂Cp)HfBn₂, Et₄Si₂(Cp)(3-MePh₂SiCH₂Cp)HfBn₂, $^i$Pr₄Si₂(Cp)(3-MePh₂SiCH₂Cp)HfBn₂, Ph₄Si₂(Cp)(3-MePh₂SiCH₂Cp)HfBn₂, Me₂Ph₂Si₂(Cp)(3-MePh₂SiCH₂Cp)HfBn₂, Me₄Si₂(Cp)(3-Ph₃SiCH₂Cp)HfBn₂, Et₄Si₂(Cp)(3-Ph₃SiCH₂Cp)HfBn₂, $^i$Pr₄Si₂(Cp)(3-Ph₃SiCH₂Cp)HfBn₂, Ph₄Si₂(Cp)(3-Ph₃SiCH₂Cp)HfBn₂, Me₂Ph₂Si₂(Cp)(3-Ph₃SiCH₂Cp)HfBn₂, Rac/meso-Me₄Si₂(3-Me₃SiCH₂Cp)(3-Et₃SiCH₂Cp)HfBn₂, Rac/meso-Et₄Si₂(3-Me₃SiCH₂Cp)(3-Et₃SiCH₂Cp)HfBn₂, Rac/meso-$^i$Pr₄Si₂(3-Me₃SiCH₂Cp)(3-Et₃SiCH₂Cp)HfBn₂, Rac/meso-Ph₄Si₂(3-Me₃SiCH₂Cp)(3-Et₃SiCH₂Cp)HfBn₂, Rac/meso-Me₂Ph₂Si₂(3-Me₃SiCH₂Cp)(3-Et₃SiCH₂Cp)HfBn₂, Rac/meso-Me₄Si₂(3-Et₃SiCH₂Cp)(3-Cy₃SiCH₂Cp)HfBn₂, Rac/meso-Et₄Si₂(3-Et₃SiCH₂Cp)(3-Cy₃SiCH₂Cp)HfBn₂, Rac/meso-$^i$Pr₄Si₂(3-Et₃SiCH₂Cp)(3-Cy₃SiCH₂Cp)HfBn₂, Rac/meso-Ph₄Si₂(3-Et₃SiCH₂Cp)(3-Cy₃SiCH₂Cp)HfBn₂, Rac/meso-Me₂Ph₂Si₂(3-Et₃SiCH₂Cp)(3-Cy₃SiCH₂Cp)HfBn₂, Rac/meso-Me₄Si₂(3-Cy₃SiCH₂Cp)(3-Me₂PhSiCH₂Cp)HfBn₂, Rac/meso-Et₄Si₂(3-Cy₃SiCH₂Cp)(3-Me₂PhSiCH₂Cp)HfBn₂, Rac/meso-$^i$Pr₄Si₂(3-Cy₃SiCH₂Cp)(3-Me₂PhSiCH₂Cp)HfBn₂, Rac/meso-Ph₄Si₂(3-Cy₃SiCH₂Cp)(3-Me₂PhSiCH₂Cp)HfBn₂, Rac/meso-Me₂Ph₂Si₂(3-Cy₃SiCH₂Cp)(3-Me₂PhSiCH₂Cp)HfBn₂, Rac/meso-Me₄Si₂(3-Me₂PhSiCH₂Cp)(3-MePh₂SiCH₂Cp)HfBn₂, Rac/meso-Et₄Si₂(3-Me₂PhSiCH₂Cp)(3-MePh₂SiCH₂Cp)HfBn₂, Rac/meso-$^i$Pr₄Si₂(3-Me₂PhSiCH₂Cp)(3-MePh₂SiCH₂Cp)HfBn₂, Rac/meso-Ph₄Si₂(3-Me₂PhSiCH₂Cp)(3-MePh₂SiCH₂Cp)HfBn₂, Rac/meso-Me₂Ph₂Si₂(3-Me₂PhSiCH₂Cp)(3-MePh₂SiCH₂Cp)HfBn₂, Rac/meso-Me₄Si₂(3-MePh₂SiCH₂Cp)(3-Ph₃SiCH₂Cp)HfBn₂, Rac/meso-Et₄Si₂(3-MePh₂SiCH₂Cp)(3-Ph₃SiCH₂Cp)HfBn₂, Rac/meso-$^i$Pr₄Si₂(3-MePh₂SiCH₂Cp)(3-Ph₃SiCH₂Cp)HfBn₂, Rac/meso-Ph₄Si₂(3-MePh₂SiCH₂Cp)(3-Ph₃SiCH₂Cp)HfBn₂, Rac/meso-Me₂Ph₂Si₂(3-MePh₂SiCH₂Cp)(3-Ph₃SiCH₂Cp)HfBn₂, Rac/meso-Me₄Si₂(3-Ph₃SiCH₂Cp)₂HfBn₂, Rac/meso-Et₄Si₂(3-Ph₃SiCH₂Cp)₂HfBn₂, Rac/meso-$^i$Pr₄Si₂(3-Ph₃SiCH₂Cp)₂HfBn₂, Rac/meso-Ph₄Si₂(3-Ph₃SiCH₂Cp)₂HfBn₂ and Rac/meso-Me₂Ph₂Si₂(3-Ph₃SiCH₂Cp)₂HfBn₂.

In at least one embodiment, the catalyst compound represented by formula (I) is selected from:

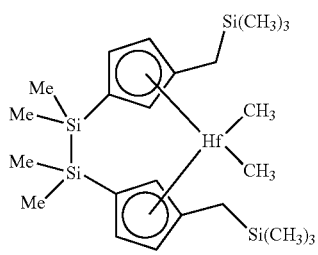

1

-continued

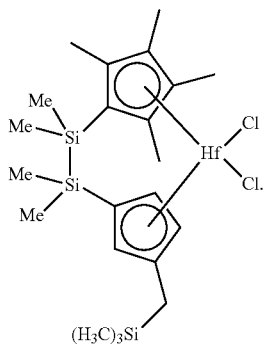
2

In at least one embodiment, the rac/meso ratio of the metallocene catalyst is from 99.9:0.1 to 0.11:99.9 such as 80:1 or greater, such as 70:1 or greater, such as 60:1 or greater, such as 50:1 or greater, such as 40:1 or greater, such as 30:1 or greater, such as 20:1 or greater, such as 15:1 or greater, such as 10:1 or greater, such as 7:1 or greater, such as 5:1 or greater.

In one aspect, an advantage is provided in that the separation of meso from rac isomers is not performed after synthesis of the catalysts of the present disclosure. In certain aspects, the meso isomer is formed in a ratio of 99.9:0.1 or greater than the rac isomer. Amounts of rac and meso isomers are determined by $^1$H NMR spectroscopy, and further atom connectivity can be established by single crystal X-ray crystallography.

In at least one embodiment, one catalyst compound is used, e.g., the catalyst compounds are not different. For purposes of the present disclosure, one metallocene catalyst compound is considered different from another if they differ by at least one atom. For example, "biscyclopentadienyl hafnium dichloride" is different from "(cyclopentadienyl) (2-methylcyclopentadienyl) hafnium dichloride" which is different from "(cyclopentadienyl)(2-methylcyclopentadienyl) zirconium dichloride." Catalyst compounds that differ only by isomer are considered the same for purposes of the present disclosure unless otherwise noted, e.g., rac-tetramethyldisilyl-bis(trimethylsilylmethylcyclopentadienyl) hafnium dimethyl is considered to be the same as meso-tetramethyldisilyl-bis(trimethylsilylmethylcyclopentadienyl) hafnium dimethyl.

In at least one embodiment, two or more different catalyst compounds are present in a catalyst system. In at least one embodiment, two or more different catalyst compounds are present in the reaction zone where the process(es) described herein occur. When two transition metal compound based catalysts are used in one reactor as a mixed catalyst system, the two transition metal compounds can be chosen such that the two are compatible. A simple screening method such as by $^1$H or $^{13}$C NMR, known to those of ordinary skill in the art, can be used to determine which transition metal compounds are compatible. The same activator can be used for the transition metal compounds, however, two different activators, such as a non-coordinating anion activator and an alumoxane, can be used in combination. If one or more transition metal compounds contain an $X^1$ or $X^2$ ligand which is not a hydride, hydrocarbyl, or substituted hydrocarbyl, then the alumoxane should be contacted with the transition metal compounds prior to addition of the non-coordinating anion activator.

The two transition metal compounds (pre-catalysts) may be used in any ratio. Molar ratios of (A) transition metal compound to (B) transition metal compound can be a range of (A:B) of from 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In at least one embodiment, when using the two pre-catalysts, where both are activated with the same activator, mole percents, based upon the molecular weight of the pre-catalysts, can be from 10% to 99.9% A to 0.1% to 90% B, alternatively 25% to 99% A to 0.5% to 75% B, alternatively 50% to 99% A to 1% to 50% B, and alternatively 75% to 99% A to 1% to 10% B.

Methods to Prepare the Catalyst Compounds

The following is a scheme illustrating one way to prepare the catalysts described herein and further exemplified in the examples. Generally, metallocenes of this type are synthesized as shown below where (i) is a deprotonation via a metal salt of alkyl anion (e.g., "BuLi) to form an cyclopentadienide; (ii) reaction of cyclopentadienide with an appropriate bridging precursor (e.g., ClMe$_2$SiSiMe$_2$Cl); (iii) double deprotonation via an alkyl anion (e.g., "BuLi) to form a dianion; (iv) reaction of the dianion with a metal halide (e.g., HfCl$_4$); (v) is an alkylation reaction with a Grignard reagent (e.g., Me$_3$MgBr); and (v). In at least one embodiment, the meso isomer is separated by recrystallization.

Scheme 1. Synthesis of meso isomer of hafnocene 1.

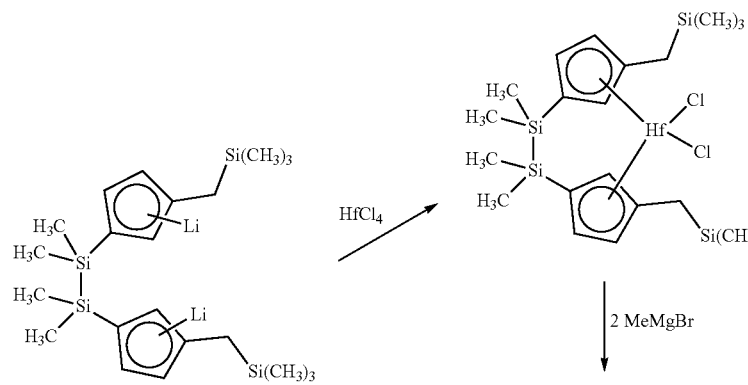

-continued

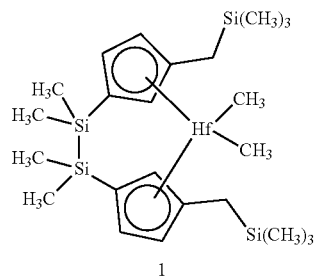

1

Scheme 2. Synthesis of asymmetric (C$_1$) hafnocene 2.

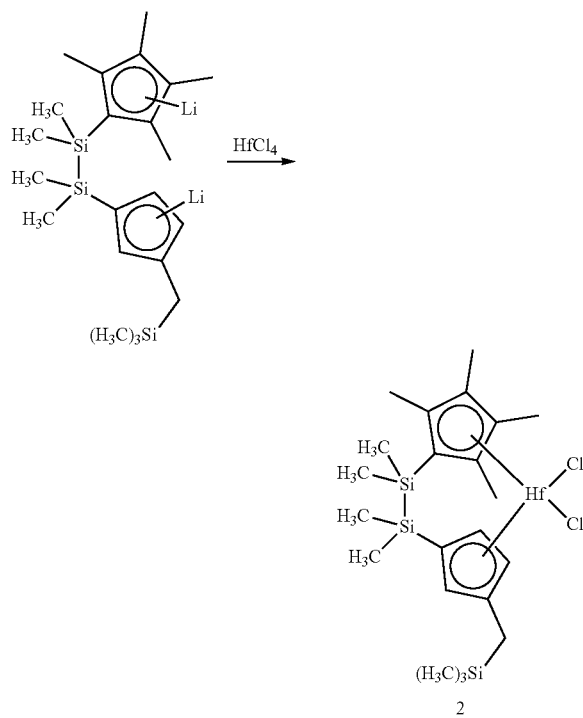

Activators

The terms "cocatalyst" and "activator" are used herein interchangeably and are defined to be any compound which can activate any one of the catalyst compounds described above by converting the neutral catalyst compound to a catalytically active catalyst compound cation.

After the complexes described above have been synthesized, catalyst systems may be formed by combining them with activators in any suitable manner including by supporting them for use in slurry or gas phase polymerization. The catalyst systems may also be added to or generated in solution polymerization or bulk polymerization (in the monomer). The catalyst system typically comprise a complex as described above and an activator such as alumoxane or a non-coordinating anion.

Non-limiting activators, for example, include alumoxanes, aluminum alkyls, ionizing activators, which may be neutral or ionic, and conventional-type cocatalysts. Activators can include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

Alumoxane Activators

In one embodiment, alumoxane activators are utilized as an activator in the catalyst system. Alumoxanes are generally oligomeric compounds containing —Al(R$^1$)—O— subunits, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584). Another useful alumoxane is solid polymethylaluminoxane as described in U.S. Pat. Nos. 9,340,630; 8,404,880; and 8,975,209. Aluminum alkyls are available as hydrocarbon solutions from commercial sources. Methylalumoxane ("MAO") is available from Albemarle as a 30 wt % solution in toluene.

When the activator is an alumoxane (modified or unmodified), at least one embodiment select the maximum amount of activator typically at up to a 5,000-fold molar excess Al/M over the catalyst compound (per metal catalytic site). The minimum activator-to-catalyst-compound is a 1:1 molar ratio. Alternate ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. For example, alumoxane is present at zero mole %, alternately the alumoxane is present at a molar ratio of aluminum to catalyst compound transition metal less than 500:1, such as less than 300:1, such as less than 100:1, such as less than 1:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

"Compatible" non-coordinating anions can be those which are not degraded to neutrality when the initially formed complex decomposes. Further, the anion might not transfer an anionic substituent or fragment to the cation so as to cause it to form a neutral transition metal compound and a neutral by-product from the anion. Non-coordinating anions can be those that are compatible, stabilize the transition metal cation in the sense of balancing its ionic charge at +1, and yet retain sufficient lability to permit displacement during polymerization.

It is within the scope of the present disclosure to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 1998/043983), boric acid (U.S. Pat. No. 5,942,459), or combination thereof. It is also within the scope of the present disclosure to use neutral or ionic activators alone or in combination with alumoxane or modified alumoxane activators.

The catalyst systems of the present disclosure can include at least one non-coordinating anion (NCA) activator. In at least one embodiment, boron containing NCA activators represented by the formula below can be used:

$$Z_d^+(A^{d-})$$

where: Z is (L-H) or a reducible Lewis acid; L is a neutral Lewis base; H is hydrogen; (L-H) is a Bronsted acid; $A^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, such as carboniums and ferroceniums. $Z_d^+$ can be triphenyl carbonium. Reducible Lewis acids can be any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl), such as the reducible Lewis acids in formula (14) above as "Z" include those represented by the formula: $(Ph_3C)$, where Ph is a substituted or unsubstituted phenyl, such as substituted with $C_1$ to $C_{40}$ hydrocarbyls or substituted a $C_1$ to $C_{40}$ hydrocarbyls, such as $C_1$ to $C_{20}$ alkyls or aromatics or substituted $C_1$ to $C_{20}$ alkyls or aromatics, such as Z is a triphenylcarbonium.

When $Z_d^+$ is the activating cation $(L-H)_d^+$, it can be a Bronsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (such as 1, 2, 3, or 4); n−k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Each Q can be a fluorinated hydrocarbyl group having 1 to 20 carbon atoms, such as each Q is a fluorinated aryl group, and such as each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst are the compounds described as (and particularly those specifically listed as) activators in U.S. Pat. No. 8,658,556, which is incorporated by reference herein.

The ionic stoichiometric activator $Z_d^+$ ($A^{d-}$) can be one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

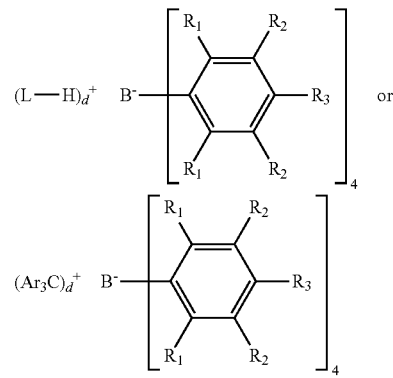

where:
each $R_1$ is independently a halide, such as a fluoride;
Ar is substituted or unsubstituted aryl group (preferably a substituted or unsubstituted phenyl), such as substituted with $C_1$ to $C_{40}$ hydrocarbyls, such as $C_1$ to $C_{20}$ alkyls or aromatics;
each $R_2$ is independently a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (such as $R_2$ is a fluoride or a perfluorinated phenyl group);

each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (such as $R_3$ is a fluoride or a $C_6$ perfluorinated aromatic hydrocarbyl group); wherein $R_2$ and $R_3$ can form one or more saturated or unsaturated, substituted or unsubstituted rings (such as $R_2$ and $R_3$ form a perfluorinated phenyl ring); and L is a neutral Lewis base; $(L-H)^+$ is a Bronsted acid; d is 1, 2, or 3;

wherein the anion has a molecular weight of greater than 1020 g/mol; and wherein at least three of the substituents on the B atom each have a molecular volume of greater than 250 cubic Å, alternately greater than 300 cubic Å, or alternately greater than 500 cubic Å.

For example, $(Ar_3C)_d^+$ can be $(Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in Girolami, Gregory S. (1994) "A Simple "Back of the Envelope" Method for Estimating the Densities and Molecular Volumes of Liquids and Solids," *Journal of Chemical Education*, v. 71(11), pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators please see U.S. Pat. No. 8,658,556, which is incorporated by reference herein.

In another embodiment, one or more of the NCA activators is chosen from the activators described in U.S. Pat. No. 6,211,105.

Exemplary activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Me_3NH^+][B(C_6F_5)_4^-]$, 1-(4-(tris(pentafluorophenyl)borate)-2,3,5,6-tetrafluorophenyl)pyrrolidinium, and tetrakis(pentafluorophenyl)borate, 4-(tris(pentafluorophenyl)borate)-2,3,5,6-tetrafluoropyridine.

In at least one embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, and triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, and di-(i-propyl)ammonium tetrakis(pentafluorophenyl)borate (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate ranges include from 0.1:1 to 100:1, alternately from 0.5:1 to 200:1, alternately from 1:1 to 500:1, alternately from 1:1 to 1000:1. A particularly useful range is from 0.5:1 to 10:1, such as 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 1994/007928; and WO 1995/014044 which discuss the use of an alumoxane in combination with an ionizing activator).

Useful chain transfer agents can be alkylalumoxanes, a compound represented by the formula $AlR_3$, $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Optional Support Materials

In embodiments herein, the catalyst system may comprise an inert support material. The supported material can be a porous support material, for example, talc, and inorganic oxides. Other support materials include zeolites, clays, organoclays, or any other organic or inorganic support material and the like, or mixtures thereof.

The support material can be an inorganic oxide in a finely divided form. Suitable inorganic oxide materials for use in metallocene catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Support materials include $Al_2O_3$, $ZrO_2$, $SiO_2$, and combinations thereof, such as $SiO_2$, $Al_2O_3$, or $SiO_2/Al_2O_3$.

The support material, such as an inorganic oxide, can have a surface area in the range of from about 10 $m^2/g$ to about 700 $m^2/g$, pore volume in the range of from about 0.1 cc/g to about 4.0 cc/g and average particle size in the range of from about 5 to about 500 m. The surface area of the support material can be in the range of from about 50 to about 500 $m^2/g$, pore volume of from about 0.5 to about 3.5 cc/g and average particle size of from about 10 to about 200 m. For example, the surface area of the support material is in the range is from about 100 to about 400 $m^2/g$, pore volume from about 0.8 to about 3.0 cc/g and average particle size is from about 5 to about 100 m. The average pore size of the support material useful in the present disclosure is in the range of from 10 to 1000 Å, such as 50 to about 500 Å, and such as 75 to about 350 Å. In at least one embodiment, the support material is a high surface area, amorphous silica (surface area=300 $m^2/gm$; pore volume of 1.65 $cm^3/gm$). Silicas can be marketed under the tradenames of DAVISON 952 or DAVISON 955 by the Davison Chemical Division of W.R. Grace and Company. In other embodiments DAVISON 948 is used. Alternatively, a silica can be ES-70™ silica (PQ Corporation, Malvern, Pa.) that has been calcined at 875° C.

The support material should be dry, that is, free of absorbed water. Drying of the support material can be effected by heating or calcining at about 100° C. to about 1,000° C., such as at least about 600° C. When the support material is silica, it is heated to at least 200° C., such as about 200° C. to about 850° C., and such as at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of the present disclosure. The calcined support material is then contacted with at least one polymerization catalyst comprising at least one metallocene compound and an activator.

The support material, having reactive surface groups, typically hydroxyl groups, is slurried in a non-polar solvent and the resulting slurry is contacted with a solution of a metallocene compound and an activator. In at least one embodiment, the slurry of the support material is first contacted with the activator for a period of time in the range of from about 0.5 hours to about 24 hours, from about 2 hours to about 16 hours, or from about 4 hours to about 8 hours. The solution of the metallocene compound is then contacted with the isolated support/activator. In at least one embodiment, the supported catalyst system is generated in situ. In alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported metallocene compound is then contacted with the activator solution.

The mixture of the metallocene, activator and support is heated to about 0° C. to about 70° C., such as about 23° C. to about 60° C., such as at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the metallocene compound, are at least partially soluble and which are liquid at reaction temperatures. Non-polar solvents can be alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

In at least one embodiment, the support material comprises a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

The electron-withdrawing component used to treat the support material can be any component that increases the Lewis or Bronsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, or any combination thereof, at least one embodiment of this disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof. In at least one embodiment, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, $H^+$, $[H(OEt_2)_2]^+$, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In at least one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, typically a salt or an acid of an electron-withdrawing anion, can include gelling, co-gelling, impregnation of one compound onto another, or combinations thereof. Following a contacting method, the contacted mixture of the support material, electron-withdrawing anion, and optional metal ion, can be calcined.

According to another embodiment of the present disclosure, the support material can be treated by a process comprising: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Polymerization Processes

The present disclosure relates to polymerization processes where monomer (such as propylene), and optionally comonomer, are contacted with a catalyst system comprising an activator and at least one metallocene compound, as described above. The catalyst compound and activator may be combined in any order, and are combined typically prior to contacting with the monomer.

Monomers include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer comprises propylene and an optional comonomer comprising one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer comprises ethylene and an optional comonomer comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

In at least one embodiment, one or more dienes are present in the polymer produced herein at up to 10 wt %, such as at 0.00001 wt % to 1.0 wt %, such as 0.002 wt % to 0.5 wt %, such as 0.003 wt % to 0.2 wt %, based upon the total weight of the composition. In at least one embodiment, 500 ppm or less of diene is added to the polymerization, such as 400 ppm or less, such as 300 ppm or less. In other embodiments, at least 50 ppm of diene is added to the polymerization, or 100 ppm or more, or 150 ppm or more.

Diolefin monomers include any suitable hydrocarbon structure, such as $C_4$ to $C_{30}$, having at least two unsaturated bonds, wherein at least two of the unsaturated bonds are readily incorporated into a polymer by either a stereospecific or a non-stereospecific catalyst(s). The diolefin monomers can be selected from alpha, omega-diene monomers (i.e., di-vinyl monomers). The diolefin monomers can be linear di-vinyl monomers, such as those containing from 4 to 30 carbon atoms. Dienes can include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, for example dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes can include cyclopentadiene, vinylnorbornene, norbornadiene, ethylidene norbornene, divinylbenzene, dicyclopentadiene or higher ring containing diolefins with or without substituents at various ring positions.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes and slurry processes can be used. (A homogeneous polymerization process is a process where at least 90 wt % of the product is soluble in the reaction media.) A bulk homogeneous process can be used. (A bulk process is a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feedstream. In at least one embodiment, the polymerization is run in a bulk process.

Polymerizations can be run at any temperature and/or pressure suitable to obtain the desired ethylene polymers. Typical temperatures and/or pressures include a temperature in the range of from about 0° C. to about 300° C., such as about 20° C. to about 200° C., such as about 35° C. to about 150° C., such as from about 40° C. to about 120° C., such as from about 45° C. to about 80° C.; and at a pressure in the range of from about 0.35 MPa to about 10 MPa, such as from about 0.45 MPa to about 6 MPa, such as from about 0.5 MPa to about 4 MPa.

In a typical polymerization, the run time of the reaction is up to 300 minutes, such as from about 5 minutes to 250 minutes, such as from about 10 minutes to 120 minutes.

In at least one embodiment, hydrogen is present in the polymerization reactor at a partial pressure of from 0.001 psig to 50 psig (0.007 to 345 kPa), such as from 0.01 psig to 25 psig (0.07 kPa to 172 kPa), such as 0.1 psig to 10 psig (0.7 kPa to 70 kPa).

In at least one embodiment, the activity of the catalyst is at least 50 g/mmol/hour, such as 500 or more g/mmol/hour, such as 5,000 or more g/mmol/hr, such as 50,000 or more g/mmol/hr. In at least one embodiment, the conversion of olefin monomer is at least 10%, based upon polymer yield and the weight of the monomer entering the reaction zone, such as 20% or more, such as 30% or more, such as 50% or more, such as 80% or more.

In at least one embodiment, little or no alumoxane is used in the process to produce the polymers. For example, alumoxane is present at zero mol %, alternately the alumoxane is present at a molar ratio of aluminum to transition metal less than 500:1, such as less than 300:1, such as less than 100:1, such as less than 1:1.

In at least one embodiment, little or no scavenger is used in the process to produce the ethylene polymer. For example, scavenger (such as tri alkyl aluminum) is present at zero mol %, alternately the scavenger is present at a molar ratio of scavenger metal to transition metal of less than 100:1, such as less than 50:1, such as less than 15:1, such as less than 10:1.

In at least one embodiment, the polymerization: 1) is conducted at temperatures of 0 to 300° C. (such as 25 to 150° C., such as 40 to 120° C., such as 45 to 80° C.); 2) is conducted at a pressure of atmospheric pressure to 10 MPa (such as 0.35 to 10 MPa, such as from 0.45 to 6 MPa, such as from 0.5 to 4 MPa); 3) is conducted in an aliphatic hydrocarbon solvent (such as isobutane, butane, pentane, isopentane, hexanes, isohexane, heptane, octane, dodecane, and mixtures thereof, cyclic and alicyclic hydrocarbons, such as cyclohexane, cycloheptane, methylcyclohexane, methylcycloheptane, and mixtures thereof, such as where aromatics are present in the solvent at less than 1 wt %, such as less than 0.5 wt %, such as at 0 wt % based upon the weight of the solvents); 4) wherein the catalyst system used in the polymerization comprises less than 0.5 mol %, such as 0 mol % alumoxane, alternately the alumoxane is present at a molar ratio of aluminum to transition metal less than 500:1, such as less than 300:1, such as less than 100:1, such as less than 1:1; 5) the polymerization occurs in one reaction zone; 6) the productivity of the catalyst compound is at least 80,000 g/mmol/hr (such as at least 150,000 g/mmol/hr, such as at least 200,000 g/mmol/hr, such as at least 250,000 g/mmol/hr, such as at least 300,000 g/mmol/hr); 7) optionally scavengers (such as trialkyl aluminum compounds) are absent (e.g., present at zero mol %, alternately the scavenger is present at a molar ratio of scavenger metal to transition metal of less than 100:1, such as less than 50:1, such as less than 15:1, such as less than 10:1); and 8) optionally, hydrogen is present in the polymerization reactor at a partial pressure of 0.001 to 50 psig (0.007 to 345 kPa) (such as from 0.01 to 25 psig (0.07 to 172 kPa), such as 0.1 to 10 psig (0.7 to 70 kPa)). In at least one embodiment, the catalyst system used in the polymerization comprises no more than one catalyst compound. A "reaction zone" also referred to as a "polymerization zone" is a vessel where polymerization takes place, for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone. Room temperature is 23° C. unless otherwise noted.

Other additives may also be used in the polymerization, such as one or more scavengers, promoters, modifiers, chain transfer agents (such as diethyl zinc), reducing agents, oxidizing agents, hydrogen, aluminum alkyls, or silanes.

Chain transfer agents include alkylalumoxanes, a compound represented by the formula $AlR_3$ or $ZnR_2$ (where each R is, independently, a $C_1$-$C_8$ aliphatic radical, such as methyl, ethyl, propyl, butyl, pentyl, hexyl, octyl or an isomer thereof), or a combination thereof, such as diethyl zinc, methylalumoxane, trimethylaluminum, triisobutylaluminum, trioctylaluminum, or a combination thereof.

Polyolefin Products

This present disclosure relates to compositions of matter produced by the methods described herein.

In at least one embodiment, a process described herein produces $C_2$ to $C_{20}$ olefin homopolymers or copolymers, such as ethylene-hexene, propylene-ethylene and/or propylene-alphaolefin (such as $C_3$ to $C_{20}$) copolymers (such as propylene-hexene copolymers or propylene-octene copolymers) having low comonomer incorporation (such as $C_6$ wt %) and/or broad molecular weight distribution (MWD).

In at least one embodiment, a polymer of the present disclosure has an MI from 1.0 g/10 min to 5.0 g/10 min, such as from 1.0 g/10 min to 4.0 g/10 min, such as from 1.0 g/10 min to 3.5 g/10 min.

In at least one embodiment, a polymer of the present disclosure has an Mw from 50,000 to 120,000, such as from 60,000 to 110,000, such as from 70,000 to 105,000, such as from 75,000 to 105,000.

In at least one embodiment, a polymer of the present disclosure has an Mz from 150,000 to 250,000, such as from 155,000 to 240,000, such as from 160,000 to 230,000, such as from 165,000 to 220,000.

In at least one embodiment, a polymer of the present disclosure has an Mn from 20,000 to 40,000, such as from 22,000 to 38,000, such as from 24,000 to 36,000, such as from 26,000 to 34,000.

In at least one embodiment, a polymer of the present disclosure has an Mw/Mn value from 1.0 to 5.0, such as from 2.0 to 4.0, such as from 2.5 to 3.5, such as from 3.0 to 3.5.

In at least one embodiment, a polymer of the present disclosure has a g'vis of greater than 0.9, such as greater than 0.92, such as greater than 0.95, such as greater than 0.97, preferably greater than 0.99.

Likewise, the process of the present disclosure produces olefin polymers, such as polyethylene and polypropylene homopolymers and copolymers. In at least one embodiment, the polymers produced herein are homopolymers of ethylene or copolymers of ethylene having, for example, from 0.1 wt % to 25 wt % (alternately from 0.5 wt % to 20 wt %, alternately from 1 wt % to 15 wt %, such as from 1 wt % to 10 wt %, such as from 3 wt % to 10 wt %) of one or more $C_3$ to $C_{20}$ olefin comonomer (such as $C_3$ to $C_{12}$ alpha-olefin, such as propylene, butene, hexene, octene, decene, dodecene, such as propylene, butene, hexene, octene). In at least one embodiment, the monomer is ethylene and the comonomer is hexene, such as from 1.0 wt % to 15 wt % hexene, such as from 3.0 wt % to 14 wt % hexene, such as from 6.0 wt % to 12 wt % hexene, alternately 9.0 wt % to 12 wt % based on the weight of the polymer.

In at least one embodiment, the polymers produced herein are homopolymers of propylene or are copolymers of propylene having, for example, from 0.1 wt % to 25 wt % (alternately from 0.5 wt % to 20 wt %, alternately from 1 wt % to 15 wt %, such as from 3 wt % to 10 wt %) of one or more of $C_2$ or $C_4$ to $C_{20}$ olefin comonomer (such as ethylene or $C_4$ to $C_{12}$ alpha-olefin, such as ethylene, butene, hexene, octene, decene, dodecene, such as ethylene, butene, hexene, octene). In at least one embodiment, the monomer is propylene and the comonomer is hexene, such as from 1.0 wt % to 15 wt % hexene, such as from 3.0 wt % to 14 wt % hexene, such as from 6.0 wt % to 12 wt % hexene, alternately 9.0 wt % to 12 wt % based on the weight of the polymer.

In at least one embodiment, the polymers produced herein have an Mw of 20,000 to 1,000,000 g/mol (such as 60,000 to 300,000 g/mol), and/or an Mw/Mn of greater than 1 to 40 (alternately 1.2 to 20, alternately 1.3 to 10, alternately 1.4 to 8, alternately 1.5 to 4, alternately 2.5 to 3.5).

In at least one embodiment, a polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

Blends

In another embodiment, the polymer (such as the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as the polyethylene or polypropylene) is present in the above blends, at from 10 wt % to 99 wt %, based upon the weight of the polymers in the blend, such as 20 wt % to 95 wt %, such as at least 30 wt % to 90 wt %, such as at least 40 to 90 wt %, such as at least 50 wt % to 90 wt %, such as at least 60 to 90 wt %, such as at least 70 wt % to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

Specifically, any of the foregoing polymers, such as the foregoing polyethylenes or blends thereof, may be used in a variety of end-use applications. Such applications include, for example, mono- or multi-layer blown, extruded, and/or shrink films. These films may be formed by any suitable extrusion or coextrusion technique, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using typical cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, such as from 5 to 7, and in the Transverse Direction (TD) at a ratio of up to 15, such as from 7 to 9. However, in another embodiment, the film is oriented to the same extent in both the MD and TD directions.

The films may vary in thickness depending on the intended application; however, films of a thickness from 1 μm to 50 μm are usually suitable. Films intended for packaging are usually from 10 μm to 50 μm thick. The thickness of the sealing layer is typically 0.2 μm to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In at least one embodiment, one or both of the surface layers is modified by corona treatment.

This invention also relates to:
1. A catalyst compound represented by Formula (I):

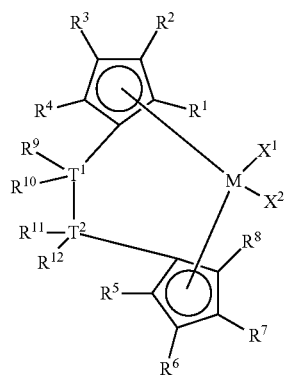

wherein:

M is a group 4 metal;

each of $R^1$, $R^2$, $R^3$, and $R^4$ is independently hydrogen, alkoxide, $C_1$ to $C_{40}$ substituted or unsubstituted hydrocarbyl, or —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl; wherein at least one of $R^1$, $R^2$, $R^3$, and $R^4$ is independently hydrogen, alkoxide, $C_1$ to $C_{40}$ substituted or unsubstituted hydrocarbyl, or —$R^{13}$—$SiR'_3$ or —$R^{13}$—$CR'_3$ where $R^{13}$ is $C_1$ to $C_4$ hydrocarbyl, and each R' is independently H or $C_1$ to $C_{20}$ substituted or unsubstituted hydrocarbyl and at least one R' is $C_1$ to $C_{20}$ substituted or unsubstituted hydrocarbyl;

each of $R^5$, $R^6$, $R^7$, and $R^8$ is independently hydrogen, alkoxide, $C_1$ to $C_{40}$ substituted or unsubstituted hydrocarbyl, —$R^{13}$—$SiR'_3$ or —$R^{13}$—$CR'_3$ where $R^{13}$ is $C_1$ to $C_4$ hydrocarbyl, and each R' is independently $C_1$ to $C_{20}$ substituted or unsubstituted hydrocarbyl, or two or more of $R^5$, $R^6$, $R^7$, and $R^8$ form a substituted or unsubstituted, saturated, partially unsaturated or aromatic, cyclic or polycyclic substituent ring; wherein at least one of $R^5$, $R^6$, $R^7$, and $R^8$ is independently hydrogen, alkoxide, $C_1$ to $C_{40}$ substituted or unsubstituted hydrocarbyl, or —$R^{13}$—$SiR'_3$ or —$R^{13}$-$CR'_3$ where $R^{13}$ is $C_1$ to $C_4$ hydrocarbyl, and each R' is independently H or $C_1$ to $C_{20}$ substituted or unsubstituted hydrocarbyl and at least one R' is $C_1$ to $C_{20}$ substituted or unsubstituted hydrocarbyl; wherein at least one of $R^1$, $R^2$, $R^3$, $R^4$, $R^5$, $R^6$, $R^7$, and $R^8$ is, —$R^{13}$—$SiR'_3$ or —$R^{13}$-$CR'_3$ where $R^{13}$ is $C_1$ to $C_4$ hydrocarbyl, and each R' is independently $C_1$ to $C_{20}$ substituted or unsubstituted hydrocarbyl;

each of $X^1$ and $X^2$ is independently a univalent anionic ligand, a diene ligand, an alkylidene ligand, or $X^1$ and $X^2$ are joined to form a metallocyclic ring;

each of $T^1$ and $T^2$ are independently Si or Ge;

each of $R^9$, $R^{10}$, $R^{11}$, and $R^{12}$ is independently hydrogen or a $C_1$-$C_{20}$ containing hydrocarbyl, substituted hydrocarbyl, halocarbyl, substituted halocarbyl, silylcarbyl, germylcarbyl, or $R^9$ and $R^{10}$ join to form a substituted or unsubstituted, saturated, partially unsaturated or aromatic, cyclic or polycyclic substituent, or $R^{11}$ and $R^{12}$ join to form a substituted or unsubstituted, saturated, partially unsaturated or aromatic, cyclic or polycyclic substituent.

2. The catalyst compound of paragraph 1, wherein M is hafnium.

3. The catalyst compound of paragraphs 1 or 2, wherein one or more of $T^1$ and $T^2$ is Si.

4. The catalyst compound of any of paragraphs 1 to 3, wherein each of $T^1$ and $T^2$ is Si.

5. The catalyst compound of any of paragraphs 1 to 4, wherein each of $R^9$, $R^{10}$, $R^{11}$, and $R^{12}$ is independently a $C_1$-$C_{20}$ containing hydrocarbyl.

6. The catalyst compound of any of paragraphs 1 to 5, wherein at least one of $R^1$, $R^2$, $R^3$, and $R^4$ is independently $C_1$ to $C_{40}$ substituted or unsubstituted hydrocarbyl or —$R^{13}$—$SiR'_3$ where $R^{13}$ is $C_1$ to $C_4$ hydrocarbyl, and each R' is independently $C_1$ to $C_{20}$ substituted or unsubstituted hydrocarbyl.

7. The catalyst compound of paragraph 6, wherein each of $R^1$, $R^2$, $R^3$, and $R^4$ is independently $C_1$ to $C_{40}$ unsubstituted hydrocarbyl.

8. The catalyst compound of paragraph 7, wherein each of $R^1$, $R^2$, $R^3$, and $R^4$ is methyl.

9. The catalyst compound of any of paragraphs 1 to 6, wherein one of $R^1$, $R^2$, $R^3$, and $R^4$ is —$R^{13}$—$SiR'_3$, each R' is independently $C_1$ to $C_{20}$ substituted or unsubstituted hydrocarbyl, and three of $R^1$, $R^2$, $R^3$, and $R^4$ are H.

10. The catalyst compound of paragraph 9, wherein $R^2$ or $R^3$ is —$R^{13}$—$SiR'_3$ and each R' is independently $C_1$ to $C_{20}$ unsubstituted hydrocarbyl.

11. The catalyst compound of paragraph 10, wherein each R' is methyl.

12. The catalyst compound of any of paragraphs 1 to 11, wherein at least one of $R^5$, $R^6$, $R^7$, and $R^8$ is —$R^{13}$—$SiR'_3$ where $R^{13}$ is $C_1$ to $C_4$ hydrocarbyl, each R' is independently $C_1$ to $C_{20}$ substituted or unsubstituted hydrocarbyl, and at least one of $R^5$, $R^6$, $R^7$, and $R^8$ is H.

13. The catalyst compound of paragraph 12, wherein one of $R^5$, $R^6$, $R^7$, and $R^8$ is —$R^{13}$—$SiR'_3$ where $R^{13}$ is $C_1$ to $C_4$ hydrocarbyl, each R' is independently $C_1$ to $C_{20}$ substituted or unsubstituted hydrocarbyl, and three of $R^5$, $R^6$, $R^7$, and $R^8$ is H.

14. The catalyst compound of paragraph 13, wherein $R^6$ or $R^7$ is —$R^{13}$—$SiR'_3$ and each R' is independently $C_1$ to $C_{20}$ unsubstituted hydrocarbyl.

15. The catalyst compound of paragraph 14, wherein each R' is methyl.

16. The catalyst compound of any of paragraphs 1-15, wherein the catalyst is a meso isomer.

17. The catalyst compound of paragraph 1, wherein the catalyst compound is selected from: Rac/meso-$Me_4Si_2$(3-$Me_3SiCH_2Cp$)$_2$$HfCl_2$, Rac/meso-$Et_4Si_2$(3-$Me_3SiCH_2Cp$)$_2$$HfCl_2$, Rac/meso-$^iPr_4Si_2$(3-$Me_3SiCH_2Cp$)$_2$$HfCl_2$, Rac/meso-$Ph_4Si_2$(3-$Me_3SiCH_2Cp$)$_2$$HfCl_2$, Rac/meso-$Me_2Ph_2Si_2$(3-$Me_3SiCH_2Cp$)$_2$$HfCl_2$, Rac/meso-$Me_4Si_2$(3-$Et_3SiCH_2Cp$)$_2$$HfCl_2$, Rac/meso-$Et_4Si_2$(3-$Et_3SiCH_2Cp$)$_2$$HfCl_2$, Rac/meso-$^iPr_4Si_2$(3-$Et_3SiCH_2Cp$)$_2$$HfCl_2$, Rac/meso-$Ph_4Si_2$(3-$Et_3SiCH_2Cp$)$_2$$HfCl_2$, Rac/meso-$Me_2Ph_2Si_2$(3-$Et_3SiCH_2Cp$)$_2$$HfCl_2$, Rac/meso-$Me_4Si_2$(3-$Cy_3SiCH_2Cp$)$_2$$HfCl_2$, Rac/meso-$Et_4Si_2$(3-$Cy_3SiCH_2Cp$)$_2$$HfCl_2$, Rac/meso-$^iPr_4Si_2$(3-$Cy_3SiCH_2Cp$)$_2$$HfCl_2$, Rac/meso-$Ph_4Si_2$(3-$Cy_3SiCH_2Cp$)$_2$$HfCl_2$, Rac/meso-$Me_2Ph_2Si_2$(3-$Cy_3SiCH_2Cp$)$_2$$HfCl_2$, Rac/meso-$Me_4Si_2$(3-$Me_2PhSiCH_2Cp$)$_2$$HfCl_2$, Rac/meso-$Et_4Si_2$(3-$Me_2PhSiCH_2Cp$)$_2$$HfCl_2$, Rac/meso-$^iPr_4Si_2$(3-$Me_2PhSiCH_2Cp$)$_2$$HfCl_2$, Rac/meso-$Ph_4Si_2$(3-$Me_2PhSiCH_2Cp$)$_2$$HfCl_2$, Rac/meso-$Me_2Ph_2Si_2$(3-$Me_2PhSiCH_2Cp$)$_2$$HfCl_2$, Rac/meso-$Me_4Si_2$(3-$MePh_2SiCH_2Cp$)$_2$$HfCl_2$, Rac/meso-$Et_4Si_2$(3-$MePh_2SiCH_2Cp$)$_2$$HfCl_2$, Rac/meso-$^iPr_4Si_2$(3-$MePh_2SiCH_2Cp$)$_2$$HfCl_2$, Rac/meso-$Ph_4Si_2$(3-$MePh_2SiCH_2Cp$)$_2$$HfCl_2$, Rac/meso-$Me_2Ph_2Si_2$(3-$MePh_2SiCH_2Cp$)$_2$$HfCl_2$, Rac/meso-$Me_4Si_2$(3-$Ph_3SiCH_2Cp$)$_2$$HfCl_2$, Rac/meso-$Et_4Si_2$(3-$Ph_3SiCH_2Cp$)$_2$$HfCl_2$, Rac/meso-$^iPr_4Si_2$(3-$Ph_3SiCH_2Cp$)$_2$$HfCl_2$, Rac/meso-$Ph_4Si_2$(3-$Ph_3SiCH_2Cp$)$_2$$HfCl_2$, Rac/meso-$Me_2Ph_2Si_2$(3-$Ph_3SiCH_2Cp$)$_2$$HfCl_2$, $Me_4Si_2$(2,3,4,5-$Me_4Cp$)(3-$Me_3SiCH_2Cp$)$HfCl_2$, $Et_4Si_2$(2,3,4,5-$Me_4Cp$)(3-$Me_3SiCH_2Cp$)$HfCl_2$, $^iPr_4Si_2$(2,3,4,5-$Me_4Cp$)(3-$Me_3SiCH_2Cp$)$HfCl_2$, $Ph_4Si_2$(2,3,4,5-$Me_4Cp$)(3-$Me_3SiCH_2Cp$)$HfCl_2$, $Me_2Ph_2Si_2$(2,3,4,5-$Me_4Cp$)(3-$Me_3SiCH_2Cp$)$HfCl_2$, $Me_4Si_2$(2,3,4,5-$Me_4Cp$)(3-$Et_3SiCH_2Cp$)$HfCl_2$, $Et_4Si_2$(2,3,4,5-$Me_4Cp$)(3-$Et_3SiCH_2Cp$)$HfCl_2$, $^iPr_4Si_2$(2,3,4,5-$Me_4Cp$)(3-$Et_3SiCH_2Cp$)$HfCl_2$, $Ph_4Si_2$(2,3,4,5-$Me_4Cp$)(3-$Et_3SiCH_2Cp$)$HfCl_2$, $Me_2Ph_2Si_2$(2,3,4,5-$Me_4Cp$)(3-$Et_3SiCH_2Cp$)$HfCl_2$, $Me_4Si_2$(2,3,4,5-$Me_4Cp$)(3-$Cy_3SiCH_2Cp$)$HfCl_2$, $Et_4Si_2$(2,3,4,5-$Me_4Cp$)(3-$Cy_3SiCH_2Cp$)$HfCl_2$, $^iPr_4Si_2$(2,3,4,5-$Me_4Cp$)(3-$Cy_3SiCH_2Cp$)$HfCl_2$, $Ph_4Si_2$(2,3,4,5-$Me_4Cp$)(3-$Cy_3SiCH_2Cp$)$HfMe_2$, $Me_2Ph_2Si_2$(2,3,4,5-$Me_4Cp$)(3-$Cy_3SiCH_2Cp$)$HfCl_2$, $Me_4Si_2$(2,3,4,5-$Me_4Cp$)(3-$Me_2PhSiCH_2Cp$)$HfCl_2$, $Et_4Si_2$(2,3,4,5-$Me_4Cp$)(3-$Me_2PhSiCH_2Cp$)$HfCl_2$, $^iPr_4Si_2$(2,3,4,5-$Me_4Cp$)(3-$Me_2PhSiCH_2Cp$)$HfCl_2$, $Ph_4Si_2$(2,3,4,5-$Me_4Cp$)(3-$Me_2PhSiCH_2Cp$)$HfCl_2$, $Me_2Ph_2Si_2$(2,3,4,5-$Me_4Cp$)(3-$Me_2PhSiCH_2Cp$)$HfCl_2$, $Me_4Si_2$(2,3,4,5-$Me_4Cp$)(3-$Et_4SiCH_2Cp$)$HfCl_2$, $Et_4Si_2$(2,3,4,5-$Me_4Cp$)(3-$Et_4SiCH_2Cp$)$HfCl_2$, $^iPr_4Si_2$(2,3,4,5-$Me_4Cp$)(3-$Et_4SiCH_2Cp$)$HfCl_2$, $Ph_4Si_2$(2,3,4,5-$Me_4Cp$)(3-$Et_4SiCH_2Cp$)$HfCl_2$, $Me_2Ph_2Si_2$(2,3,4,5-$Me_4Cp$)(3-$Et_4SiCH_2Cp$)$HfCl_2$, $Me_4Si_2$(Cp)(3-$Me_3SiCH_2Cp$)$HfCl_2$, $Et_4Si_2$(Cp)(3-$Me_3SiCH_2Cp$)$HfCl_2$, $^iPr_4Si_2$(Cp)(3-$Me_3SiCH_2Cp$)$HfCl_2$, $Ph_4Si_2$(Cp)(3-$Me_3SiCH_2Cp$)$HfCl_2$, $Me_2Ph_2Si_2$(Cp)(3-$Me_3SiCH_2Cp$)$HfCl_2$, $Me_4Si_2$(Cp)(3-$Et_3SiCH_2Cp$)$HfCl_2$, $Et_4Si_2$(Cp)(3-$Et_3SiCH_2Cp$)$HfCl_2$, $^iPr_4Si_2$(Cp)(3-$Et_3SiCH_2Cp$)$HfCl_2$, $Ph_4Si_2$(Cp)(3-$Et_3SiCH_2Cp$)$HfCl_2$, $Me_2Ph_2Si_2$(Cp)(3-$Et_3SiCH_2Cp$)$HfCl_2$, $Me_4Si_2$(Cp)(3-$Cy_3SiCH_2Cp$)$HfCl_2$, $Et_4Si_2$(Cp)(3-$Cy_3SiCH_2Cp$)$HfCl_2$, $^iPr_4Si_2$(Cp)(3-$Cy_3SiCH_2Cp$)$HfCl_2$, $Ph_4Si_2$(Cp)(3-$Cy_3SiCH_2Cp$)$HfCl_2$, $Me_2Ph_2Si_2$(Cp)(3-$Cy_3SiCH_2Cp$)$HfCl_2$, $Me_4Si_2$(Cp)(3-$Me_2PhSiCH_2Cp$)$HfCl_2$, $Et_4Si_2$(Cp)(3-$Me_2PhSiCH_2Cp$)$HfCl_2$, $^iPr_4Si_2$(Cp)(3-$Me_2PhSiCH_2Cp$)$HfCl_2$, $Ph_4Si_2$(Cp)(3-$Me_2PhSiCH_2Cp$)$HfCl_2$, $Me_2Ph_2Si_2$(Cp)(3-$Me_2PhSiCH_2Cp$)$HfCl_2$, $Me_4Si_2$(Cp)(3-$Ph_3SiCH_2Cp$)$HfCl_2$, $Et_4Si_2$(Cp)(3-$Ph_3SiCH_2Cp$)$HfCl_2$, $^iPr_4Si_2$(Cp)(3-$Ph_3SiCH_2Cp$)$HfCl_2$, $Ph_4Si_2$(Cp)(3-$Ph_3SiCH_2Cp$)$HfCl_2$, $Me_2Ph_2Si_2$(Cp)(3-$Ph_3SiCH_2Cp$)$HfCl_2$, Rac/meso-$Me_4Si_2$(3-$Me_3SiCH_2Cp$)(3-$Et_3SiCH_2Cp$)$HfCl_2$, Rac/meso-$Et_4Si_2$(3-$Me_3SiCH_2Cp$)(3-$Et_3SiCH_2Cp$)$HfCl_2$, Rac/meso-$^iPr_4Si_2$(3-$Me_3SiCH_2Cp$)(3-$Et_3SiCH_2Cp$)$HfCl_2$, Rac/meso-$Ph_4Si_2$(3-$Me_3SiCH_2Cp$)(3-$Et_3SiCH_2Cp$)$HfCl_2$, Rac/meso-$Me_2Ph_2Si_2$(3-$Me_3SiCH_2Cp$)(3-$Et_3SiCH_2Cp$)$HfCl_2$, Rac/meso-$Me_4Si_2$(3-$Et_3SiCH_2Cp$)(3-$Cy_3SiCH_2Cp$)$HfCl_2$, Rac/meso-$Et_4Si_2$(3-$Et_3SiCH_2Cp$)(3-$Cy_3SiCH_2Cp$)$HfCl_2$, Rac/meso-$^iPr_4Si_2$(3-$Et_3SiCH_2Cp$)(3-$Cy_3SiCH_2Cp$)$HfCl_2$, Rac/meso-$Ph_4Si_2$(3-$Et_3SiCH_2Cp$)(3-$Cy_3SiCH_2Cp$)$HfCl_2$, Rac/meso-$Me_2Ph_2Si_2$(3-$Et_3SiCH_2Cp$)(3-$Cy_3SiCH_2Cp$)$HfCl_2$, Rac/meso-$Me_4Si_2$(3-$Cy_3SiCH_2Cp$)(3-$Me_2PhSiCH_2Cp$)$HfCl_2$, Rac/meso-$Et_4Si_2$(3-$Cy_3SiCH_2Cp$)(3-$Me_2PhSiCH_2Cp$)$HfCl_2$, Rac/meso-$^iPr_4Si_2$(3-$Cy_3SiCH_2Cp$)(3-$Me_2PhSiCH_2Cp$)$HfCl_2$, Rac/meso-$Ph_4Si_2$(3-$Cy_3SiCH_2Cp$)(3-$Me_2PhSiCH_2Cp$)$HfCl_2$, Rac/meso-$Me_2Ph_2Si_2$(3-$Cy_3SiCH_2Cp$)(3-$Me_2PhSiCH_2Cp$)$HfCl_2$, Rac/meso-$Me_4Si_2$(3-$Me_2PhSiCH_2Cp$)(3-$MePh_2SiCH_2Cp$)$HfCl_2$, Rac/meso-$Et_4Si_2$(3-$Me_2PhSiCH_2Cp$)(3-$MePh_2SiCH_2Cp$)$HfCl_2$, Rac/meso-$^iPr_4Si_2$(3-$Me_2PhSiCH_2Cp$)(3-$MePh_2SiCH_2Cp$)$HfCl_2$, Rac/meso-$Ph_4Si_2$(3-$Me_2PhSiCH_2Cp$)(3-$MePh_2SiCH_2Cp$)$HfCl_2$, Rac/meso-$Me_2Ph_2Si_2$(3-$Me_2PhSiCH_2Cp$)(3-$MePh_2SiCH_2Cp$)$HfCl_2$, Rac/meso-$Me_4Si_2$(3-$MePh_2SiCH_2Cp$)(3-$Ph_3SiCH_2Cp$)$HfCl_2$, Rac/meso-$Et_4Si_2$(3-$MePh_2SiCH_2Cp$)(3-$Ph_3SiCH_2Cp$)$HfCl_2$, Rac/meso-$^iPr_4Si_2$(3-$MePh_2SiCH_2Cp$)(3-$Ph_3SiCH_2Cp$)$HfCl_2$, Rac/meso-$Ph_4Si_2$(3-$MePh_2SiCH_2Cp$)(3-$Ph_3SiCH_2Cp$)$HfCl_2$, Rac/meso-$Me_2Ph_2Si_2$(3-$MePh_2SiCH_2Cp$)(3-$Ph_3SiCH_2Cp$)$HfCl_2$, Rac/meso-$Me_4Si_2$(3-$Ph_3SiCH_2Cp$)$_2$$HfCl_2$, Rac/meso-$Et_4Si_2$(3-$Ph_3SiCH_2Cp$)$_2$$HfCl_2$, Rac/meso-$^iPr_4Si_2$(3-$Ph_3SiCH_2Cp$)$_2$$HfCl_2$, Rac/meso-$Ph_4Si_2$(3-$Ph_3SiCH_2Cp$)$_2$$HfCl_2$ and Rac/meso-$Me_2Ph_2Si_2$(3-$Ph_3SiCH_2Cp$)$_2$$HfCl_2$, Rac/meso-$Me_4Si_2$(3-$Me_3SiCH_2Cp$)$_2$$HfMe_2$, Rac/meso-$Et_4Si_2$(3-$Me_3SiCH_2Cp$)$_2$$HfMe_2$, Rac/meso-$^iPr_4Si_2$(3-$Me_3SiCH_2Cp$)$_2$$HfMe_2$, Rac/meso-$Ph_4Si_2$(3-$Me_3SiCH_2Cp$)$_2$$HfMe_2$, Rac/meso-$Me_2Ph_2Si_2$(3-$Me_3SiCH_2Cp$)$_2$$HfMe_2$, Rac/meso-$Me_4Si_2$(3-$Et_3SiCH_2Cp$)$_2$$HfMe_2$, Rac/meso-$Et_4Si_2$(3-$Et_3SiCH_2Cp$)$_2$$HfMe_2$, Rac/meso-$^iPr_4Si_2$(3-$Et_3SiCH_2Cp$)$_2$$HfMe_2$, Rac/meso-$Ph_4Si_2$(3-$Et_3SiCH_2Cp$)$_2$$HfMe_2$, Rac/meso-Me$_2$Ph$_2$Si$_2$(3-Et$_3$SiCH$_2$Cp)$_2$HfMe$_2$, Rac/meso-Me$_4$Si$_2$(3-Cy$_3$SiCH$_2$Cp)$_2$HfMe$_2$, Rac/meso-Et$_4$Si$_2$(3-Cy$_3$SiCH$_2$Cp)$_2$HfMe$_2$, Rac/meso-$^i$Pr$_4$Si$_2$(3-Cy$_3$SiCH$_2$Cp)$_2$HfMe$_2$, Rac/meso-Ph$_4$Si$_2$(3-Cy$_3$SiCH$_2$Cp)$_2$HfMe$_2$, Rac/meso-Me$_2$Ph$_2$Si$_2$(3-Cy 3SiCH$_2$Cp)$_2$HfMe$_2$, Rac/meso-Me$_4$Si$_2$(3-Me$_2$PhSiCH$_2$Cp)$_2$HfMe$_2$, Rac/meso-Et$_4$Si$_2$(3-Me$_2$PhSiCH$_2$Cp)$_2$HfMe$_2$, Rac/meso-$^i$Pr$_4$Si$_2$(3-Me$_2$PhSiCH$_2$Cp)$_2$HfMe$_2$, Rac/meso-Ph$_4$Si$_2$(3-Me$_2$PhSiCH$_2$Cp)$_2$HfMe$_2$, Rac/meso-Me$_2$Ph$_2$Si$_2$(3-Me$_2$PhSiCH$_2$Cp)$_2$HfMe$_2$, Rac/meso-Me$_4$Si$_2$(3-MePh$_2$SiCH$_2$Cp)$_2$HfMe$_2$, Rac/meso-Et$_4$Si$_2$(3-MePh$_2$SiCH$_2$Cp)$_2$HfMe$_2$, Rac/meso-$^i$Pr$_4$Si$_2$(3-MePh$_2$SiCH$_2$Cp)$_2$HfMe$_2$, Rac/meso-Ph$_4$Si$_2$(3-MePh$_2$SiCH$_2$Cp)$_2$HfMe$_2$, Rac/meso-Me$_2$Ph$_2$Si$_2$(3-MePh$_2$SiCH$_2$Cp)$_2$HfMe$_2$, Rac/meso-Me$_4$Si$_2$(3-Ph$_3$SiCH$_2$Cp)$_2$HfMe$_2$, Rac/meso-Et$_4$Si$_2$(3-Ph$_3$SiCH$_2$Cp)$_2$HfMe$_2$, Rac/meso-$^i$Pr$_4$Si$_2$(3-Ph$_3$SiCH$_2$Cp)$_2$HfMe$_2$, Rac/meso-Ph$_4$Si$_2$(3-Ph$_3$SiCH$_2$Cp)$_2$HfMe$_2$, Rac/meso-Me$_2$Ph$_2$Si$_2$(3-Ph$_3$SiCH$_2$Cp)$_2$HfMe$_2$, Me$_4$Si$_2$(2,3,4,5-Me$_4$Cp)(3-Me$_3$SiCH$_2$Cp)HfMe$_2$, Et$_4$Si$_2$(2,3,4,5-Me$_4$Cp)(3-Me$_3$SiCH$_2$Cp)HfMe$_2$, $^i$Pr$_4$Si$_2$(2,3,4,5-Me$_4$Cp)(3-Me$_3$SiCH$_2$Cp)HfMe$_2$, Ph$_4$Si$_2$(2,3,4,5-Me$_4$Cp)(3-Me$_3$SiCH$_2$Cp)HfMe$_2$, Me$_2$Ph$_2$Si$_2$(2,3,4,5-Me$_4$Cp)(3-Me$_3$SiCH$_2$Cp)HfMe$_2$, Me$_4$Si$_2$(2,3,4,5-Me$_4$Cp)(3-Et$_3$SiCH$_2$Cp)HfMe$_2$, Et$_4$Si$_2$(2,3,4,5-Me$_4$Cp)(3-Et$_3$SiCH$_2$Cp)HfMe$_2$, $^i$Pr$_4$Si$_2$(2,3,4,5-Me$_4$Cp)(3-Et$_3$SiCH$_2$Cp)HfMe$_2$, Ph$_4$Si$_2$(2,3,4,5-Me$_4$Cp)(3-Et$_3$SiCH$_2$Cp)HfMe$_2$, Me$_2$Ph$_2$Si$_2$(2,3,4,5-Me$_4$Cp)(3-Et$_3$SiCH$_2$Cp)HfMe$_2$, Me$_4$Si$_2$(2,3,4,5-Me$_4$Cp)(3-Cy$_3$SiCH$_2$Cp)HfMe$_2$, Et$_4$Si$_2$(2,3,4,5-Me$_4$Cp)(3-Cy$_3$SiCH$_2$Cp)HfMe$_2$, $^i$Pr$_4$Si$_2$(2,3,4,5-Me$_4$Cp)(3-Cy$_3$SiCH$_2$Cp)HfMe$_2$, Ph$_4$Si$_2$(2,3,4,5-Me$_4$Cp)(3-Cy$_3$SiCH$_2$Cp)HfMe$_2$, Me$_2$Ph$_2$Si$_2$(2,3,4,5-Me$_4$Cp)(3-Cy$_3$SiCH$_2$Cp)HfMe$_2$, Me$_4$Si$_2$(2,3,4,5-Me$_4$Cp)(3-Me$_2$PhSiCH$_2$Cp)HfMe$_2$, Et$_4$Si$_2$(2,3,4,5-Me$_4$Cp)(3-Me$_2$PhSiCH$_2$Cp)HfMe$_2$, $^i$Pr$_4$Si$_2$(2,3,4,5-Me$_4$Cp)(3-Me$_2$PhSiCH$_2$Cp)HfMe$_2$, Ph$_4$Si$_2$(2,3,4,5-Me$_4$Cp)(3-Me$_2$PhSiCH$_2$Cp)HfMe$_2$, Me$_2$Ph$_2$Si$_2$(2,3,4,5-Me$_4$Cp)(3-Me$_2$PhSiCH$_2$Cp)HfMe$_2$, Me$_4$Si$_2$(2,3,4,5-Me$_4$Cp)(3-MePh$_2$SiCH$_2$Cp)HfMe$_2$, Et$_4$Si$_2$(2,3,4,5-Me$_4$Cp)(3-MePh$_2$SiCH$_2$Cp)HfMe$_2$, $^i$Pr$_4$Si$_2$(2,3,4,5-Me$_4$Cp)(3-MePh$_2$SiCH$_2$Cp)HfMe$_2$, Ph$_4$Si$_2$(2,3,4,5-Me$_4$Cp)(3-MePh$_2$SiCH$_2$Cp)HfMe$_2$, Me$_2$Ph$_2$Si$_2$(2,3,4,5-Me$_4$Cp)(3-MePh$_2$SiCH$_2$Cp)HfMe$_2$, Me$_4$Si$_2$(2,3,4,5-Me$_4$Cp)(3-Ph$_3$SiCH$_2$Cp)HfMe$_2$, Et$_4$Si$_2$(2,3,4,5-Me$_4$Cp)(3-Ph$_3$SiCH$_2$Cp)HfMe$_2$, $^i$Pr$_4$Si$_2$(2,3,4,5-Me$_4$Cp)(3-Ph$_3$SiCH$_2$Cp)HfMe$_2$, Ph$_4$Si$_2$(2,3,4,5-Me$_4$Cp)(3-Ph$_3$SiCH$_2$Cp)HfMe$_2$, Me$_2$Ph$_2$Si$_2$(2,3,4,5-Me$_4$Cp)(3-Ph$_3$SiCH$_2$Cp)HfMe$_2$, Me$_4$Si$_2$(Cp)(3-Me$_3$SiCH$_2$Cp)HfMe$_2$, Et$_4$Si$_2$(Cp)(3-Me$_3$SiCH$_2$Cp)HfMe$_2$, $^i$Pr$_4$Si$_2$(Cp)(3-Me$_3$SiCH$_2$Cp)HfMe$_2$, Ph$_4$Si$_2$(Cp)(3-Me$_3$SiCH$_2$Cp)HfMe$_2$, Me$_2$Ph$_2$Si$_2$(Cp)(3-Me$_3$SiCH$_2$Cp)HfMe$_2$, Me$_4$Si$_2$(Cp)(3-Et$_3$SiCH$_2$Cp)HfMe$_2$, Et$_4$Si$_2$(Cp)(3-Et$_3$SiCH$_2$Cp)HfMe$_2$, $^i$Pr$_4$Si$_2$(Cp)(3-Et$_3$SiCH$_2$Cp)HfMe$_2$, Ph$_4$Si$_2$(Cp)(3-Et$_3$SiCH$_2$Cp)HfMe$_2$, Me$_2$Ph$_2$Si$_2$(Cp)(3-Et$_3$SiCH$_2$Cp)HfMe$_2$, Me$_4$Si$_2$(Cp)(3-Cy$_3$SiCH$_2$Cp)HfMe$_2$, Et$_4$Si$_2$(Cp)(3-Cy$_3$SiCH$_2$Cp)HfMe$_2$, $^i$Pr$_4$Si$_2$(Cp)(3-Cy$_3$SiCH$_2$Cp)HfMe$_2$, Ph$_4$Si$_2$(Cp)(3-Cy$_3$SiCH$_2$Cp)HfMe$_2$, Me$_2$Ph$_2$Si$_2$(Cp)(3-Cy$_3$SiCH$_2$Cp)HfMe$_2$, Me$_4$Si$_2$(Cp)(3-Me$_2$PhSiCH$_2$Cp)HfMe$_2$, Et$_4$Si$_2$(Cp)(3-Me$_2$PhSiCH$_2$Cp)HfMe$_2$, $^i$Pr$_4$Si$_2$(Cp)(3-Me$_2$PhSiCH$_2$Cp)HfMe$_2$, Ph$_4$Si$_2$(Cp)(3-Me$_2$PhSiCH$_2$Cp)HfMe$_2$, Me$_2$Ph$_2$Si$_2$(Cp)(3-Me$_2$PhSiCH$_2$Cp)HfMe$_2$, MePh$_2$SiCH$_2$Cp)HfMe$_2$, Me$_4$Si$_2$(Cp)(3-Ph$_3$SiCH$_2$Cp)HfMe$_2$, Et$_4$Si$_2$(Cp)(3-Ph$_3$SiCH$_2$Cp)HfMe$_2$, $^i$Pr$_4$Si$_2$(Cp)(3-Ph$_3$SiCH$_2$Cp)HfMe$_2$, Ph$_4$Si$_2$(Cp)(3-Ph$_3$SiCH$_2$Cp)HfMe$_2$, Me$_2$Ph$_2$Si$_2$(Cp)(3-Ph$_3$SiCH$_2$Cp)HfMe$_2$, Rac/meso-Me$_4$Si$_2$(3-Me$_3$SiCH$_2$Cp)(3-Et$_3$SiCH$_2$Cp)HfMe$_2$, Rac/meso-Et$_4$Si$_2$(3-Me$_3$SiCH$_2$Cp)(3-Et$_3$SiCH$_2$Cp)HfMe$_2$, Rac/meso-$^i$Pr$_4$Si$_2$(3-Me$_3$SiCH$_2$Cp)(3-Et$_3$SiCH$_2$Cp)HfMe$_2$, Rac/meso-Ph$_4$Si$_2$(3-Me$_3$SiCH$_2$Cp)(3-Et$_3$SiCH$_2$Cp)HfMe$_2$, Rac/meso-Me$_2$Ph$_2$Si$_2$(3-Me$_3$SiCH$_2$Cp)(3-Et$_3$SiCH$_2$Cp)HfMe$_2$, Rac/meso-Me$_4$Si$_2$(3-Et$_3$SiCH$_2$Cp)(3-Cy$_3$SiCH$_2$Cp)HfMe$_2$, Rac/meso-Et$_4$Si$_2$(3-Et$_3$SiCH$_2$Cp)(3-Cy$_3$SiCH$_2$Cp)HfMe$_2$, Rac/meso-$^i$Pr$_4$Si$_2$(3-Et$_3$SiCH$_2$Cp)(3-Cy$_3$SiCH$_2$Cp)HfMe$_2$, Rac/meso-Ph$_4$Si$_2$(3-Et$_3$SiCH$_2$Cp)(3-Cy$_3$SiCH$_2$Cp)HfMe$_2$, Rac/meso-Me$_2$Ph$_2$Si$_2$(3-Et$_3$SiCH$_2$Cp)(3-Cy$_3$SiCH$_2$Cp)HfMe$_2$, Rac/meso-Me$_4$Si$_2$(3-Cy$_3$SiCH$_2$Cp)(3-Me$_2$PhSiCH$_2$Cp)HfMe$_2$, Rac/meso-Et$_4$Si$_2$(3-Cy$_3$SiCH$_2$Cp)(3-Me$_2$PhSiCH$_2$Cp)HfMe$_2$, Rac/meso-$^i$Pr$_4$Si$_2$(3-Cy$_3$SiCH$_2$Cp)(3-Me$_2$PhSiCH$_2$Cp)HfMe$_2$, Rac/meso-Ph$_4$Si$_2$(3-Cy$_3$SiCH$_2$Cp)(3-Me$_2$PhSiCH$_2$Cp)HfMe$_2$, Rac/meso-Me$_2$Ph$_2$Si$_2$(3-Cy$_3$SiCH$_2$Cp)(3-Me$_2$PhSiCH$_2$Cp)HfMe$_2$, Rac/meso-Me$_4$Si$_2$(3-Me$_2$PhSiCH$_2$Cp)(3-MePh$_2$SiCH$_2$Cp)HfMe$_2$, Rac/meso-Et$_4$Si$_2$(3-Me$_2$PhSiCH$_2$Cp)(3-MePh$_2$SiCH$_2$Cp)HfMe$_2$, Rac/meso-$^i$Pr$_4$Si$_2$(3-Me$_2$PhSiCH$_2$Cp)(3-MePh$_2$SiCH$_2$Cp)HfMe$_2$, Rac/meso-Ph$_4$Si$_2$(3-Me$_2$PhSiCH$_2$Cp)(3-MePh$_2$SiCH$_2$Cp)HfMe$_2$, Rac/meso-Me$_2$Ph$_2$Si$_2$(3-Me$_2$PhSiCH$_2$Cp)(3-MePh$_2$SiCH$_2$Cp)HfMe$_2$, Rac/meso-Me$_4$Si$_2$(3-MePh$_2$SiCH$_2$Cp)(3-Ph$_3$SiCH$_2$Cp)HfMe$_2$, Rac/meso-Et$_4$Si$_2$(3-MePh$_2$SiCH$_2$Cp)(3-Ph$_3$SiCH$_2$Cp)HfMe$_2$, Rac/meso-$^i$Pr$_4$Si$_2$(3-MePh$_2$SiCH$_2$Cp)(3-Ph$_3$SiCH$_2$Cp)HfMe$_2$, Rac/meso-Ph$_4$Si$_2$(3-MePh$_2$SiCH$_2$Cp)(3-Ph$_3$SiCH$_2$Cp)HfMe$_2$, Rac/meso-Me$_2$Ph$_2$Si$_2$(3-MePh$_2$SiCH$_2$Cp)(3-Ph$_3$SiCH$_2$Cp)HfMe$_2$, Rac/meso-Me$_4$Si$_2$(3-Ph$_3$SiCH$_2$Cp)$_2$HfMe$_2$, Rac/meso-Et$_4$Si$_2$(3-Ph$_3$SiCH$_2$Cp)$_2$HfMe$_2$, Rac/meso-$^i$Pr$_4$Si$_2$(3-Ph$_3$SiCH$_2$Cp)$_2$HfMe$_2$, Rac/meso-Ph$_4$Si$_2$(3-Ph$_3$SiCH$_2$Cp)$_2$HfMe$_2$ and Rac/meso-Me$_2$Ph$_2$Si$_2$(3-Ph$_3$SiCH$_2$Cp)$_2$HfMe$_2$, Rac/meso-Me$_4$Si$_2$(3-Me$_3$SiCH$_2$Cp)$_2$HfBu$_2$, Rac/meso-Et$_4$Si$_2$(3-Me$_3$SiCH$_2$Cp)$_2$HfBu$_2$, Rac/meso-$^i$Pr$_4$Si$_2$(3-Me$_3$SiCH$_2$Cp)$_2$HfBu$_2$, Rac/meso-Ph$_4$Si$_2$(3-Me$_3$SiCH$_2$Cp)$_2$HfBu$_2$, Rac/meso-Me$_2$Ph$_2$Si$_2$(3-Me$_3$SiCH$_2$Cp)$_2$HfBu$_2$, Rac/meso-Me$_4$Si$_2$(3-Et$_3$SiCH$_2$Cp)$_2$HfBu$_2$, Rac/meso-Et$_4$Si$_2$(3-Et$_3$SiCH$_2$Cp)$_2$HfBu$_2$, Rac/meso-$^i$Pr$_4$Si$_2$(3-Et$_3$SiCH$_2$Cp)$_2$HfBu$_2$, Rac/meso-Ph$_4$Si$_2$(3-Et$_3$SiCH$_2$Cp)$_2$HfBu$_2$, Rac/meso-Me$_2$Ph$_2$Si$_2$(3-Et$_3$SiCH$_2$Cp)$_2$HfBu$_2$, Rac/meso-Me$_4$Si$_2$(3-Cy 3SiCH$_2$Cp)$_2$HfBu$_2$, Rac/meso-Et$_4$Si$_2$(3-Cy$_3$SiCH$_2$Cp)$_2$HfBu$_2$, Rac/meso-$^i$Pr$_4$Si$_2$(3-Cy$_3$SiCH$_2$Cp)$_2$HfBu$_2$, Rac/meso-Ph$_4$Si$_2$(3-Cy$_3$SiCH$_2$Cp)$_2$HfBu$_2$, Rac/meso-Me$_2$Ph$_2$Si$_2$(3-Cy$_3$SiCH$_2$Cp)$_2$HfBu$_2$, Rac/meso-Me$_4$Si$_2$(3-Me$_2$PhSiCH$_2$Cp)$_2$HfBu$_2$, Rac/meso-Et$_4$Si$_2$(3-Me$_2$PhSiCH$_2$Cp)$_2$HfBu$_2$, Rac/meso-$^i$Pr$_4$Si$_2$(3-Me$_2$PhSiCH$_2$Cp)$_2$HfBu$_2$, Rac/meso-Ph$_4$Si$_2$(3-Me$_2$PhSiCH$_2$Cp)$_2$HfBu$_2$, Rac/meso-Me$_2$Ph$_2$Si$_2$(3-Me$_2$PhSiCH$_2$Cp)$_2$HfBu$_2$, Rac/meso-Me$_4$Si$_2$(3-MePh$_2$SiCH$_2$Cp)$_2$HfBu$_2$, Rac/meso-Et$_4$Si$_2$(3-MePh$_2$SiCH$_2$Cp)$_2$HfBu$_2$, Rac/meso-$^i$Pr$_4$Si$_2$(3-MePh$_2$SiCH$_2$Cp)$_2$HfBu$_2$, Rac/meso-Ph$_4$Si$_2$(3-MePh$_2$SiCH$_2$Cp)$_2$HfBu$_2$, Rac/meso-Me$_2$Ph$_2$Si$_2$(3-MePh$_2$SiCH$_2$Cp)$_2$HfBu$_2$, Rac/meso-Me$_4$Si$_2$(3-MePh$_2$SiCH$_2$Cp)$_2$HfBu$_2$, Ph$_3$SiCH$_2$Cp)$_2$HfBu$_2$, Rac/meso-Et$_4$Si$_2$(3-Ph$_3$SiCH$_2$Cp)$_2$HfBu$_2$, Rac/meso-$^i$Pr$_4$Si$_2$(3-Ph$_3$SiCH$_2$Cp)$_2$HfBu$_2$, Rac/meso-Ph$_4$Si$_2$(3-Ph$_3$SiCH$_2$Cp)$_2$HfBu$_2$, Rac/meso-Me$_2$Ph$_2$Si$_2$(3-Ph$_3$SiCH$_2$Cp)$_2$HfBu$_2$, Me$_4$Si$_2$(2,3,4,5-Me$_4$Cp)(3-Me$_3$SiCH$_2$Cp)HfBu$_2$, Et$_4$Si$_2$(2,3,4,5-Me$_4$Cp)(3-Me$_3$SiCH$_2$Cp)HfBu$_2$, $^i$Pr$_4$Si$_2$(2,3,4,5-Me$_4$Cp)(3-Me$_3$SiCH$_2$Cp)HfBu$_2$, Ph$_4$Si$_2$(2,3,4,5-Me$_4$Cp)(3-Me$_3$SiCH$_2$Cp)HfBu$_2$, Me$_2$Ph$_2$Si$_2$(2,3,4,5-Me$_4$Cp)(3-Me$_3$SiCH$_2$Cp)HfBu$_2$, Me$_4$Si$_2$(2,3,4,5-Me$_4$Cp)(3-Et$_3$SiCH$_2$Cp)HfBu$_2$, Et$_4$Si$_2$(2,3,4,5-Me$_4$Cp)(3-Et$_3$SiCH$_2$Cp)HfBu$_2$, $^i$Pr$_4$Si$_2$(2,3,4,5-Me$_4$Cp)(3-Et$_3$SiCH$_2$Cp)HfBu$_2$, Ph$_4$Si$_2$(2,3,4,5-Me$_4$Cp)(3-Et$_3$SiCH$_2$Cp)HfBu$_2$, Me$_2$Ph$_2$Si$_2$(2,3,4,5-Me$_4$Cp)(3-

Et₃SiCH₂Cp)HfBu₂, Me₄Si₂(2,3,4,5-Me₄Cp)(3-Cy₃SiCH₂Cp)HfBu₂, Et₄Si₂(2,3,4,5-Me₄Cp)(3-Cy₃SiCH₂Cp)HfBu₂, ⁱPr₄Si₂(2,3,4,5-Me₄Cp)(3-Cy₃SiCH₂Cp)HfBu₂, Ph₄Si₂(2,3,4,5-Me₄Cp)(3-Cy₃SiCH₂Cp)HfBu₂, Me₂Ph₂Si₂(2,3,4,5-Me₄Cp)(3-Cy₃SiCH₂Cp)HfBu₂, Me₄Si₂(2,3,4,5-Me₄Cp)(3-Me₂PhSiCH₂Cp)HfBu₂, Et₄Si₂(2,3,4,5-Me₄Cp)(3-Me₂PhSiCH₂Cp)HfBu₂, ⁱPr₄Si₂(2,3,4,5-Me₄Cp)(3-Me₂PhSiCH₂Cp)HfBu₂, Ph₄Si₂(2,3,4,5-Me₄Cp)(3-Me₂PhSiCH₂Cp)HfBu₂, Me₂Ph₂Si₂(2,3,4,5-Me₄Cp)(3-Me₂PhSiCH₂Cp)HfBu₂, Me₄Si₂(2,3,4,5-Me₄Cp)(3-MePh₂SiCH₂Cp)HfBu₂, Et₄Si₂(2,3,4,5-Me₄Cp)(3-MePh₂SiCH₂Cp)HfBu₂, ⁱPr₄Si₂(2,3,4,5-Me₄Cp)(3-MePh₂SiCH₂Cp)HfBu₂, Ph₄Si₂(2,3,4,5-Me₄Cp)(3-MePh₂SiCH₂Cp)HfBu₂, Me₂Ph₂Si₂(2,3,4,5-Me₄Cp)(3-MePh₂SiCH₂Cp)HfBu₂, Me₄Si₂(2,3,4,5-Me₄Cp)(3-Ph₃SiCH₂Cp)HfBu₂, Et₄Si₂(2,3,4,5-Me₄Cp)(3-Ph₃SiCH₂Cp)HfBu₂, ⁱPr₄Si₂(2,3,4,5-Me₄Cp)(3-Ph₃SiCH₂Cp)HfBu₂, Ph₄Si₂(2,3,4,5-Me₄Cp)(3-Ph₃SiCH₂Cp)HfBu₂, Me₂Ph₂Si₂(2,3,4,5-Me₄Cp)(3-Ph₃SiCH₂Cp)HfBu₂, Me₄Si₂(Cp)(3-Me₃SiCH₂Cp)HfBu₂, Et₄Si₂(Cp)(3-Me₃SiCH₂Cp)HfBu₂, ⁱPr₄Si₂(Cp)(3-Me₃SiCH₂Cp)HfBu₂, Ph₄Si₂(Cp)(3-Me₃SiCH₂Cp)HfBu₂, Me₂Ph₂Si₂(Cp)(3-Me₃SiCH₂Cp)HfBu₂, Me₄Si₂(Cp)(3-Et₃SiCH₂Cp)HfBu₂, Et₄Si₂(Cp)(3-Et₃SiCH₂Cp)HfBu₂, ⁱPr₄Si₂(Cp)(3-Et₃SiCH₂Cp)HfBu₂, Ph₄Si₂(Cp)(3-Et₃SiCH₂Cp)HfBu₂, Me₂Ph₂Si₂(Cp)(3-Et₃SiCH₂Cp)HfBu₂, Me₄Si₂(Cp)(3-Cy₃SiCH₂Cp)HfBu₂, Et₄Si₂(Cp)(3-Cy₃SiCH₂Cp)HfBu₂, ⁱPr₄Si₂(Cp)(3-Cy₃SiCH₂Cp)HfBu₂, Ph₄Si₂(Cp)(3-Cy₃SiCH₂Cp)HfBu₂, Me₂Ph₂Si₂(Cp)(3-Cy₃SiCH₂Cp)HfBu₂, Me₄Si₂(Cp)(3-Me₂PhSiCH₂Cp)HfBu₂, Et₄Si₂(Cp)(3-Me₂PhSiCH₂Cp)HfBu₂, ⁱPr₄Si₂(Cp)(3-Me₂PhSiCH₂Cp)HfBu₂, Ph₄Si₂(Cp)(3-Me₂PhSiCH₂Cp)HfBu₂, Me₂Ph₂Si₂(Cp)(3-Me₂PhSiCH₂Cp)HfBu₂, MePh₂SiCH₂Cp)HfBu₂, Me₄Si₂(Cp)(3-Ph₃SiCH₂Cp)HfBu₂, Et₄Si₂(Cp)(3-Ph₃SiCH₂Cp)HfBu₂, ⁱPr₄Si₂(Cp)(3-Ph₃SiCH₂Cp)HfBu₂, Ph₄Si₂(Cp)(3-Ph₃SiCH₂Cp)HfBu₂, Me₂Ph₂Si₂(Cp)(3-Ph₃SiCH₂Cp)HfBu₂, Rac/meso-Me₄Si₂(3-Me₃SiCH₂Cp)(3-Et₃SiCH₂Cp)HfBu₂, Rac/meso-Et₄Si₂(3-Me₃SiCH₂Cp)(3-Et₃SiCH₂Cp)HfBu₂, Rac/meso-ⁱPr₄Si₂(3-Me₃SiCH₂Cp)(3-Et₃SiCH₂Cp)HfBu₂, Rac/meso-Ph₄Si₂(3-Me₃SiCH₂Cp)(3-Et₃SiCH₂Cp)HfBu₂, Rac/meso-Me₂Ph₂Si₂(3-Me₃SiCH₂Cp)(3-Et₃SiCH₂Cp)HfBu₂, Rac/meso-Me₄Si₂(3-Et₃SiCH₂Cp)(3-Cy₃SiCH₂Cp)HfBu₂, Rac/meso-Et₄Si₂(3-Et₃SiCH₂Cp)(3-Cy₃SiCH₂Cp)HfBu₂, Rac/meso-ⁱPr₄Si₂(3-Et₃SiCH₂Cp)(3-Cy₃SiCH₂Cp)HfBu₂, Rac/meso-Ph₄Si₂(3-Et₃SiCH₂Cp)(3-Cy₃SiCH₂Cp)HfBu₂, Rac/meso-Me₂Ph₂Si₂(3-Et₃SiCH₂Cp)(3-Cy₃SiCH₂Cp)HfBu₂, Rac/meso-Me₄Si₂(3-Cy₃SiCH₂Cp)(3-Me₂PhSiCH₂Cp)HfBu₂, Rac/meso-Et₄Si₂(3-Cy₃SiCH₂Cp)(3-Me₂PhSiCH₂Cp)HfBu₂, Rac/meso-ⁱPr₄Si₂(3-Cy₃SiCH₂Cp)(3-Me₂PhSiCH₂Cp)HfBu₂, Rac/meso-Ph₄Si₂(3-Cy₃SiCH₂Cp)(3-Me₂PhSiCH₂Cp)HfBu₂, Rac/meso-Me₂Ph₂Si₂(3-Cy₃SiCH₂Cp)(3-Me₂PhSiCH₂Cp)HfBu₂, Rac/meso-Me₄Si₂(3-Me₂PhSiCH₂Cp)(3-MePh₂SiCH₂Cp)HfBu₂, Rac/meso-Et₄Si₂(3-Me₂PhSiCH₂Cp)(3-MePh₂SiCH₂Cp)HfBu₂, Rac/meso-ⁱPr₄Si₂(3-Me₂PhSiCH₂Cp)(3-MePh₂SiCH₂Cp)HfBu₂, Rac/meso-Ph₄Si₂(3-Me₂PhSiCH₂Cp)(3-MePh₂SiCH₂Cp)HfBu₂, Rac/meso-Me₂Ph₂Si₂(3-Me₂PhSiCH₂Cp)(3-MePh₂SiCH₂Cp)HfBu₂, Rac/meso-Me₄Si₂(3-MePh₂SiCH₂Cp)(3-Ph₃SiCH₂Cp)HfBu₂, Rac/meso-Et₄Si₂(3-MePh₂SiCH₂Cp)(3-Ph₃SiCH₂Cp)HfBu₂, Rac/meso-ⁱPr₄Si₂(3-MePh₂SiCH₂Cp)(3-Ph₃SiCH₂Cp)HfBu₂, Rac/meso-Ph₄Si₂(3-MePh₂SiCH₂Cp)(3-Ph₃SiCH₂Cp)HfBu₂, Rac/meso-Me₂Ph₂Si₂(3-MePh₂SiCH₂Cp)(3-Ph₃SiCH₂Cp)HfBu₂, Rac/meso-Me₄Si₂(3-Ph₃SiCH₂Cp)₂HfBu₂, Rac/meso-Et₄Si₂(3-Ph₃SiCH₂Cp)₂HfBu₂, Rac/meso-ⁱPr₄Si₂(3-Ph₃SiCH₂Cp)₂HfBu₂, Rac/meso-Ph₄Si₂(3-Ph₃SiCH₂Cp)₂HfBu₂ and Rac/meso-Me₂Ph₂Si₂(3-Ph₃SiCH₂Cp)₂HfBu₂, Rac/meso-Me₄Si₂(3-Me₃SiCH₂Cp)₂HfPh₂, Rac/meso-Et₄Si₂(3-Me₃SiCH₂Cp)₂HfPh₂, Rac/meso-ⁱPr₄Si₂(3-Me₃SiCH₂Cp)₂HfPh₂, Rac/meso-Ph₄Si₂(3-Me₃SiCH₂Cp)₂HfPh₂, Rac/meso-Me₂Ph₂Si₂(3-Me₃SiCH₂Cp)₂HfPh₂, Rac/meso-Me₄Si₂(3-Et₃SiCH₂Cp)₂HfPh₂, Rac/meso-Et₄Si₂(3-Et₃SiCH₂Cp)₂HfPh₂, Rac/meso-ⁱPr₄Si₂(3-Et₃SiCH₂Cp)₂HfPh₂, Rac/meso-Ph₄Si₂(3-Et₃SiCH₂Cp)₂HfPh₂, Rac/meso-Me₂Ph₂Si₂(3-Et₃SiCH₂Cp)₂HfPh₂, Rac/meso-Me₄Si₂(3-Cy₃SiCH₂Cp)₂HfPh₂, Rac/meso-Et₄Si₂(3-Cy₃SiCH₂Cp)₂HfPh₂, Rac/meso-ⁱPr₄Si₂(3-Cy₃SiCH₂Cp)₂HfPh₂, Rac/meso-Ph₄Si₂(3-Cy₃SiCH₂Cp)₂HfPh₂, Rac/meso-Me₂Ph₂Si₂(3-Cy₃SiCH₂Cp)₂HfPh₂, Rac/meso-Me₄Si₂(3-Me₂PhSiCH₂Cp)₂HfPh₂, Rac/meso-Et₄Si₂(3-Me₂PhSiCH₂Cp)₂HfPh₂, Rac/meso-ⁱPr₄Si₂(3-Me₂PhSiCH₂Cp)₂HfPh₂, Rac/meso-Ph₄Si₂(3-Me₂PhSiCH₂Cp)₂HfPh₂, Rac/meso-Me₂Ph₂Si₂(3-Me₂PhSiCH₂Cp)₂HfPh₂, Rac/meso-Me₄Si₂(3-MePh₂SiCH₂Cp)₂HfPh₂, Rac/meso-Et₄Si₂(3-MePh₂SiCH₂Cp)₂HfPh₂, Rac/meso-ⁱPr₄Si₂(3-MePh₂SiCH₂Cp)₂HfPh₂, Rac/meso-Ph₄Si₂(3-MePh₂SiCH₂Cp)₂HfPh₂, Rac/meso-Me₂Ph₂Si₂(3-MePh₂SiCH₂Cp)₂HfPh₂, Rac/meso-Me₄Si₂(3-Ph₃SiCH₂Cp)₂HfPh₂, Rac/meso-Et₄Si₂(3-Ph₃SiCH₂Cp)₂HfPh₂, Rac/meso-ⁱPr₄Si₂(3-Ph₃SiCH₂Cp)₂HfPh₂, Rac/meso-Ph₄Si₂(3-Ph₃SiCH₂Cp)₂HfPh₂, Rac/meso-Me₂Ph₂Si₂(3-Ph₃SiCH₂Cp)₂HfPh₂, Me₄Si₂(2,3,4,5-Me₄Cp)(3-Me₃SiCH₂Cp)HfPh₂, Et₄Si₂(2,3,4,5-Me₄Cp)(3-Me₃SiCH₂Cp)HfPh₂, ⁱPr₄Si₂(2,3,4,5-Me₄Cp)(3-Me₃SiCH₂Cp)HfPh₂, Ph₄Si₂(2,3,4,5-Me₄Cp)(3-Me₃SiCH₂Cp)HfPh₂, Me₂Ph₂Si₂(2,3,4,5-Me₄Cp)(3-Me₃SiCH₂Cp)HfPh₂, Me₄Si₂(2,3,4,5-Me₄Cp)(3-Et₃SiCH₂Cp)HfPh₂, Et₄Si₂(2,3,4,5-Me₄Cp)(3-Et₃SiCH₂Cp)HfPh₂, ⁱPr₄Si₂(2,3,4,5-Me₄Cp)(3-Et₃SiCH₂Cp)HfPh₂, Ph₄Si₂(2,3,4,5-Me₄Cp)(3-Et₃SiCH₂Cp)HfPh₂, Me₂Ph₂Si₂(2,3,4,5-Me₄Cp)(3-Et₃SiCH₂Cp)HfPh₂, Me₄Si₂(2,3,4,5-Me₄Cp)(3-Cy₃SiCH₂Cp)HfPh₂, Et₄Si₂(2,3,4,5-Me₄Cp)(3-Cy₃SiCH₂Cp)HfPh₂, ⁱPr₄Si₂(2,3,4,5-Me₄Cp)(3-Cy₃SiCH₂Cp)HfPh₂, Ph₄Si₂(2,3,4,5-Me₄Cp)(3-Cy₃SiCH₂Cp)HfPh₂, Me₂Ph₂Si₂(2,3,4,5-Me₄Cp)(3-Cy₃SiCH₂Cp)HfPh₂, Me₄Si₂(2,3,4,5-Me₄Cp)(3-Me₂PhSiCH₂Cp)HfPh₂, Et₄Si₂(2,3,4,5-Me₄Cp)(3-Me₂PhSiCH₂Cp)HfPh₂, ⁱPr₄Si₂(2,3,4,5-Me₄Cp)(3-Me₂PhSiCH₂Cp)HfPh₂, Ph₄Si₂(2,3,4,5-Me₄Cp)(3-Me₂PhSiCH₂Cp)HfPh₂, Me₂Ph₂Si₂(2,3,4,5-Me₄Cp)(3-Me₂PhSiCH₂Cp)HfPh₂, Me₄Si₂(2,3,4,5-Me₄Cp)(3-Me₂PhSiCH₂Cp)HfPh₂, MePh₂SiCH₂Cp)HfPh₂, Et₄Si₂(2,3,4,5-Me₄Cp)(3-MePh₂SiCH₂Cp)HfPh₂, ⁱPr₄Si₂(2,3,4,5-Me₄Cp)(3-MePh₂SiCH₂Cp)HfPh₂, Ph₄Si₂(2,3,4,5-Me₄Cp)(3-MePh₂SiCH₂Cp)HfPh₂, Me₂Ph₂Si₂(2,3,4,5-Me₄Cp)(3-MePh₂SiCH₂Cp)HfPh₂, Me₄Si₂(2,3,4,5-Me₄Cp)(3-MePh₂SiCH₂Cp)HfPh₂, Ph₃SiCH₂Cp)HfPh₂, Et₄Si₂(2,3,4,5-Me₄Cp)(3-Ph₃SiCH₂Cp)HfPh₂, ⁱPr₄Si₂(2,3,4,5-Me₄Cp)(3-Ph₃SiCH₂Cp)HfPh₂, Ph₄Si₂(2,3,4,5-Me₄Cp)(3-Ph₃SiCH₂Cp)HfPh₂, Me₂Ph₂Si₂(2,3,4,5-Me₄Cp)(3-Ph₃SiCH₂Cp)HfPh₂, Me₄Si₂(Cp)(3-Me₃SiCH₂Cp)HfPh₂, Et₄Si₂(Cp)(3-Me₃SiCH₂Cp)HfPh₂, ⁱPr₄Si₂(Cp)(3-Me₃SiCH₂Cp)HfPh₂, Ph₄Si₂(Cp)(3-Me₃SiCH₂Cp)HfPh₂, Me₂Ph₂Si₂(Cp)(3-Me₃SiCH₂Cp)HfPh₂, Me₄Si₂(Cp)(3-Et₃SiCH₂Cp)HfPh₂, Et₄Si₂(Cp)(3-Et₃SiCH₂Cp)HfPh₂, ⁱPr₄Si₂(Cp)(3-Et₃SiCH₂Cp)HfPh₂, Ph₄Si₂(Cp)(3-Et₃SiCH₂Cp)HfPh₂, Me₂Ph₂Si₂(Cp)(3-Et₃SiCH₂Cp)HfPh₂, Me₄Si₂(Cp)(3-Cy₃SiCH₂Cp)HfPh₂, Et₄Si₂(Cp)(3-Cy₃SiCH₂Cp)HfPh₂, ⁱPr₄Si₂(Cp)(3-Cy₃SiCH₂Cp)HfPh₂, Ph$_4$Si$_2$(Cp)(3-Cy$_3$SiCH$_2$Cp)HfPh$_2$, Me$_2$Ph$_2$Si$_2$(Cp)(3-Cy$_3$SiCH$_2$Cp)HfMe$_2$, Me$_4$Si$_2$(Cp)(3-Me$_2$PhSiCH$_2$Cp)HfMe$_2$, Et$_4$Si$_2$(Cp)(3-Me$_2$PhSiCH$_2$Cp)HfPh$_2$, $^i$Pr$_4$Si$_2$(Cp)(3-Me$_2$PhSiCH$_2$Cp)HfPh$_2$, Ph$_4$Si$_2$(Cp)(3-Me$_2$PhSiCH$_2$Cp)HfPh$_2$, Me$_2$Ph$_2$Si$_2$(Cp)(3-Me$_2$PhSiCH$_2$Cp)HfPh$_2$, MePh$_2$SiCH$_2$Cp)HfPh$_2$, Me$_4$Si$_2$(Cp)(3-Ph$_3$SiCH$_2$Cp)HfPh$_2$, Et$_4$Si$_2$(Cp)(3-Ph$_3$SiCH$_2$Cp)HfPh$_2$, $^i$Pr$_4$Si$_2$(Cp)(3-Ph$_3$SiCH$_2$Cp)HfPh$_2$, Ph$_4$Si$_2$(Cp)(3-Ph$_3$SiCH$_2$Cp)HfPh$_2$, Me$_2$Ph$_2$Si$_2$(Cp)(3-Ph$_3$SiCH$_2$Cp)HfPh$_2$, Rac/meso-Me$_4$Si$_2$(3-Me$_3$SiCH$_2$Cp)(3-Et$_3$SiCH$_2$Cp)HfPh$_2$, Rac/meso-Et$_4$Si$_2$(3-Me$_3$SiCH$_2$Cp)(3-Et$_3$SiCH$_2$Cp)HfPh$_2$, Rac/meso-$^i$Pr$_4$Si$_2$(3-Me$_3$SiCH$_2$Cp)(3-Et$_3$SiCH$_2$Cp)HfPh$_2$, Rac/meso-Ph$_4$Si$_2$(3-Me$_3$SiCH$_2$Cp)(3-Et$_3$SiCH$_2$Cp)HfPh$_2$, Rac/meso-Me$_2$Ph$_2$Si$_2$(3-Me$_3$SiCH$_2$Cp)(3-Et$_3$SiCH$_2$Cp)HfPh$_2$, Rac/meso-Me$_4$Si$_2$(3-Et$_3$SiCH$_2$Cp)(3-Cy$_3$SiCH$_2$Cp)HfPh$_2$, Rac/meso-Et$_4$Si$_2$(3-Et$_3$SiCH$_2$Cp)(3-Cy$_3$SiCH$_2$Cp)HfPh$_2$, Rac/meso-$^i$Pr$_4$Si$_2$(3-Et$_3$SiCH$_2$Cp)(3-Cy$_3$SiCH$_2$Cp)HfPh$_2$, Rac/meso-Ph$_4$Si$_2$(3-Et$_3$SiCH$_2$Cp)(3-Cy$_3$SiCH$_2$Cp)HfPh$_2$, Rac/meso-Me$_2$Ph$_2$Si$_2$(3-Et$_3$SiCH$_2$Cp)(3-Cy$_3$SiCH$_2$Cp)HfPh$_2$, Rac/meso-Me$_4$Si$_2$(3-Cy$_3$SiCH$_2$Cp)(3-Me$_2$PhSiCH$_2$Cp)HfPh$_2$, Rac/meso-Et$_4$Si$_2$(3-Cy$_3$SiCH$_2$Cp)(3-Me$_2$PhSiCH$_2$Cp)HfPh$_2$, Rac/meso-$^i$Pr$_4$Si$_2$(3-Cy$_3$SiCH$_2$Cp)(3-Me$_2$PhSiCH$_2$Cp)HfPh$_2$, Rac/meso-Ph$_4$Si$_2$(3-Cy$_3$SiCH$_2$Cp)(3-Me$_2$PhSiCH$_2$Cp)HfPh$_2$, Rac/meso-Me$_2$Ph$_2$Si$_2$(3-Cy$_3$SiCH$_2$Cp)(3-Me$_2$PhSiCH$_2$Cp)HfPh$_2$, Rac/meso-Me$_4$Si$_2$(3-Me$_2$PhSiCH$_2$Cp)(3-MePh$_2$SiCH$_2$Cp)HfPh$_2$, Rac/meso-Et$_4$Si$_2$(3-Me$_2$PhSiCH$_2$Cp)(3-MePh$_2$SiCH$_2$Cp)HfPh$_2$, Rac/meso-$^i$Pr$_4$Si$_2$(3-Me$_2$PhSiCH$_2$Cp)(3-MePh$_2$SiCH$_2$Cp)HfPh$_2$, Rac/meso-Ph$_4$Si$_2$(3-Me$_2$PhSiCH$_2$Cp)(3-MePh$_2$SiCH$_2$Cp)HfPh$_2$, Rac/meso-Me$_2$Ph$_2$Si$_2$(3-Me$_2$PhSiCH$_2$Cp)(3-MePh$_2$SiCH$_2$Cp)HfPh$_2$, Rac/meso-Me$_4$Si$_2$(3-MePh$_2$SiCH$_2$Cp)(3-Ph$_3$SiCH$_2$Cp)HfPh$_2$, Rac/meso-Et$_4$Si$_2$(3-MePh$_2$SiCH$_2$Cp)(3-Ph$_3$SiCH$_2$Cp)HfPh$_2$, Rac/meso-$^i$Pr$_4$Si$_2$(3-MePh$_2$SiCH$_2$Cp)(3-Ph$_3$SiCH$_2$Cp)HfPh$_2$, Rac/meso-Ph$_4$Si$_2$(3-MePh$_2$SiCH$_2$Cp)(3-Ph$_3$SiCH$_2$Cp)HfPh$_2$, Rac/meso-Me$_2$Ph$_2$Si$_2$(3-MePh$_2$SiCH$_2$Cp)(3-Ph$_3$SiCH$_2$Cp)HfPh$_2$, Rac/meso-Me$_4$Si$_2$(3-Ph$_3$SiCH$_2$Cp)$_2$HfPh$_2$, Rac/meso-Et$_4$Si$_2$(3-Ph$_3$SiCH$_2$Cp)$_2$HfPh$_2$, Rac/meso-$^i$Pr$_4$Si$_2$(3-Ph$_3$SiCH$_2$Cp)$_2$HfPh$_2$, Rac/meso-Ph$_4$Si$_2$(3-Ph$_3$SiCH$_2$Cp)$_2$HfPh$_2$ and Rac/meso-Me$_2$Ph$_2$Si$_2$(3-Ph$_3$SiCH$_2$Cp)$_2$HfPh$_2$, Rac/meso-Me$_4$Si$_2$(3-Me$_3$SiCH$_2$Cp)$_2$HfBn$_2$, Rac/meso-Et$_4$Si$_2$(3-Me$_3$SiCH$_2$Cp)$_2$HfBn$_2$, Rac/meso-$^i$Pr$_4$Si$_2$(3-Me$_3$SiCH$_2$Cp)$_2$HfBn$_2$, Rac/meso-Ph$_4$Si$_2$(3-Me$_3$SiCH$_2$Cp)$_2$HfBn$_2$, Rac/meso-Me$_2$Ph$_2$Si$_2$(3-Me$_3$SiCH$_2$Cp)$_2$HfBn$_2$, Rac/meso-Me$_4$Si$_2$(3-Et$_3$SiCH$_2$Cp)$_2$HfBn$_2$, Rac/meso-Et$_4$Si$_2$(3-Et$_3$SiCH$_2$Cp)$_2$HfBn$_2$, Rac/meso-$^i$Pr$_4$Si$_2$(3-Et$_3$SiCH$_2$Cp)$_2$HfBn$_2$, Rac/meso-Ph$_4$Si$_2$(3-Et$_3$SiCH$_2$Cp)$_2$HfBn$_2$, Rac/meso-Me$_2$Ph$_2$Si$_2$(3-Et$_3$SiCH$_2$Cp)$_2$HfBn$_2$, Rac/meso-Me$_4$Si$_2$(3-Cy$_3$SiCH$_2$Cp)$_2$HfBn$_2$, Rac/meso-Et$_4$Si$_2$(3-Cy$_3$SiCH$_2$Cp)$_2$HfBn$_2$, Rac/meso-$^i$Pr$_4$Si$_2$(3-Cy$_3$SiCH$_2$Cp)$_2$HfBn$_2$, Rac/meso-Ph$_4$Si$_2$(3-Cy$_3$SiCH$_2$Cp)$_2$HfBn$_2$, Rac/meso-Me$_2$Ph$_2$Si$_2$(3-Cy$_3$SiCH$_2$Cp)$_2$HfBn$_2$, Rac/meso-Me$_4$Si$_2$(3-Me$_2$PhSiCH$_2$Cp)$_2$HfBn$_2$, Rac/meso-Et$_4$Si$_2$(3-Me$_2$PhSiCH$_2$Cp)$_2$HfBn$_2$, Rac/meso-$^i$Pr$_4$Si$_2$(3-Me$_2$PhSiCH$_2$Cp)$_2$HfBn$_2$, Rac/meso-Ph$_4$Si$_2$(3-Me$_2$PhSiCH$_2$Cp)$_2$HfBn$_2$, Rac/meso-Me$_2$Ph$_2$Si$_2$(3-Me$_2$PhSiCH$_2$Cp)$_2$HfBn$_2$, Rac/meso-Me$_4$Si$_2$(3-MePh$_2$SiCH$_2$Cp)$_2$HfBn$_2$, Rac/meso-Et$_4$Si$_2$(3-MePh$_2$SiCH$_2$Cp)$_2$HfBn$_2$, Rac/meso-$^i$Pr$_4$Si$_2$(3-MePh$_2$SiCH$_2$Cp)$_2$HfBn$_2$, Rac/meso-Ph$_4$Si$_2$(3-MePh$_2$SiCH$_2$Cp)$_2$HfBn$_2$, Rac/meso-Me$_2$Ph$_2$Si$_2$(3-MePh$_2$SiCH$_2$Cp)$_2$HfBn$_2$, Rac/meso-Me$_4$Si$_2$(3-Ph$_3$SiCH$_2$Cp)$_2$HfBn$_2$, Rac/meso-Et$_4$Si$_2$(3-Ph$_3$SiCH$_2$Cp)$_2$HfBn$_2$, Rac/meso-$^i$Pr$_4$Si$_2$(3-Ph$_3$SiCH$_2$Cp)$_2$HfBn$_2$, Rac/meso-Ph$_4$Si$_2$(3-Ph$_3$SiCH$_2$Cp)$_2$HfBn$_2$, Rac/meso-Me$_2$Ph$_2$Si$_2$(3-Ph$_3$SiCH$_2$Cp)$_2$HfBn$_2$, Me$_4$Si$_2$(2,3,4,5-Me$_4$Cp)(3-Me$_3$SiCH$_2$Cp)HfBn$_2$, Et$_4$Si$_2$(2,3,4,5-Me$_4$Cp)(3-Me$_3$SiCH$_2$Cp)HfBn$_2$, $^i$Pr$_4$Si$_2$(2,3,4,5-Me$_4$Cp)(3-Me$_3$SiCH$_2$Cp)HfBn$_2$, Ph$_4$Si$_2$(2,3,4,5-Me$_4$Cp)(3-Me$_3$SiCH$_2$Cp)HfBn$_2$, Me$_2$Ph$_2$Si$_2$(2,3,4,5-Me$_4$Cp)(3-Me$_3$SiCH$_2$Cp)HfBn$_2$, Me$_4$Si$_2$(2,3,4,5-Me$_4$Cp)(3-Et$_3$SiCH$_2$Cp)HfBn$_2$, Et$_4$Si$_2$(2,3,4,5-Me$_4$Cp)(3-Et$_3$SiCH$_2$Cp)HfBn$_2$, $^i$Pr$_4$Si$_2$(2,3,4,5-Me$_4$Cp)(3-Et$_3$SiCH$_2$Cp)HfBn$_2$, Ph$_4$Si$_2$(2,3,4,5-Me$_4$Cp)(3-Et$_3$SiCH$_2$Cp)HfBn$_2$, Me$_2$Ph$_2$Si$_2$(2,3,4,5-Me$_4$Cp)(3-Et$_3$SiCH$_2$Cp)HfBn$_2$, Me$_4$Si$_2$(2,3,4,5-Me$_4$Cp)(3-Cy$_3$SiCH$_2$Cp)HfBn$_2$, Et$_4$Si$_2$(2,3,4,5-Me$_4$Cp)(3-Cy$_3$SiCH$_2$Cp)HfBn$_2$, $^i$Pr$_4$Si$_2$(2,3,4,5-Me$_4$Cp)(3-Cy$_3$SiCH$_2$Cp)HfBn$_2$, Ph$_4$Si$_2$(2,3,4,5-Me$_4$Cp)(3-Cy$_3$SiCH$_2$Cp)HfBn$_2$, Me$_2$Ph$_2$Si$_2$(2,3,4,5-Me$_4$Cp)(3-Cy$_3$SiCH$_2$Cp)HfBn$_2$, Me$_4$Si$_2$(2,3,4,5-Me$_4$Cp)(3-Me$_2$PhSiCH$_2$Cp)HfBn$_2$, Et$_4$Si$_2$(2,3,4,5-Me$_4$Cp)(3-Me$_2$PhSiCH$_2$Cp)HfBn$_2$, $^i$Pr$_4$Si$_2$(2,3,4,5-Me$_4$Cp)(3-Me$_2$PhSiCH$_2$Cp)HfBn$_2$, Ph$_4$Si$_2$(2,3,4,5-Me$_4$Cp)(3-Me$_2$PhSiCH$_2$Cp)HfBn$_2$, Me$_2$Ph$_2$Si$_2$(2,3,4,5-Me$_4$Cp)(3-Me$_2$PhSiCH$_2$Cp)HfBn$_2$, Me$_4$Si$_2$(2,3,4,5-Me$_4$Cp)(3-MePh$_2$SiCH$_2$Cp)HfBn$_2$, Et$_4$Si$_2$(2,3,4,5-Me$_4$Cp)(3-MePh$_2$SiCH$_2$Cp)HfBn$_2$, $^i$Pr$_4$Si$_2$(2,3,4,5-Me$_4$Cp)(3-MePh$_2$SiCH$_2$Cp)HfBn$_2$, Ph$_4$Si$_2$(2,3,4,5-Me$_4$Cp)(3-MePh$_2$SiCH$_2$Cp)HfBn$_2$, Me$_2$Ph$_2$Si$_2$(2,3,4,5-Me$_4$Cp)(3-MePh$_2$SiCH$_2$Cp)HfBn$_2$, Me$_4$Si$_2$(2,3,4,5-Me$_4$Cp)(3-Ph$_3$SiCH$_2$Cp)HfBn$_2$, Et$_4$Si$_2$(2,3,4,5-Me$_4$Cp)(3-Ph$_3$SiCH$_2$Cp)HfBn$_2$, $^i$Pr$_4$Si$_2$(2,3,4,5-Me$_4$Cp)(3-Ph$_3$SiCH$_2$Cp)HfBn$_2$, Ph$_4$Si$_2$(2,3,4,5-Me$_4$Cp)(3-Ph$_3$SiCH$_2$Cp)HfBn$_2$, Me$_2$Ph$_2$Si$_2$(2,3,4,5-Me$_4$Cp)(3-Ph$_3$SiCH$_2$Cp)HfBn$_2$, Me$_4$Si$_2$(Cp)(3-Me$_3$SiCH$_2$Cp)HfBn$_2$, Et$_4$Si$_2$(Cp)(3-Me$_3$SiCH$_2$Cp)HfBn$_2$, $^i$Pr$_4$Si$_2$(Cp)(3-Me$_3$SiCH$_2$Cp)HfBn$_2$, Ph$_4$Si$_2$(Cp)(3-Me$_3$SiCH$_2$Cp)HfBn$_2$, Me$_2$Ph$_2$Si$_2$(Cp)(3-Me$_3$SiCH$_2$Cp)HfBn$_2$, Me$_4$Si$_2$(Cp)(3-Et$_3$SiCH$_2$Cp)HfBn$_2$, Et$_4$Si$_2$(Cp)(3-Et$_3$SiCH$_2$Cp)HfBn$_2$, $^i$Pr$_4$Si$_2$(Cp)(3-Et$_3$SiCH$_2$Cp)HfBn$_2$, Ph$_4$Si$_2$(Cp)(3-Et$_3$SiCH$_2$Cp)HfBn$_2$, Me$_2$Ph$_2$Si$_2$(Cp)(3-Et$_3$SiCH$_2$Cp)HfBn$_2$, Me$_4$Si$_2$(Cp)(3-Cy$_3$SiCH$_2$Cp)HfBn$_2$, Et$_4$Si$_2$(Cp)(3-Cy$_3$SiCH$_2$Cp)HfBn$_2$, $^i$Pr$_4$Si$_2$(Cp)(3-Cy$_3$SiCH$_2$Cp)HfBn$_2$, Ph$_4$Si$_2$(Cp)(3-Cy$_3$SiCH$_2$Cp)HfBn$_2$, Me$_2$Ph$_2$Si$_2$(Cp)(3-Cy$_3$SiCH$_2$Cp)HfBn$_2$, Me$_4$Si$_2$(Cp)(3-Me$_2$PhSiCH$_2$Cp)HfBn$_2$, Et$_4$Si$_2$(Cp)(3-Me$_2$PhSiCH$_2$Cp)HfBn$_2$, $^i$Pr$_4$Si$_2$(Cp)(3-Me$_2$PhSiCH$_2$Cp)HfBn$_2$, Ph$_4$Si$_2$(Cp)(3-Me$_2$PhSiCH$_2$Cp)HfBn$_2$, Me$_2$Ph$_2$Si$_2$(Cp)(3-Me$_2$PhSiCH$_2$Cp)HfBn$_2$, MePh$_2$SiCH$_2$Cp)HfBn$_2$, Me$_4$Si$_2$(Cp)(3-Ph$_3$SiCH$_2$Cp)HfBn$_2$, Et$_4$Si$_2$(Cp)(3-Ph$_3$SiCH$_2$Cp)HfBn$_2$, $^i$Pr$_4$Si$_2$(Cp)(3-Ph$_3$SiCH$_2$Cp)HfBn$_2$, Ph$_4$Si$_2$(Cp)(3-Ph$_3$SiCH$_2$Cp)HfBn$_2$, Me$_2$Ph$_2$Si$_2$(Cp)(3-Ph$_3$SiCH$_2$Cp)HfBn$_2$, Rac/meso-Me$_4$Si$_2$(3-Me$_3$SiCH$_2$Cp)(3-Et$_3$SiCH$_2$Cp)HfBn$_2$, Rac/meso-Et$_4$Si$_2$(3-Me$_3$SiCH$_2$Cp)(3-Et$_3$SiCH$_2$Cp)HfBn$_2$, Rac/meso-$^i$Pr$_4$Si$_2$(3-Me$_3$SiCH$_2$Cp)(3-Et$_3$SiCH$_2$Cp)HfBn$_2$, Rac/meso-Ph$_4$Si$_2$(3-Me$_3$SiCH$_2$Cp)(3-Et$_3$SiCH$_2$Cp)HfBn$_2$, Rac/meso-Me$_2$Ph$_2$Si$_2$(3-Me$_3$SiCH$_2$Cp)(3-Et$_3$SiCH$_2$Cp)HfBn$_2$, Rac/meso-Me$_4$Si$_2$(3-Et$_3$SiCH$_2$Cp)(3-Cy$_3$SiCH$_2$Cp)HfBn$_2$, Rac/meso-Et$_4$Si$_2$(3-Et$_3$SiCH$_2$Cp)(3-Cy$_3$SiCH$_2$Cp)HfBn$_2$, Rac/meso-$^i$Pr$_4$Si$_2$(3-Et$_3$SiCH$_2$Cp)(3-Cy$_3$SiCH$_2$Cp)HfBn$_2$, Rac/meso-Ph$_4$Si$_2$(3-Et$_3$SiCH$_2$Cp)(3-Cy$_3$SiCH$_2$Cp)HfBn$_2$, Rac/meso-Me$_2$Ph$_2$Si$_2$(3-Et$_3$SiCH$_2$Cp)(3-Cy$_3$SiCH$_2$Cp)HfBn$_2$, Rac/meso-Me$_4$Si$_2$(3-Cy$_3$SiCH$_2$Cp)(3-Me$_2$PhSiCH$_2$Cp)HfBn$_2$, Rac/meso-Et$_4$Si$_2$(3-Cy$_3$SiCH$_2$Cp)(3-Me$_2$PhSiCH$_2$Cp)HfBn$_2$, Rac/meso-$^i$Pr$_4$Si$_2$(3-Cy$_3$SiCH$_2$Cp)(3-Me$_2$PhSiCH$_2$Cp)HfBn$_2$, Rac/meso-Ph$_4$Si$_2$(3-Cy$_3$SiCH$_2$Cp)(3-Me$_2$PhSiCH$_2$Cp)HfBn$_2$, Rac/meso-Me$_2$Ph$_2$Si$_2$(3-Cy$_3$SiCH$_2$Cp)(3-Me$_2$PhSiCH$_2$Cp)HfBn$_2$, Rac/meso-Me$_4$Si$_2$(3-Me$_2$PhSiCH$_2$Cp)(3-MePh$_2$SiCH$_2$Cp)HfBn$_2$, Rac/meso-Et$_4$Si$_2$(3-Me$_2$PhSiCH$_2$Cp)(3-MePh$_2$SiCH$_2$Cp)HfBn$_2$, Rac/meso-$^i$Pr$_4$Si$_2$(3-Me$_2$PhSiCH$_2$Cp)(3-MePh$_2$SiCH$_2$Cp)HfBn$_2$, Rac/meso- Ph$_4$Si$_2$(3-Me$_2$PhSiCH$_2$Cp)(3-MePh$_2$SiCH$_2$Cp)HfBn$_2$, Rac/meso-Me$_2$Ph$_2$Si$_2$(3-Me$_2$PhSiCH$_2$Cp)(3-MePh$_2$SiCH$_2$Cp)HfBn$_2$, Rac/meso-Me$_4$Si$_2$(3-MePh$_2$SiCH$_2$Cp)(3-Ph$_3$SiCH$_2$Cp)HfBn$_2$, Rac/meso-Et$_4$Si$_2$(3-MePh$_2$SiCH$_2$Cp)(3-Ph$_3$SiCH$_2$Cp)HfBn$_2$, Rac/meso-$^i$Pr$_4$Si$_2$(3-MePh$_2$SiCH$_2$Cp)(3-Ph$_3$SiCH$_2$Cp)HfBn$_2$, Rac/meso-Ph$_4$Si$_2$(3-MePh$_2$SiCH$_2$Cp)(3-Ph$_3$SiCH$_2$Cp)HfBn$_2$, Rac/meso-Me$_2$Ph$_2$Si$_2$(3-MePh$_2$SiCH$_2$Cp)(3-Ph$_3$SiCH$_2$Cp)HfBn$_2$, Rac/meso-Me$_4$Si$_2$(3-Ph$_3$SiCH$_2$Cp)$_2$HfBn$_2$, Rac/meso-Et$_4$Si$_2$(3-Ph$_3$SiCH$_2$Cp)$_2$HfBn$_2$, Rac/meso-$^i$Pr$_4$Si$_2$(3-Ph$_3$SiCH$_2$Cp)$_2$HfBn$_2$, Rac/meso-Ph$_4$Si$_2$(3-Ph$_3$SiCH$_2$Cp)$_2$HfBn$_2$ and Rac/meso-Me$_2$Ph$_2$Si$_2$(3-Ph$_3$SiCH$_2$Cp)$_2$HfBn$_2$.

18. The catalyst compound of paragraph 1, wherein the catalyst compound is selected from:

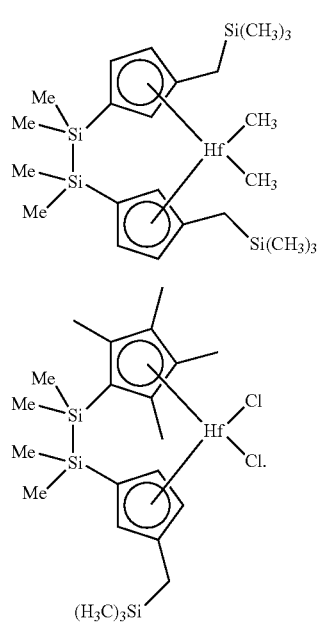

19. A catalyst system comprising an activator and the catalyst compound of any of paragraphs 1 to 18.
20. The catalyst system of paragraph 19, further comprising a support material.
21. The catalyst system of paragraph 20, wherein the support material is selected from Al$_2$O$_3$, ZrO$_2$, SiO$_2$, SiO$_2$/Al$_2$O$_3$, SiO$_2$/TiO$_2$, silica clay, silicon oxide/clay, or mixtures thereof.
22. The catalyst system of any of paragraphs 19 to 21, wherein the activator comprises an alkylalumoxane.
23. A process for the production of an ethylene alpha-olefin copolymer comprising: polymerizing ethylene and at least one C$_3$-C$_{20}$ alpha-olefin by contacting the ethylene and the at least one C$_3$-C$_{20}$ alpha-olefin with a catalyst system of any of paragraphs 20 to 22 in at least one gas phase reactor at a reactor pressure of from 0.7 to 70 bar and a reactor temperature of from 20° C. to 150° C. to form an ethylene alpha-olefin copolymer.
24. The process of paragraph 23, wherein the catalyst has an activity from 100,000 gP/mmolCat/hour to 1,500,000 gP/mmolCat/hour.
25. The process of paragraphs 23 or 24, wherein the catalyst has a productivity from 10,000 gPgcat$^{-1}$ hr$^{-1}$ to 50,000 gPgcat$^{-1}$ hr$^{-1}$.
26. The process of paragraph 25, wherein the catalyst has a productivity from 15,000 gPgcat$^{-1}$ hr$^1$ to 25,000 gPgcat$^{-1}$ hr$^1$.
27. A process for the production of an ethylene alpha-olefin copolymer comprising: polymerizing ethylene and at least one C$_3$-C$_{20}$ alpha-olefin by contacting the ethylene and the at least one C$_3$-C$_{20}$ alpha-olefin with a catalyst system of any of paragraphs 20 to 22 in at least one slurry phase reactor at a reactor pressure of from 0.7 to 70 bar and a reactor temperature of from 20° C. to 150° C. to form an ethylene alpha-olefin copolymer.
28. The process of paragraph 27, wherein the catalyst has an activity from 100,000 gP/mmolCat/hour to 1,500,000 gP/mmolCat/hour.
29. The process of paragraphs 27 or 28, wherein the catalyst has a productivity from 10,000 gPgcat$^{-1}$ hr$^1$ to 50,000 gPgcat$^{-1}$ hr$^1$.
30. The process of paragraph 29, wherein the catalyst has a productivity from 15,000 gPgcat$^{-1}$ hr$^1$ to 25,000 gPgcat$^{-1}$ hr$^1$.
31. An ethylene alpha-olefin copolymer obtained by contacting ethylene, at least one C$_3$-C$_{20}$ alpha-olefin, and a catalyst system of any of paragraphs 20 to 22 in at least one gas-phase reactor, the copolymer having an Mw value of from 50,000 to 120,000, an Mn value of from 20,000 to 40,000, an Mw/Mn value of from 1 to 5, an Mz value of from 150,000 to 250,000, a comonomer content of from 7 wt % to 12 wt %, and a g'vis value of 0.97 or greater.
32. The ethylene copolymer of paragraph 31, wherein the copolymer has a broad orthogonal composition distribution.

Experimental

ES-70 is a silica that has been calcined at 875° C., available from PQ Corporation, Conshohocken, Pa. All anhydrous solvents were purchased from Fisher Chemical and were degassed and dried over molecular sieves prior to use. Deutrated solvents were purchased from Cambridge Isotope Laboratories and dried over molecular sieves prior to use. n-Butyl lithium (2.5 M solution in hexane) and tetramethyldichlorodisilane (Me$_4$Si$_2$Cl$_2$) were purchased from Sigma-Aldrich. Hafnium tetrachloride (HfCl$_4$) 99+% and trimethylsilylmethyltrifluoromethanesulfonate were purchased from Strem Chemicals and TCI America, respectively, and used as received. Potassium cyclopentadienide (KCp) was prepared according to the procedure described in *J. Organomet. Chem.* 1975, 84, C$_1$-C$_4$. The $^1$H NMR measurements were obtained as described above.

MAO was obtained as a 30 wt % MAO in toluene solution from Albemarle (e.g., 13.6 wt % Al or 5.04 mmol/g). All $^1$H NMR data were collected on a Bruker AVANCE III 400 MHz spectrometer running Topspin™ 3.0 software at room temperature (RT) using a deuterated solvent for all materials.

Slurry and solvent liquid ratios are given as weight ratios relative to the starting silica material, e.g., raw silica or silica supported MAO and/or catalyst. For example, if it is stated "the silica was slurried in 5× toluene," it means that the silica was slurried in 5 g of toluene for every 1 g of silica.

Molecular Weight and Comonomer Composition with PolymerChar GPC-IR (GPC-4D):

The distribution and the moments of molecular weight (Mw, Mn, Mw/Mn, etc.) and the comonomer content were determined with high temperature Gel Permeation Chromatography (PolymerChar GPC-IR) equipped with a multiple-channel band filter based Infrared detector ensemble IR5, in which a broad-band channel was used to measure the polymer concentration while two narrow-band channels were used for characterizing composition. Three Agilent PLgel 10 μm Mixed-B LS columns were used to provide polymer separation. Aldrich reagent grade 1,2,4-trichlorobenzene (TCB) with 300 ppm antioxidant butylated hydroxytoluene (BHT) was used as the mobile phase. The TCB mixture was filtered through a 0.1 μm Teflon filter and degassed with an online degasser before entering the GPC-IR instrument. The nominal flow rate was 1.0 mL/min and the nominal injection volume was 200 μL. The whole system including transfer lines, columns, and detectors were contained in an oven maintained at 145° C. A given amount of polymer sample was weighed and sealed in a standard vial with 80 μL of flow marker (heptane) added to it. After loading the vial in the autosampler, polymer was automatically dissolved in the instrument with 8 mL of added TCB solvent. The polymer was dissolved at 160° C. with continuous shaking, generally for about 1 hour for polyethylene (PE) samples or 2 hours for polypropylene (PP) samples. The TCB densities used in the concentration calculation were 1.463 g/ml at RT and 1.284 g/ml at 145° C. The sample solution concentration was from 0.2 to 2.0 mg/ml, with lower concentrations being used for higher molecular weight samples.

The concentration, c, at each point in the chromatogram was calculated from the baseline-subtracted IR5 broadband signal, I, using the following equation:

$$c = \alpha I$$

where α is the mass constant determined with PE or PP standards. The mass recovery was calculated from the ratio of the integrated area of the concentration chromatography over elution volume and the injection mass, which is equal to the pre-determined concentration multiplied by injection loop volume.

The molecular weight was determined by combining a universal calibration relationship with the column calibration which was performed with a series of monodispersed polystyrene (PS) standards. The MW was calculated at each elution volume with following equation:

$$\log M_X = \frac{\log(K_{PS}/K_X)}{a_X + 1} + \frac{a_{PS} + 1}{a_X + 1} \log M_{PS}$$

where the variables with subscript "X" stand for the test sample while those with subscript "PS" stand for PS. In this method, $a_{PS}=0.67$ and $K_{PS}=0.000175$ while $a_X$ and $K_X$ were obtained from published literature. Specifically, a/K=0.695/0.000579 for PE and 0.705/0.0002288 for PP.

The comonomer composition was determined by the ratio of the IR detector intensity corresponding to $CH_2$ and $CH_3$ channel calibrated with a series of PE and PP homo/copolymer standards whose nominal value are predetermined by NMR or FTIR.

Supportation of MAO on Silica:

The following or a similar procedure was used to prepare the supported MAOs (sMAOs). The amount of calcined silica was slurried into 6× toluene in a reactor stirred at 500 rpm. The amount (mmol Al/g silica) of 30 wt % MAO solution (e.g., 13.6 wt % Al, Albemarle) was added slowly to the reactor to maintain the temperature at the desired MAO addition temperature, then the reactor was stirred at 350 rpm at RT for 30 minutes. The reactor was heated to 100° C. and agitated for 3 hours. For sMAO, the mixture was filtered through a medium frit, the wet solid was washed with 10× toluene, then 10× hexane, and dried under vacuum for 3 hours. It is not necessary to isolate that sMAO as a solid, however, especially when the supernate from the sMAO preparation contains no significant free MAO. Rather, the preparation of the finished catalyst outlined below simply continued without this step, e.g., a "one-pot" reaction.

EXAMPLES

Synthesis of Trimethylsilylmethylcyclopentadiene, $Me_3SiCH_2CpH$

A neat (trimethylsilyl)methyl trifluoromethanesulfonate (25.0 g, 105.8 mmol) was dissolved in 300 mL of diethyl ether and cooled to −25° C. To this, a solid potassium cyclopentadienide (11.14 g, 106.9 mmol) was slowly added over a period of 10-15 minutes. The resulting mixture was stirred overnight at room temperature. Volatiles from the reaction mixture were carefully removed under vacuum to avoid evaporating the volatile trimethylsilylmethylcyclopentadiene, $Me_3SiCH_2CpH$. The reaction flask (250 mL round bottom flask) and frit with celite were weighed to calculate yield of the product after extraction which was determined to be 15.47 g (95.2%). The crude materials were extracted into pentane (3×50 mL) and used without any further purification. The $^1H$ NMR spectrum was recorded for the crude material to ensure the product formation. $^1H$ NMR (400 MHz, $C_6D_6$): δ −0.05 (9H, s, Si—$CH_3$), 1.77 (2H, d, $J_{HH}=1.2$ Hz, $Me_3Si$—$CH_2$), 2.83 (1H, sex, $J_{HH}=1.5$ Hz, Cp—CH), 5.80-6.49 (4H, m, Cp-CH) ppm.

Synthesis of Lithium Trimethylsilylmethylcyclopentadienide, $Me_3SiCH_2CpLi$

A hexane solution of n-butyllithium (41.5 mL, 103.8 mmol, 2.5 M solution in diethyl ether) was added drop-wise to a precooled solution (pentane and diethyl ether, 100/100 mL) of $Me_3SiCH_2CpH$ (15.47 g, 101.7 mmol) over a period of 40-50 minutes at −25° C. The resulting mixture was gradually brought to room temperature and then continuously stirred overnight. Volatiles were removed in vacuo and remaining crude materials were thoroughly washed with pentane. The final materials were dried under vacuum to obtain a colorless crystalline solid of $Me_3SiCH_2CpLi$ in 13.6 g (84.6%) yield. $^1H$ NMR (400 MHz, THF-$d_8$): δ −0.09 (9H, s, Si—$CH_3$), 1.84 (2H, s, $Me_3Si$—$CH_2$), 5.36 (2H, t, $J_{HH}=2.6$ Hz, Cp—H), 5.47 (2H, t, $J_{HH}=2.6$ Hz, Cp—CH) ppm.

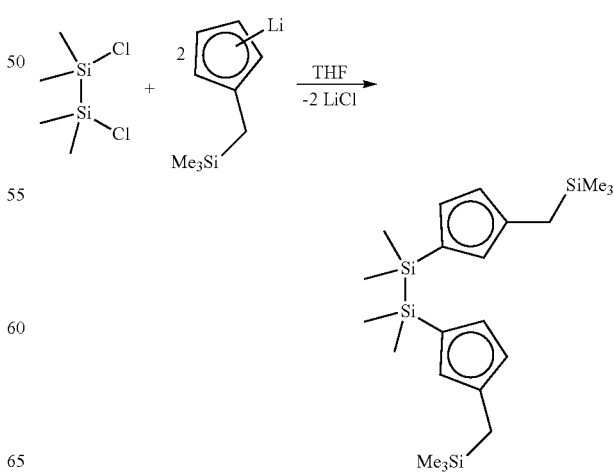

Synthesis of Tetramethyldisilyl-bis(trimethylsilylmethylcyclopentadiene), Me$_4$Si$_2$(Me$_3$SiCH$_2$CpH)$_2$ Neat Me$_4$Si$_2$Cl$_2$ (2.0 g, 10.8 mmol) was dissolved in 100 mL of THF and cooled to −25° C. Solid Me$_3$SiCH$_2$CpLi (3.44 g, 21.7) was added to the above mixture, and the resulting mixture was stirred overnight at room temperature to ensure completion of the reaction. Volatiles from the reaction mixture were removed in vacuo and subsequently triturated with hexane to remove trace THF. The crude materials were extracted into hexane and, followed by solvent removal under vacuum, afforded a thick yellow viscous oil of Me$_4$Si$_2$(Me$_3$SiCH$_2$CpH)$_2$ in 4.3 g (96.1%) yield.

Synthesis of Lithium tetramethyldisilyl-bis(trimethylsilylmethylcyclopentadienide), Me$_4$Si$_2$(Me$_3$SiCH$_2$Cp)$_2$Li$_2$

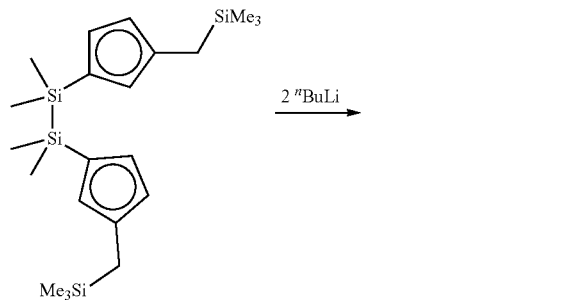

A hexane solution of n-butyllithium (9.4 mL, 23.4 mmol, 2.5 M solution) was added dropwise to a precooled solution of Me$_4$Si$_2$(Me$_3$SiCH$_2$CpH)$_2$ (4.85 g, 11.6 mmol) in 100 mL of THF over a period of 25-30 minutes. The resulting mixture was gradually warmed to room temperature and then continuously stirred for 2 hours at room temperature. Volatiles from the reaction mixture were removed in vacuo, and triturated with hexane. The crude materials were thoroughly washed with hexane to remove any soluble impurities and dried under vacuum to obtain the colorless crystalline solid of Me$_4$Si$_2$(Me$_3$SiCH$_2$Cp)$_2$Li$_2$ in 4.4 g (99.5%) yield. $^1$H NMR (400 MHz, THF-d$_8$): δ −0.07 (18H, s, SiMe$_3$—CH$_3$), 0.18 (12H, s, SiMe$_2$—CH$_3$), 1.72 (4H, s, Me$_3$Si—CH$_2$), 5.25 (2H, s, Cp-CH), 5.32 (2H, s, Cp-CH), 5.35 (2H, s, Cp-CH) ppm.

Synthesis of Meso-tetramethyldisilyl-bis(trimethylsilylmethylcyclopentadienyl)hafnium dichloride, meso-Me$_4$Si$_2$(Me$_3$SiCH$_2$Cp)$_2$HfC$_2$

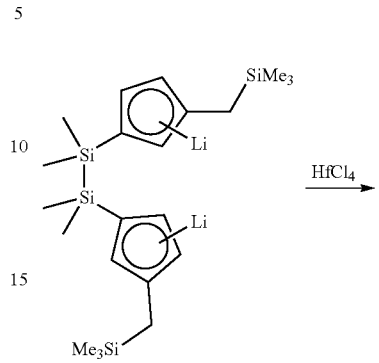

Solid HfCl$_4$ (3.50 g, 10.9 mmol) was added to a precooled diethyl ether (100 mL) solution of Me$_4$Si$_2$(Me$_3$SiCH$_2$Cp)Li$_2$ (4.7 g, 10.9 mmol) at −25° C. The resulting mixture was stirred overnight at room temperature. Insoluble materials were filtered out and volatiles from the filtrate were removed in vacuo. The crude materials were washed with cold hexane to remove soluble impurities. The resulting materials were dried under vacuum to obtain the pale yellow crystalline solid of meso-Me$_4$Si$_2$(Me$_3$SiCH$_2$Cp)$_2$HfCl$_2$ in 6.4 g (96.2%) yield. $^1$H NMR (400 MHz, CD$_2$Cl$_2$): δ −0.07 (18H, s, SiMe$_3$—CH$_3$), 0.25 (6H, s, SiMe$_2$—CH$_3$), 0.31 (6H, s, SiMe$_2$—CH$_3$), 2.29 (2H, d, Me$_3$Si—CH$_2$), 2.66 (2H, d, Me$_3$Si—CH$_2$), 6.08 (2H, m, Cp-CH), 6.16 (2H, s, Cp-CH), 6.24 (2H, s, Cp-CH) ppm.

Synthesis of Catalyst 1: Meso-tetramethyldisilyl-bis(trimethylsilylmethylcyclopentadienyl)hafnium dimethyl, meso-Me$_4$Si$_2$(Me$_3$SiCH$_2$Cp)$_2$HfMe$_2$

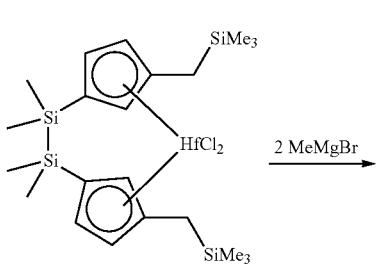

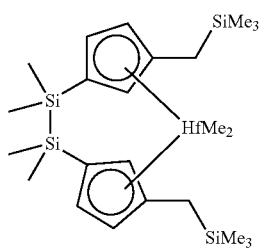

An ethereal solution of MeMgBr (6.8 mL, 20.3 mmol) was added dropwise to a precooled diethyl ether solution of meso-Me$_4$Si$_2$(Me$_3$SiCH$_2$Cp)$_2$HfCl$_2$ (6.7 g, 10.1 mmol) over a period of 5-10 minutes at −25° C. The resulting mixture was stirred overnight at room temperature to ensure completion of the reaction. All volatiles were removed in vacuo and triturated with hexane (3×20 mL), and then subsequently the crude materials were extracted into hexane. Solvent removal in vacuo and recrystallization in hexane at −25° C. afforded the colorless crystalline solid of meso-Me$_4$Si$_2$(Me$_3$SiCH$_2$Cp)$_2$HfMe$_2$ in 4.8 g (79.9%) yield. $^1$H NMR (400 MHz, C$_6$D$_6$): δ −0.20 (3H, s, Hf—CH$_3$), −0.15 (3H, s, Hf—CH$_3$), 0.04 (18H, s, SiMe$_3$—CH$_3$), 0.21 (6H, s, SiMe$_2$—CH$_3$), 0.25 (6H, s, SiMe$_2$—CH$_3$), 2.08 (2H, d, Me$_3$Si—CH$_2$), 2.28 (2H, d, Me$_3$Si—CH$_2$), 5.77 (2H, m, Cp-CH), 5.86 (2H, m, Cp-CH), 6.00 (2H, m, Cp-CH) ppm.

Synthesis of Tetramethyldisilyl-(2,3,4,5-tetramethyl-2,4-cyclopentadien-1-yl)(chloride), Me$_4$Si$_2$(Me$_4$CpH)(Cl)

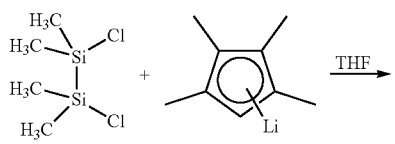

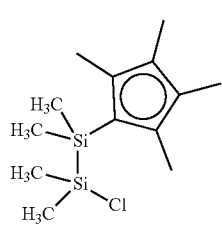

Solid Me$_4$CpLi (3.29 g, 26 mmol) was added to a precooled THF solution of Me$_4$Si$_2$Cl$_2$ (4.8 g, 26 mmol) at −25° C. The resulting mixture was stirred overnight at room temperature, during this time the resulting mixture turned to turbid. Volatiles from the reaction mixture were removed in vacuo and subsequently triturated with hexane. The crude materials were extracted into hexane and followed by solvent removal under reduced pressure afforded a pale yellow oil of Me$_4$Si$_2$(Me$_4$CpH)(Cl) in 6.1 g (87.2%) yield. $^1$H NMR (400 MHz, C$_6$D$_6$): δ 0.24 (6H, s, SiMe$_2$—CH$_3$), 0.31 (6H, s, SiMe$_2$—CH$_3$), 1.69 (6H, s, Cp-CH$_3$), 1.83 (6H, s, Cp-CH$_3$), 2.68 (1H, bs, Cp-CH) ppm.

Synthesis of Tetramethyldisilyl-(2,3,4,5-tetramethyl-2,4-cyclopentadien-1-yl)(trimethylsilylmethylcyclopentadiene), Me$_4$Si$_2$(Me$_4$CpH)(Me$_3$SiCH$_2$CpH)

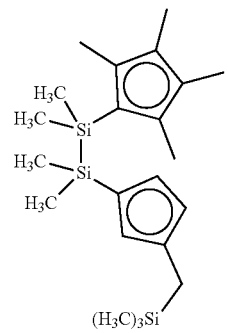

Solid Me$_3$SiCH$_2$CpLi (3.525 g, 22 mmol) was added to a precooled THF solution of Me$_4$Si$_2$(Me$_4$CpH)Cl (6.08 g, 22 mmol) at −25° C. The resulting mixture was stirred overnight at room temperature to ensure completion of the reaction, during this time solution became clear. Volatiles from the reaction mixture were removed in vacuo and subsequently triturated with hexane. The crude materials were extracted into hexane and followed by solvent removal under reduced pressure afforded a thick yellow oil of Me$_4$Si$_2$(Me$_4$CpH)(Me$_3$SiCH$_2$CpH) in 8.52 g (98.4%) yield. $^1$H NMR (400 MHz, C$_6$D$_6$): δ −0.13 (5H, s, SiMe$_2$—CH$_3$), 0.04 (9H, s, SiMe$_3$—CH$_3$), 0.28 (7H, s, SiMe$_2$—CH$_3$), 1.77 (6H, s, Cp-CH$_3$), 1.85 (2H, s, Me$_3$Si—CH$_2$), 1.95 (6H, s, Cp—CH$_3$), 2.76 (1H, bs, Cp—CH), 3.17 (1H, bs, Cp—CH), 5.91 (1H, bs, Cp—CH), 6.39 (2H, bs, Cp—CH) ppm.

Synthesis of Lithium Tetramethyldisilyl-(tetramethylcyclopentadienide)-(trimethylsilylmethylcyclopentadienide), Me$_4$Si$_2$(Me$_4$Cp)(Me$_3$SiCH$_2$Cp)Li$_2$

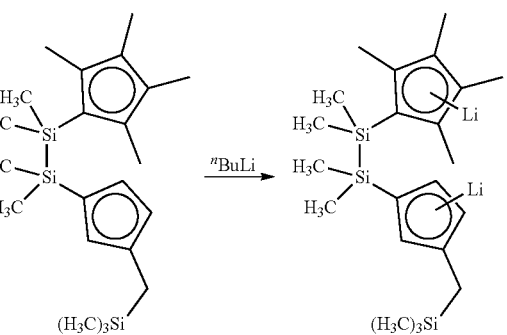

A hexane solution of n-butyl lithium (17.7 mL, 44.0 mmol, 2.5 M solution) was added drop wise to a precooled solution of Me$_2$Si(Me$_4$CpH)(Me$_3$SiCH$_2$CpH) (8.5 g, 22.0 mmol) in 150 mL of Et$_2$O over a period of 15-20 minutes at −25° C. The resulting mixture was gradually warmed to room temperature and then continuously stirred overnight. Volatiles from the reaction mixture were removed in vacuo, and triturated with hexane. The crude materials were thoroughly washed with hexane to remove any soluble impurities, and dried under vacuum to obtain the colorless crystalline solid of Me$_4$Si$_2$(Me$_4$Cp)(Me$_3$SiCH$_2$Cp)Li$_2$ in 8.58 g (99.1%) yield. $^1$H NMR (400 MHz, THF-d$_8$): δ −0.16 (9H, s, SiMe$_3$—CH$_3$), 0.18 (6H, s, SiMe$_2$—CH$_3$), 0.31 (6H, s, SiMe$_2$—CH$_3$), 1.68 (2H, s, Me$_3$Si—CH$_2$), 1.65 (6H, s, Cp—CH$_3$), 1.74 (6H, s, Cp—CH$_3$), 5.25 (1H, bs, Cp—CH), 5.28 (1H, bs, Cp—CH), 5.37 (1H, bs, Cp—CH) ppm.

Synthesis of Catalyst 4: Tetramethyldisilyl-(tetramethylcyclopentadienyl)-(trimethylsilylmethylcyclopentadienyl)hafnium dichloride, Me$_4$Si$_2$(Me$_4$Cp)—(Me$_3$SiCH$_2$Cp)HfC$_2$

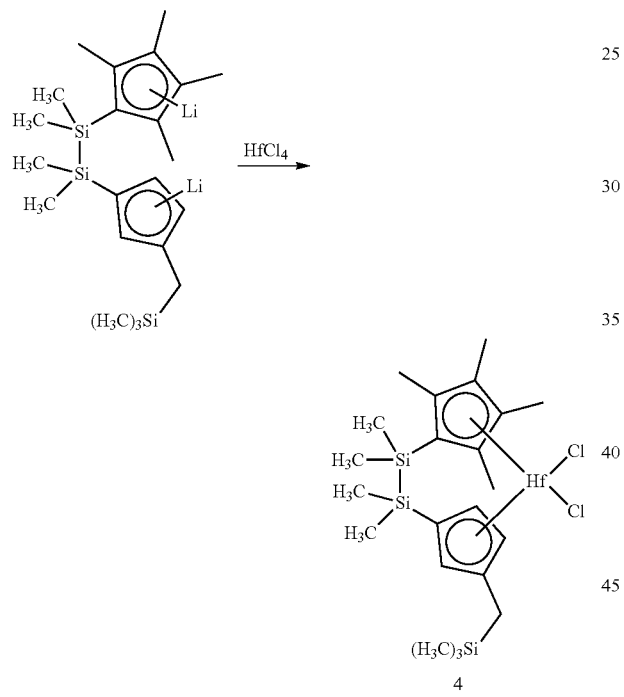

Solid HfCl$_4$ (6.938 g, 22 mmol) was added to a precooled ethereal (200 mL) solution of Me$_4$Si$_2$(Me$_4$Cp)(Me$_3$SiCH$_2$Cp)Li$_2$ (8.68 g, 22 mmol) at −25° C. The resulting mixture was stirred overnight at room temperature to turn pale yellow from colorless solution. Insoluble materials were filtered out and volatiles from the filtrate were removed in vacuo. The crude materials were then partially dissolved or dispersed in hexane and stored at −25° C. overnight. Colorless crystalline solid of Me$_4$Si$_2$(Me$_4$Cp)(Me$_3$SiCH$_2$Cp)HfCl$_2$ was deposited in 13.3 g (96.5%) yield. $^1$H NMR (400 MHz, CD$_2$Cl$_2$): δ −0.03 (9H, s, SiMe$_3$—CH$_3$), 0.37 (3H, s, SiMe$_2$—CH$_3$), 0.42 (3H, s, SiMe$_2$—CH$_3$), 0.44 (3H, s, SiMe$_2$—CH$_3$), 0.45 (3H, s, SiMe$_2$—CH$_3$), 1.93 (0.5H, s, Me$_3$Si—CH$_2$), 1.97 (0.5H, s, Me$_3$Si—CH$_2$), 2.26 (1H, s, Me$_3$Si—CH$_2$), 1.98 (3H, s, Cp—CH$_3$), 1.99 (3H, s, Cp—CH$_3$), 2.26 (3H, s, Cp—CH$_3$), 2.29 (3H, s, Cp—CH$_3$), 5.91 (1H, t, Cp—CH), 5.98 (1H, overlapped t, Cp—CH), 6.25 (1H, t, Cp—CH) ppm.

Synthesis of Dimethylsilyl-bis((trimethylsilyl)methylcyclopentadiene), Me$_2$Si((Me$_3$Si)CH$_2$CpH)$_2$ A neat Me$_2$SiCl$_2$ (340 mg, 2.6 mmol) was dissolved in 10 mL of THF and cooled to −25° C. A solid lithium (trimethylsilyl) methylcyclopendienide was added to the above mixture and the resulting mixture was stirred overnight at room temperature to ensure completion of the reaction. Volatiles from the reaction mixture were removed in vacuo and subsequently triturated with pentane to remove trace of THF. The crude materials were extracted into pentane and followed by solvent removal under vacuum afforded a thick yellow viscous oil of Me$_2$Si((Me$_3$Si)CH$_2$CpH)$_2$ in 750 mg (80%) yield. $^1$H NMR (400 MHz, C$_6$D$_6$): δ −0.15 (6H, bs, SiMe$_2$—CH$_3$), 0.05 (18H, s, SiMe$_3$—CH$_3$), 1.81-1.87 (4H, m, Me$_3$Si—CH$_2$), 3.26 (1H, s, Cp-H), 3.37 (1H, s, Cp-H), 5.99-6.82 (6H, m, Cp-H) ppm.

Synthesis of Lithium dimethylsilyl-bis((trimethylsilyl) methylcyclopentadienide) dimethoxyethane complex, Me$_2$Si((Me$_3$Si)CH$_2$Cp)$_2$Li$_2$.dme A hexane solution of n-butyl lithium (1.7 mL, 4.2 mmol, 2.5 M solution) was added drop-wise to a precooled solution of Me$_2$Si((Me$_3$Si)CH$_2$CpH)$_2$ (750 mg, 2.1 mmol) in 10 mL of dimethoxyethane over a period of 5-10 minutes at −25° C. The resulting mixture was gradually warmed to room temperature and then continuously stirred overnight. Volatiles from the reaction mixture were removed in vacuo, and triturated with pentane to remove DME. The crude materials were thoroughly washed with pentane to remove any soluble impurities, and dried under vacuum to give the colorless crystalline solid of Me$_2$Si((Me$_3$Si)CH$_2$Cp)$_2$Li$_2$.dme in 830 mg (93%) yield. $^1$H NMR (400 MHz, THF-d$_8$): δ 0.2 (18H, s, SiMe$_3$—CH$_3$), 0.93 (6H, bs, SiMe$_2$—CH$_3$), 2.26 (4H, s, Me$_3$Si—CH$_2$), 2.57 (4H, s, dme-CH$_2$), 2.77 (6H, s, dme-OCH$_3$), 5.94-6.15 (6H, m, Cp-H) ppm.

Synthesis of Rac-meso-dimethylsilyl-bis((trimethylsilyl) methylcyclopentadienide)hafnium dichloride, Me$_2$Si((Me$_3$Si)CH$_2$Cp)$_2$HfCl$_2$ A solid HfCl$_4$ (570 mg, 1.8 mmol) was added to a precooled diethyl ether (20 mL) solution of Me-2Si((Me$_3$Si)CH$_2$Cp)$_2$Li$_2$.dme (830 mg, 1.8 mmol) at −25° C. The resulting mixture was stirred overnight at room temperature. Volatiles from the reaction mixture were removed in vacuo, and then extracted into dichloromethane. Solvent removal under vacuum gave a yellow crystalline solid of Me$_2$Si ((Me$_3$Si)CH$_2$-Cp)$_2$HfCl$_2$ in 1.02 g (94%) yield. The $^1$H NMR spectrum of final material integrated a ~1:1 ratio of rac/meso isomers. $^1$H NMR (400 MHz, CD$_2$Cl$_2$): δ −0.05 (18H, s, SiMe$_3$—CH$_3$), −0.04 (18H, s, SiMe$_3$—CH$_3$), −0.64 (3H, s, SiMe$_2$—CH$_3$, meso), −0.65 (6H, s, SiMe$_2$—CH$_3$, rac), −0.68 (3H, s, SiMe$_2$—CH$_3$, meso), 2.08-2.18 (8H, m, Me$_3$Si—CH$_2$), 5.14 (2H, t, J$_{HH}$=2.6 Hz, Cp-H), 5.28 (2H, t, J$_{HH}$=2.6 Hz, Cp-H), 5.64 (2H, t, J$_{HH}$=2.7 Hz, Cp-H), 5.77 (2H, t, J$_{HH}$=2.7 Hz, Cp-H), 6.19 (2H, t, J$_{HH}$=2.7 Hz, Cp-H), 6.34 (2H, t, J$_{HH}$=2.7 Hz, Cp-H) ppm.

Synthesis of Rac-meso-dimethylsilyl-bis((trimethylsilyl) methylcyclopentadienide)hafnium dimethyl, Me$_2$Si((Me$_3$Si)CH$_2$Cp)$_2$HfMe$_2$. Catalyst 2 Comparative An ethereal solution of MeMgBr (1.12 mL, 3.34 mmol) was added drop wise to a precooled diethyl ether solution of Me$_2$Si((Me$_3$Si)CH$_2$-Cp)$_2$HfCl$_2$ (1.01 g, 1.65 mmol) over a period of 3-5 minutes at −25° C. The resulting mixture was stirred overnight at room temperature to ensure completion of the reaction. Insoluble materials were filtered through a pad of celite. Volatiles from the filtrate were removed under vacuum, and then the crude materials were extracted into pentane. Solvent removal in vacuo afforded a sticky yellow material of Me$_2$Si((Me$_3$Si)CH$_2$-Cp)$_2$HfMe$_2$ in 660 g (71%) yield. The $^1$H NMR spectrum of final material integrated a ~1:1 ratio of rac/meso isomers. $^1$H NMR (400 MHz, C$_6$D$_6$): δ −0.25 (3H, s, Hf—CH$_3$, meso), δ −0.24 (6H, s, Hf—CH$_3$, rac), δ −0.20 (3H, s, Hf—CH$_3$, meso), 0.03 (18H, s, SiMe$_3$—CH$_3$), 0.04 (18H, s, SiMe$_3$—CH$_3$), 0.19 (3H, s, SiMe$_2$—CH$_3$, meso), 0.20 (6H, s, SiMe$_2$—CH$_3$, rac), 0.22 (3H, s, SiMe$_2$—CH$_3$, meso), 2.06 (4H, s, Me$_3$Si—CH$_2$, rac), 2.09 (4H, d, $J_{HH}$=3.1 Hz, Me$_3$Si—CH$_2$, meso), 5.03 (2H, t, $J_{HH}$=2.2 Hz, Cp—H), 5.10 (2H, t, $J_{HH}$=2.2 Hz, Cp—H), 5.34 (2H, t, $J_{HH}$=2.6 Hz, Cp—H), 5.44 (2H, t, $J_{HH}$=2.6 Hz, Cp—H), 6.26 (2H, t, $J_{HH}$=2.6 Hz, Cp—H), 6.31 (2H, t, $J_{HH}$ 2.6 Hz, Cp—H) ppm.

Synthesis of Bis-(trimethylsilylmethyl cyclopentadienide)hafnium dichloride, (Me$_3$SiCH$_2$Cp)$_2$HfCl$_2$ A solid HfCl$_4$ (1.011 g, 3.16 mmol) was slurried in precooled diethyl ether (30 mL) at −25° C., and to this the solid Me$_3$SiCH$_2$CpLi (1.0 g, 6.3 mmol), which was prepared above, was added over a period of 3-5 minutes. The resulting mixture was stirred overnight at room temperature. All volatiles were removed in vacuo and the crude materials were subsequently extracted into dichloromethane. Solvents were removed under reduced pressure resulted spectroscopically pure (Me$_3$SiCH$_2$Cp)$_2$HfCl$_2$ as a colorless solid in 1.13 g (70%) yield. $^1$H NMR (400 MHz C$_6$D$_6$): δ −0.11 (18H, s, SiMe$_3$—CH$_3$), 2.18 (4H, s, Me$_3$Si—CH$_2$), 5.68 (8H, s, Cp—CH) ppm.

Synthesis of Bis-(trimethylsilylmethyl cyclopentadienyl)hafnium dimethyl, (Me$_3$SiCH$_2$Cp)$_2$HfMe$_2$, Catalyst 3, Comparative An ethereal solution of MeLi (2.56 mL, 4.1 mmol) was added drop wise to a precooled diethyl ether solution of the (Me$_3$SiCH$_2$Cp)$_2$HfCl$_2$ (1.12 g, 2.03 mmol), which was prepared above, over a period of 3-5 minutes at −25° C. The resulting mixture was stirred overnight at room temperature to ensure completion of the reaction. Insoluble materials were filtered through a pad of celite. Volatiles from the filtrate were removed under vacuum. The crude materials were triturated with pentane and then extracted into pentane, followed by solvent removal afforded a colorless crystalline material of (Me$_3$SiCH$_2$Cp)$_2$HfMe$_2$ in 875 mg (84.2%) yield. $^1$H NMR (400 MHz, C$_6$D$_6$): δ −0.23 (6H, s, Hf—CH$_3$), 0.02 (18H, s, SiMe$_3$—CH$_3$), 1.89 (4H, s, Me$_3$Si—CH$_2$), 5.54-5.48 (8H, m, Cp—CH) ppm.

Preparation of Supported Catalysts on SMAO ES70

SMAO is methylalumoxane supported on silica ES-70 (PQ Corporation, Conshohocken, Pa.) that has been calcined at 875° C. and was prepared as follows: in a Celestir vessel in the drybox 55 grams methylaluminoxane (MAO) (30 wt % in toluene) was added along with 100 mL of toluene. ES-70 silica (44.0 g) that has been calcined at 875° C. was then added to the vessel and stirred for 2 hours.

Preparation of Catalyst 1.
Tetramethyldisilyl-bis(trimethylsilylmethyl cyclopentadienyl)hafnium dimethyl (0.023 g, 36.7 umol) was added to a slurry of 1.0 g MAO supported on silica (SMAO) in 10 mL toluene in a Celestir vessel. (ES-70 875° C. available from PQ Corporation, Malvern, Pa.). This slurry/mixture was stirred for about 3 hours and filtered, washed with toluene (1×10 mL) and then hexane (2×10 mL). The supported catalyst was then dried under vacuum overnight to obtain a white colored supported silica.

Preparation of Catalyst 2: Comparative.
A 1.0 g amount of prepared SMAO 875C was stirred in 10 mL of toluene using a Celstir™ flask. r/m-dimethylsilyl bis(trimethylsilylmethylene-cyclopentadienide) hafnium dimethyl (22.7 mg, 40 µmol) was added to the slurry and stirred for three hours. The mixture was filtered, washed with several 10 mL portions of hexane and then dried under vacuum, yielding 0.87 g of white silica.

Preparation of Catalyst 3: Comparative.
A 1.0 g amount of prepared SMAO 875C was stirred in 10 mL of toluene using a Celstir™ flask. bis(trimethylsilylmethylene-cyclopentadienide) hafnium dimethyl (20 mg, 40 µmol) was added to the slurry and stirred for three hours. The mixture was filtered, washed with several 10 mL portions of hexane and then dried under vacuum, yielding 0.85 g of white silica.

Synthesis of Rac/meso-tetramethyldisilyl-bis(trimethylsilylmethylcyclopentadienyl)hafnium dichloride, rac/meso-Me$_4$Si$_2$(Me$_3$SiCH$_2$Cp)$_2$HfC$_2$ Solid HfCl$_4$ (2.35 g, 7.3 mmol) was added to a precooled diethyl ether (100 mL) solution of Me$_4$Si$_2$(Me$_3$SiCH$_2$Cp)Li$_2$ (3.16 g, 7.3 mmol) at −25° C. The resulting mixture was stirred overnight at room temperature. Volatiles were removed in vacuo and then the crude materials were extracted into dichloromethane. Solvent removal under reduced pressure afforded a pale yellow crystalline solid of rac/meso Me$_4$Si$_2$(Me$_3$SiCH$_2$Cp)$_2$HfCl$_2$ in 4.70 g (96.1%) yield. $^1$H NMR integral value suggests the approximate ratio of rac and meso is 1:3. $^1$H NMR (400 MHz, C$_6$D$_6$): δ −0.09 (14H, s, SiMe$_3$—CH$_3$, meso), −0.08 (4H, s, SiMe$_3$—CH$_3$, rac), 0.24 (4.5H, s, SiMe$_2$—CH$_3$, meso), 0.27 (1.5H, s, SiMe$_2$—CH$_3$, rac), 0.28 (1.5H, s, SiMe$_2$—CH$_3$, rac), 0.30 (4.5H, s, SiMe$_2$—CH$_3$, meso), 2.08 (0.5H, d, Me$_3$Si—CH$_2$, rac), 2.28 (1.6H, d, Me$_3$Si—CH$_2$, meso), 2.64 (1.6H, d, Me$_3$Si—CH$_2$, meso), 2.58 (0.5H, d, Me$_3$Si—CH$_2$, rac), 6.07 (2H, m, Cp—CH, meso and rac), 6.11 (0.4H, t, Cp—CH, rac), 6.15 (1.6H, m, Cp—CH, meso), 6.22 (1.6H, m, Cp—CH, meso), 6.34 (0.4H, m, Cp—CH, rac) ppm.

Synthesis of Rac/meso-tetramethyldisilyl-bis(trimethylsilylmethylcyclopentadienyl)hafnium dimethyl, rac/meso-Me$_4$Si$_2$(Me$_3$SiCH$_2$Cp)$_2$HfMe$_2$ An ethereal solution of MeLi (9.1 mL, 14.5 mmol) was added dropwise to a precooled diethyl ether solution of rac/meso-Me$_4$Si$_2$(Me$_3$SiCH$_2$Cp)$_2$HfCl$_2$ (4.7 g, 7.1 mmol) over a period of 5-10 minutes at −25° C. The resulting mixture was stirred 2 hours at room temperature. All volatiles were removed in vacuo and triturated with hexane (3×10 mL), and then subsequently the crude materials were extracted into hexane. Solvent removal in vacuo afforded the colorless crystalline solid of rac/meso-Me$_4$Si$_2$(Me$_3$SiCH$_2$Cp)$_2$HfMe$_2$ in 3.8 g (86.1%) yield. $^1$H NMR integral value suggests the approximate ratio of rac and meso is 1:3. $^1$H NMR (400 MHz, C$_6$D$_6$): δ −0.20 (2.25H, s, Hf—CH$_3$, meso), −0.19 (2.5H, s, Hf—CH$_3$, rac), −0.18 (2.25H, s, Hf—CH$_3$, meso), 0.03 (14H, s, SiMe$_3$—CH$_3$, meso), 0.02 (4H, s, SiMe$_3$—CH$_3$, rac), 0.20 (4.5H, s, SiMe$_2$—CH$_3$, meso), 0.23 (3.0H, overlapped singlets, SiMe$_2$—CH$_3$, rac), 0.24 (4.5H, s, SiMe$_2$—CH$_3$, meso), 1.90 (0.5H, d, Me$_3$Si—CH$_2$, rac), 2.08 (1.5H, d, Me$_3$Si—CH$_2$, meso), 2.20 (0.5H, d, Me$_3$Si—CH$_2$, rac), 2.28 (1.5H, d, Me$_3$Si—CH$_2$, meso), 5.66 (0.5H, t, Cp—CH, rac), 5.76 (1.5H, t, Cp—CH, meso), 5.85 (1.5H, t, Cp—CH, meso), 5.99 (1.5H, t, Cp—CH, meso), 6.03 (1.0H, m, Cp—CH, rac) ppm.

General Procedure for High Throughput Ethylene/1-Hexene Polymerization and Polymer Characterization (Table 1)

Preparation of Catalyst Slurry for High Throughput Run:

In a dry box, 45 mg of supported catalyst was weighed into a 20 mL glass vial. 15 mL of toluene was added to the vial to make a slurry that contained 3 mg supported catalyst/mL slurry. The resulting mixture was vortexed prior to injection.

Starting Material Preparations:

Solvents, polymerization grade toluene and isohexane were supplied by ExxonMobil Chemical Company and thoroughly dried and degassed prior to use. Polymerization grade ethylene was used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company. TnOAl (tri-n-octylaluminum, neat) was used as a 2 mmol/L solution in toluene.

Products were characterized as follows:

$^1$H NMR:

$^1$H NMR data was collected at room temperature in a 5 mm probe using a Varian spectrometer with a $^1$H frequency of at least 400 MHz. Data was recorded using a maximum pulse width of 45° C., 8 seconds between pulses and signal averaging 120 transients.

Gel Permeation Chromatography-Tosoh EcoSEC High Temperature GPC System (GPC-Tosoh EcoSEC):

$g'_{vis}$, Mw, Mn and Mw/Mn are determined by using a High Temperature Gel Permeation Chromatography (Tosoh Bioscience LLC), equipped with a differential refractive index detector (DRI). Three high temperature TSK gel columns (Tosoh GMHHR-H(30)HT2) are used. The nominal flow rate is 1.0 mL/min, and the nominal injection volume is 300 μL. The various transfer lines, columns, and dual flow differential refractometer (the DRI detector) are contained in an oven maintained at 160° C. Solvent for the experiment is prepared by dissolving 1.2 grams of butylated hydroxytoluene as an antioxidant in 4 liters of Aldrich reagent grade 1, 2, 4 trichlorobenzene (TCB). The TCB mixture is then filtered through a 0.1 μm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 to 2.0 mg/mL, with lower concentrations being used for higher molecular weight samples. Flow rate in the apparatus is then increased to 1.0 mL/minute, and the DRI is allowed to stabilize for 2 hours before injecting the first sample. The molecular weight is determined by combining universal calibration relationship with the column calibration which is performed with a series of monodispersed polystyrene (PS) standards. The MW is calculated at each elution volume with the following equation:

$$\log M_X = \frac{\log(K_X/K_{PS})}{a_X+1} + \frac{a_{PS}+1}{a_X+1}\log M_{PS}$$

where the variables with subscript "X" stand for the test sample while those with subscript "PS" stand for PS. In this method, $a_{PS}=0.67$ and $K_{PS}=0.000175$ while $a_X$ and $K_X$ are obtained from published literature. Specifically, a/K=0.695/0.000579 for polyethylene and 0.705/0.0002288 for polypropylene.

The concentration, c, at each point in the chromatogram is calculated from the baseline-subtracted DRI signal, $I_{DRI}$, using the following equation:

$$c = K_{DRI}I_{DRI}/(dn/dc)$$

where $K_{DRI}$ is a constant determined by calibrating the DRI, and (dn/dc) is the refractive index increment for the system. Specifically, dn/dc=0.109 for both polyethylene and polypropylene.

The mass recovery is calculated from the ratio of the integrated area of the concentration chromatography over elution volume and the injection mass which is equal to the pre-determined concentration multiplied by injection loop volume.

In this method, $\alpha_{PS}=0.67$ and $K_{PS}=0.000175$ while a and K are for other materials as calculated and published in literature (Sun, T. et al. *Macromolecules* 2001, 34, 6812), except that for purposes of the present disclosure, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to CH$_2$ and CH$_3$ channel calibrated with a series of PE and PP homo/copolymer standards whose nominal value are predetermined by NMR or FTIR. In particular, this provides the methyls per 1,000 total carbons (CH$_3$/1000TC) as a function of molecular weight. The short-chain branch (SCB) content per 1000TC (SCB/1000TC) is then computed as a function of molecular weight by applying a chain-end correction to the CH$_3$/1000TC function, assuming each chain to be linear and terminated by a methyl group at each end. The weight % comonomer is then obtained from the following expression in which f is 0.3, 0.4, 0.6, 0.8, and so on for C$_3$, C$_4$, C$_6$, C$_8$, and so on co-monomers, respectively.

$$w2=f*SCB/1000TC.$$

The bulk composition of the polymer from the GPC-IR and GPC-4D analyses is obtained by considering the entire signals of the CH$_3$ and CH$_2$ channels between the integration limits of the concentration chromatogram. First, the following ratio is obtained $$\text{Bulk IR ratio} = \frac{\text{Area of CH}_3 \text{ signal within integration limits}}{\text{Area of CH}_2 \text{ signal within integration limits}}.$$

Then the same calibration of the CH$_3$ and CH$_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then $$w2b = f * \text{bulk CH3}/1000TC$$

$$\text{bulk } SCB/1000TC = \text{bulk CH3}/1000TC - \text{bulk}\frac{CH3end}{1000TC}$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the equation $[\eta]=\eta_s/c$, where c is concentration and is determined from the IR5 broadband channel output. The viscosity MW at each point is calculated as $M=K_{PS}M^{\alpha_{PS}+1}/[\eta]$, where $\alpha_{PS}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as $$g'_{vis} = \frac{[\eta]_{avg}}{KM_V^\alpha},$$

where $M_V$ is the viscosity-average molecular weight based on molecular weights determined by LS analysis and the K and ac are for the reference linear polymer, which are, for purposes of the present disclosure, $\alpha$=0.695 and K=0.000579 for linear ethylene polymers, $\alpha$=0.705 and K=0.0002288 for linear propylene polymers, $\alpha$=0.695 and K=0.000181 for linear butene polymers, $\alpha$ is 0.695 and K is 0.000579*(1−0.0087*w2b+0.000018*(w2b)^2) for ethylene-butene copolymer where w2b is a bulk weight percent of butene comonomer, $\alpha$ is 0.695 and K is 0.000579*(1−0.0075*w2b) for ethylene-hexene copolymer where w2b is a bulk weight percent of hexene comonomer, and $\alpha$ is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted. Calculation of the w2b values is as discussed above.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001, Vol. 34(19), pp. 6812-6820).

All molecular weights are reported in g/mol unless otherwise noted.

C6 wt % is determined by $^1$H NMR.

Methyl groups per 1000 carbons (CH$_3$/1000Carbons) is determined by $^1$H NMR.

Melt Index (MI, also referred to as I2) is measured according to ASTM D1238 at 190° C., under a load of 2.16 kg unless otherwise noted. The units for MI are g/10 min or dg/min.

High Load Melt Index (HLMI, also referred to as I21) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index, or I21/I2.

The results obtained for the ethylene-hexene polymerization in 18.5 foot reactor using catalysts supported on SMAO ES70 are illustrated in Table 2 in which:

1) Example 1 is the tetramethyldisilyl-bis(trimethylsilylmethylcyclopentadienyl)hafnium dimethyl (catalyst 1 with two —Si(CH$_3$)$_2$ forming the bridge).
2) Example 2 is the dimethylsilyl-bis(trimethylsilylmethylcyclopentadienyl)hafnium dimethyl (with only one —Si(CH$_3$)$_2$ forming the bridge or monosilyl-bridged catalyst).

3) Example 3 is the bis(trimethylsilylmethylcyclopentadienyl)hafnium dimethyl (unbridged catalyst).

As shown in Table 2, Catalyst 1 was the most active supported catalyst system observed on an SMAO ES70 type support with a catalyst productivity value of 18,000 gP/gCat/hour, whereas the mono-Si$(CH_3)_2$-bridged catalyst (Example 2: $(CH_3)_2Si((CH_3Si)CH_2Cp)_2Hf(CH_3)_2$) and the unbridged catalyst (Example 3: $(CpCH_2SiCH_3)_2Hf(CH_3)_2$) have lower catalyst productivities of 11,211 gP/gCat/hour and 11,878 gP/gCat/hour, respectively. When compared to the other catalysts (examples 2-3), polymer formed using catalyst 1 was obtained in good yield with an Mw value of 87,420 and an Mn value of 28,959, an Mw/Mn value of 3.02, and an Mz value of 213,869. In comparison, the mono-Si $(CH_3)_2$-bridged catalyst (example 2) and the unbridged catalyst (example 3) provide polymers having lower Mw values, i.e., an Mw value of 86,943 and 79,910, respectively. Furthermore, catalyst 1 demonstrated a high hexene incorporation with comonomer content of 9.9 wt % and high linearity with a $g'_{vis}$ value of 0.979.

Furthermore, polymer produced using catalyst 1 has similar linearity ($g'_{vis}$ of 0.979) as compared to polymer produced using the mono-Si$(CH_3)_2$-bridged catalyst (example 2) and the unbridged catalyst (example 3) with g'vis of 1.00 and 0.986, respectively, indicating long chain branching. Furthermore, polymer produced catalyst 1 has a broad composition distribution, indicating that the majority of the comonomer is incorporated in the high molecular weight (HMW) polymer chain.

Polymerization with Supported Catalyst Systems.

A 2 L autoclave was heated to 110° C. and purged with $N_2$ for at least 30 minutes. It was then charged with dry NaCl (350 g; Fisher, S271-10 dehydrated at 180° C. and subjected to several pump/purge cycles and finally passed through a 16 mesh screen prior to use) and SMAO-ES70-875C (5 g) at 105° C. and stirred for 30 minutes. The temperature was adjusted to 85° C. At a pressure of 2 psig $N_2$, dry, degassed 1-hexene (2.0 mL) was added to the reactor with a syringe then the reactor was charged with $N_2$ to a pressure of 20 psig. A mixture of $H_2$ and $N_2$ was flowed into reactor (200 square centimeter per minute flow rate; 10% $H_2$ in $N_2$) while stirring the bed. Thereafter, the catalysts indicated in Table 2 were injected into the reactor with ethylene at a pressure of 220 psig; ethylene flow was allowed over the course of the run to maintain constant pressure in the reactor. 1-hexene was fed into the reactor as a ratio to ethylene flow (0.1 g/g). Hydrogen was fed to the reactor as a ratio to ethylene flow (0.5 mg/g). The hydrogen and ethylene ratios were measure by on-line GC analysis. Polymerizations were halted after 1 hour by venting the reactor, cooling to room temperature then exposing to air. The salt was removed by washing with water two times; the polymer was isolated by filtration, briefly washed with acetone and dried in air for at least for two days.

Unsaturation (internal and terminal) in a polymer can be determined by $^1$H NMR with reference to *Macromolecules* 2014, 47, 3782 and *Macromolecules* 2005, 38, 6988, but in event of conflict *Macromolecules* 2014, 47, 3782 shall control. Peak assignments are determined referencing the solvent of tetrachloroethane-1,2 $d_2$ at 5.98 ppm. Specifically, percent internal unsaturation is determined by adding Vy1+ Vy2+trisubstituted olefins then dividing by total unsaturation. Nuclear magnetic resonance measurements of the bimodal polyethylenes revealed some unsaturations, as summarized in Table 3. The labels "Vy1", "Vy2" and "Vy5" refer to proton resonances attributed to the protons on double bonds within the polymer backbone. Specifically, percent internal unsaturation is determined by adding Vy1+Vy2+ trisubstituted olefins then dividing by total unsaturation. For Example, for polymer in Table 3, the percent internal unsaturation is [(0.03+0.00)/0.04]×100=75. Thus, the polymer produced using Catalyst 1 has an internal unsaturation of 75%, whereas the polymer produced using catalyst of Example 2 has an internal unsaturation of 56.5%. Furthermore, Example 1 has a very low level of total unsaturation.

Table 3 illustrates unsaturation data of ethylene hexene copolymer formed by the catalyst system having catalyst 1. As shown in Table 3, the polymer has an internal unsaturation of 0.04 per 1,000 carbons as measured by $^1$H NMR.

TABLE 3

$^1$H NMR PE unsaturation analysis

| | Catalyst System | |
|---|---|---|
| | 1 | 2 |
| Vy1 and Vy2 (I) | 0.03 | 0.13 |
| Vy5(T) | 0 | — |
| T1-Tri-substituted olefins (I) | 0 | 0.06 |
| Vinyls (T) | 0.01 | 0.02 |
| Vinylidenes (T) | 0 | 0.02 |
| total internal unsaturations per 1000 C | 0.03 | 0.19 |
| Total unsaturation per 1000 C | 0.04 | 0.23 |

FIG. 1 is a gel permeation chromatography spectrum of the ethylene hexene copolymer formed by a catalyst system having catalyst 1. As illustrated in FIG. 1, the PDI (Mw/Mn) value of the polymer composition was about 3 and the overall comonomer content (hexene wt %) was 9.9 wt %. These results further indicate that the tetramethyldisilyl-bis (trimethylsilylmethylcyclopentadienyl)hafnium dimethyl (catalyst 1) yield the polyethylene polymers with a broad orthogonal composition distribution at a polymerization temperature of 85° C., as indicated by the positive slope of wt % $C_6$.

Figure 2:
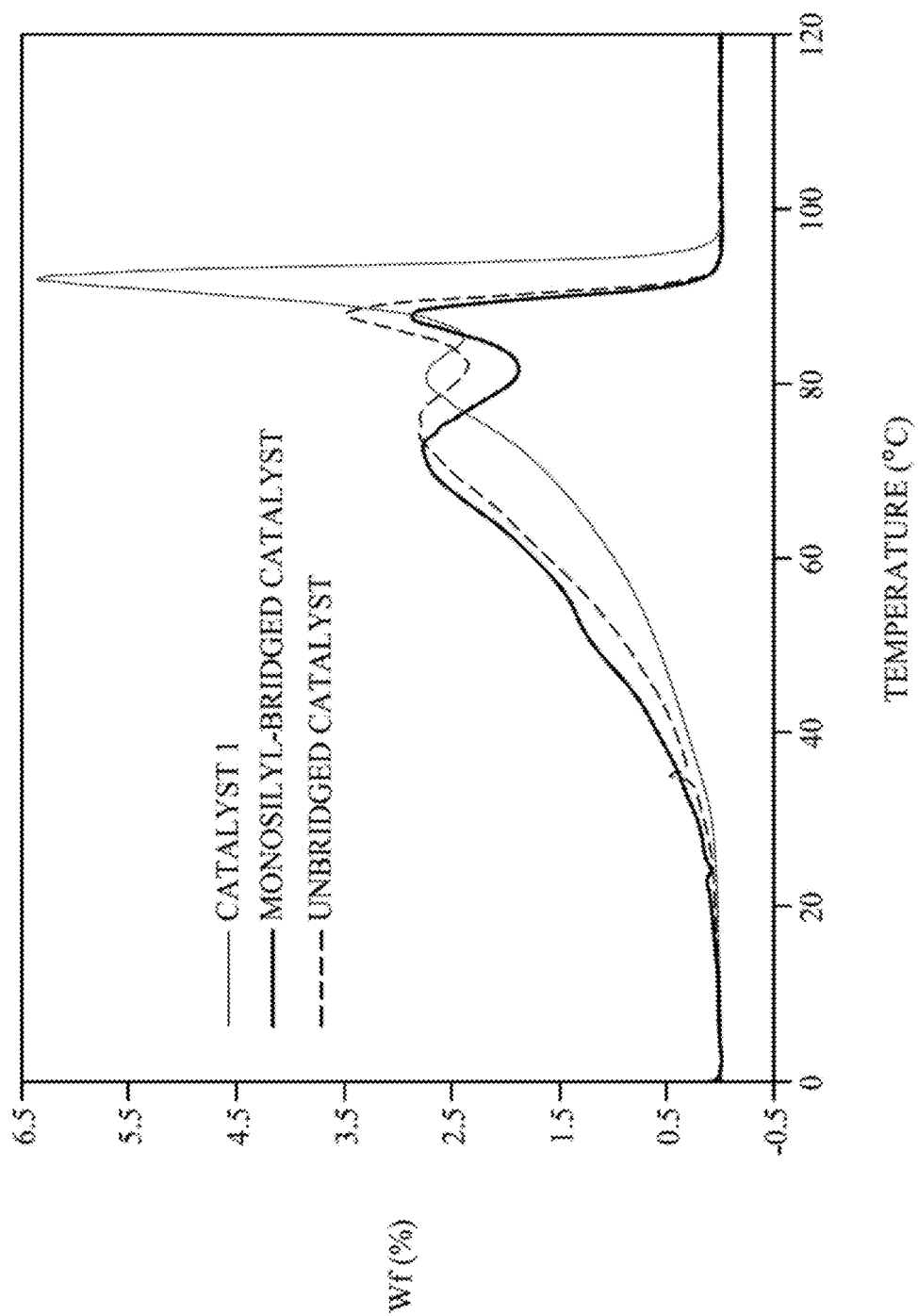
FIG. 2 is a Temperature Rising Elution Fractionation spectrum of catalyst 1 with monosilylbridged (example 2) and unbridged (example 3) catalysts, according to one embodiment.

FIG. 2 is a TREF (Temperature Rising Elution Fractionation) spectrum of catalyst 1 (example 1) with monosilyl-bridged (example 2) and unbridged (example 3) catalysts.

TABLE 2

Ethylene-Hexene Polymerization in 2L Reactor using Catalysts Supported on SMAO ES70

| Catalyst | Yield (g) | Productivity (gP/gCat/hour) | MI | Mw (g/mol) | Mn (g/mol) | Mw/ Mn | Mz (g/mol) | Hexene (wt %) | g'(vis avg) | T75-T25 (° C.) |
|---|---|---|---|---|---|---|---|---|---|---|
| Example 1 | 223 | 18,000 | 2.7 | 87,420 | 28,959 | 3.02 | 213,869 | 9.9 | 0.979 | 21.6 |
| Example 2 Comp. | 106 | 11,211 | 2.5 | 86,943 | 29,974 | 2.90 | 177,764 | 10.1 | 1.00 | 21.9 |
| Example 3 Comp. | 116 | 11,878 | 3.7 | 79,910 | 26,519 | 3.01 | 165,143 | 11.68 | 0.986 | 20.6 |

TREF is a well known technique for the characterization of the Chemical Composition Distribution (CCD). TREF is a bimodal system showing that Catalyst 1 yields a higher peak temperature of 92° C. when compared to the other Catalysts (see Table 4 and FIG. 2).

TABLE 4

TREF comparative data

| Catalyst | Peak Temperatures, Comparative (° C.) | Peak Areas (%) |
|---|---|---|
| 1 | 82 | 32.12 |
|  | 91.8 | 67.19 |
| 2 | 72.3 | 79.38 |
|  | 87.5 | 19.93 |
| 3 | 74.5 | 75.02 |
|  | 87.8 | 24.75 |

Figure 3:
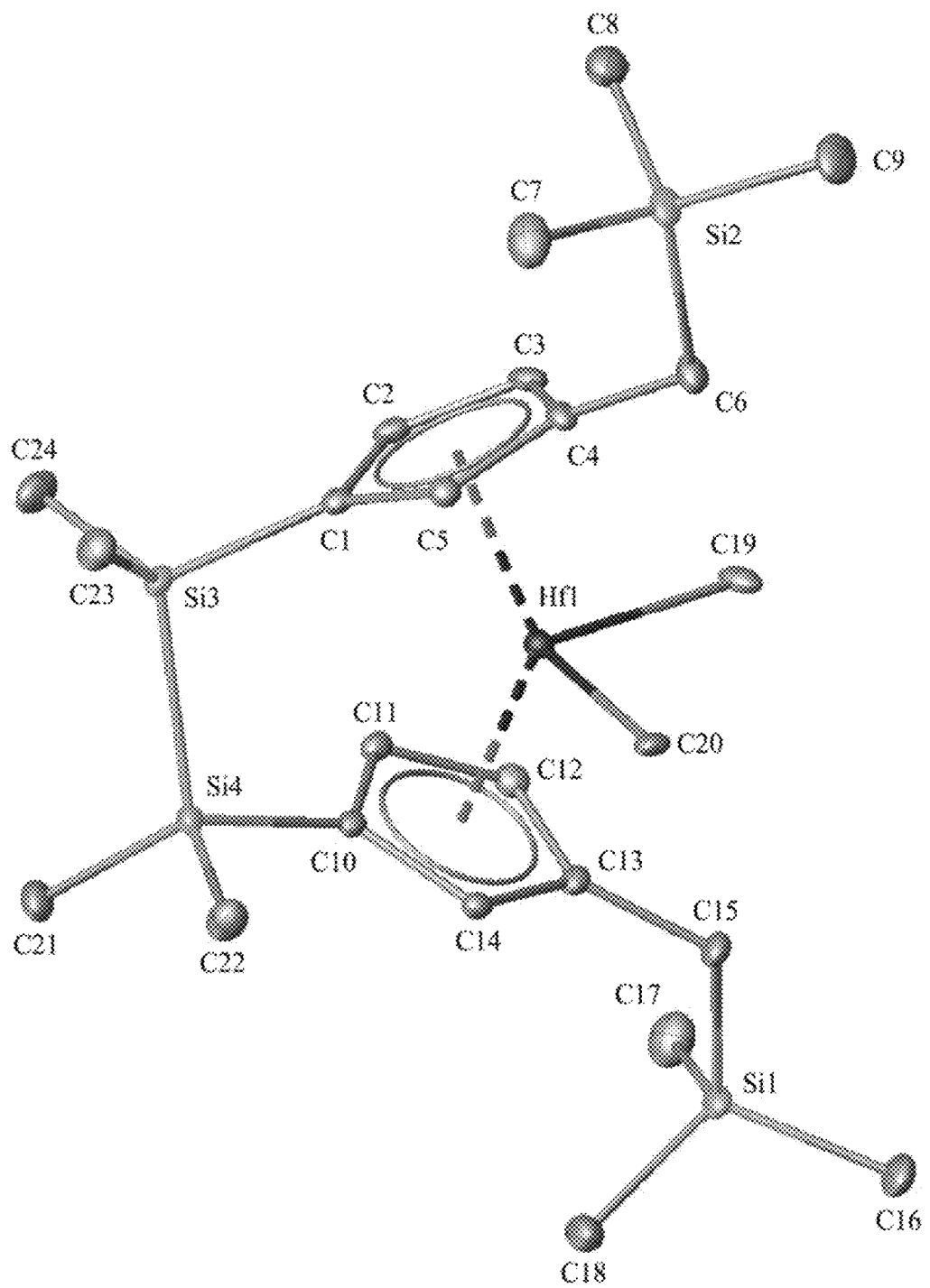
FIG. 3 is an Ortep structure (30% probability level) and atom-numbering scheme of catalyst 1, according to one embodiment.

Experimental for X-Ray Data Collection and Crystal Structure Refinement (Table 5):

Single crystals of catalyst 1 and 2 were grown in hexane solution at −32° C. and DCM and hexane mixture at −32° C., respectively (FIGS. 2 and 3). A suitable crystal was selected and loaded on a 'Bruker APEX-II CCD' diffractometer. The crystal was kept at 100(2) K during data collection. Using Olex2 [Ref. 1], the structure was solved with the SIR2004 [Ref. 2] structure solution program using Direct Methods and refined with the XL [Ref. 3] refinement package using Least Squares minimization (Ref. 1) Dolomanov, O. V.; Bourhis, L. J.; Gildea, R. J.; Howard, J. A. K.; Puschmann, H. *J. Appl. Cryst.* 2009, 42, 339-341. (Ref. 1) Burla, M. C.; Caliandro, R.; Camalli, M.; Carrozzini, B.; Cascarano, G. L.; De Caro, L.; Giacovazzo, C.; Polidori, G.; Siliqi, D.; Spagna, R. *J. Appl. Cryst.* 2007, 40, 609-613. (Ref. 2) Sheldrick, G. M. *Acta Cryst.* 2008, A64, 112-122). (Ref. 3)

Crystal Structure Determination of Catalyst 1.

Crystal Data for $C_{24}H_{46}HfSi_4$ (M=625.46 g/mol): triclinic, space group P-1 (no. 2), a=6.815(2) Å, b=12.810(6) Å, c=17.619(8) Å, α=97.94(2)°, β=95.624(15)°, γ=96.782(17)°, V=1502.6(11) Å$^3$, Z=2, T=293(2) K, μ(MoKα)=3.640 mm$^{-1}$, Dcalc=1.382 g/cm$^3$, 24476 reflections measured (5.29°≤2Θ≤56.62°), 7397 unique ($R_{int}$=0.0216, $R_{sigma}$=0.0219) which were used in all calculations. The final $R_1$ was 0.0207 (I>2σ(I)) and $wR_2$ was 0.0521 (all data).

Crystal Structure Determination of Catalyst 4.

Figure 4:
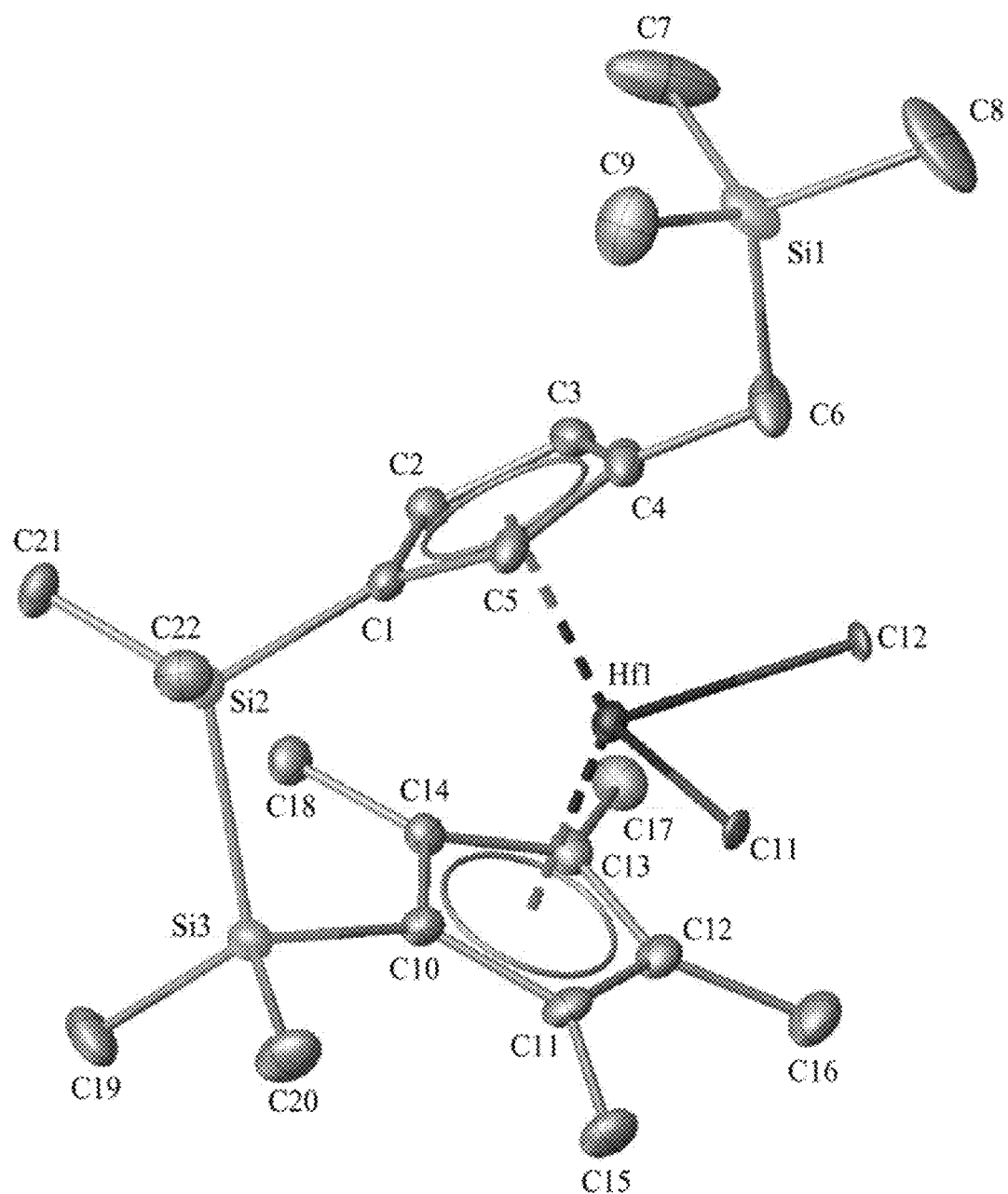
FIG. 4 is an Ortep structure (30% probability level) and atom-numbering scheme of catalyst 4, according to one embodiment.

FIG. 3 is an Ortep structure (30% probability level) and atom-numbering scheme of catalyst 1, according to one embodiment. The dihedral angle between the two Cp rings is 49.0(1)°. FIG. 4 is an Ortep structure (30% probability level) and atom-numbering scheme of catalyst 4, according to one embodiment. The dihedral angle between two Cp rings is 51.06(2)°.

Crystal Data for $C_{22}H_{37}Si_2Cl_3Hf$ (M=642.53 g/mol): monoclinic, space group C2/c (no. 15), a=20.873(11) Å, b=13.877(8) Å, c=19.613(10) Å, β=108.842(18)°, V=5377(5) Å$^3$, Z=8, T=293(2) K, μ(MoKα)=4.275 mm$^{-1}$, Dcalc=1.588 g/cm$^3$, 46526 reflections measured (4.958°≤2Θ≤56.118°), 6477 unique ($R_{int}$=0.0347, $R_{sigma}$=0.0189) which were used in all calculations. The final $R_1$ was 0.0202 (I>2σ(I)) and $wR_2$ was 0.0716 (all data).

TABLE 5

Crystal data and structure refinement for catalysts 1 and 4.

| | Catalysts | |
|---|---|---|
| | 1 | 4 |
| Empirical formula | $C_{24}H_{46}HfSi_4$ | $C_{22}H_{37}Si_2Cl_3Hf$ |
| Formula weight | 625.46 | 642.53 |
| Temperature/K | 100(2) | 293(2) |
| Crystal system | triclinic | Monoclinic |
| Space group | P-1 | C2/c |
| a/Å | 6.815(2) | 20.873(11) |
| b/Å | 12.810(6) | 13.877(8) |
| c/Å | 17.619(8) | 19.613(10) |
| α/° | 97.94(2) | 90 |
| β/° | 95.624(15) | 108.842(18) |
| γ/° | 96.782(17) | 90 |
| Volume/Å$^3$ | 1502.6(11) | 5377(5) |
| Z | 2 | 8 |
| $\rho_{calc}$ g/cm$^3$ | 1.382 | 1.588 |
| μ/mm$^{-1}$ | 3.640 | 4.275 |
| F(000) | 636.0 | 2560.0 |
| Crystal size/mm$^3$ | 0.31 × 0.27 × 0.16 | 0.20 × 0.20 × 0.20 |
| Radiation (MoKα) | λ = 0.71073 | λ = 0.71073 |
| 2Θ range for data collection/° | 5.29 to 56.62 | 4.958 to 56.118 |
| Index ranges | −9 ≤ h ≤ 9, −17 ≤ k ≤ 16, −23 ≤ l ≤ 23 | −27 ≤ h ≤ 27, −18 ≤ k ≤ 18, −25 ≤ l ≤ 25 |
| Reflections collected | 24476 | 46526 |
| Independent reflections | 7397 [$R_{int}$ = 0.0216, $R_{sigma}$ = 0.0219] | 6477 [$R_{int}$ = 0.0347, $R_{sigma}$ = 0.0189] |
| Data/restraints/parameters | 7397/0/274 | 6477/0/269 |
| Goodness-of-fit on F$^2$ | 1.107 | 1.388 |
| Final R indexes [I >= 2σ (I)] | $R_1$ = 0.0207, $wR_2$ = 0.0509 | $R_1$ = 0.0202, $wR_2$ = 0.0546 |
| Final R indexes [all data] | $R_1$ = 0.0240, $wR_2$ = 0.0521 | $R_1$ = 0.0294, $wR_2$ = 0.0716 |
| Largest diff. peak/hole/e Å$^{-3}$ | 1.67/−0.80 | 1.30/−0.79 |

TABLE 6

Selected bond lengths (Å) for catalyst 1.

| Hf(1)—C(1) | 2.507(3) | Hf(1)—C(2) | 2.478(3) |
|---|---|---|---|
| Hf(1)—C(3) | 2.529(3) | Hf(1)—C(4) | 2.575(3) |
| Hf(1)—C(5) | 2.528(3) | Hf(1)—C(10) | 2.495(3) |
| Hf(1)—C(11) | 2.470(3) | Hf(1)—C(12) | 2.533(3) |
| Hf(1)—C(13) | 2.594(3) | Hf(1)—C(14) | 2.545(3) |
| Hf(1)—C(19) | 2.285(3) | Hf(1)—C(20) | 2.305(3) |
| Si(1)—C(15) | 1.877(3) | Si(1)—C(16) | 1.865(3) |
| Si(1)—C(17) | 1.862(3) | Si(1)—C(18) | 1.860(3) |
| Si(2)—C(6) | 1.882(3) | Si(2)—C(7) | 1.865(3) |
| Si(2)—C(8) | 1.864(4) | Si(2)—C(9) | 1.869(3) |
| Si(3)—C(1) | 1.868(3) | Si(3)—C(23) | 1.873(3) |
| Si(3)—C(24) | 1.874(3) | Si(4)—C(10) | 1.866(3) |
| Si(4)—C(21) | 1.870(3) | Si(4)—C(22) | 1.872(3) |
| Si(3)—Si(4) | 2.336(1) | | |

TABLE 7

Selected bond lengths (Å) for catalyst 4.

| Hf(1)—C(1) | 2.495(3) | Hf(1)—C(2) | 2.452(3) |
|---|---|---|---|
| Hf(1)—C(3) | 2.473(3) | Hf(1)—C(4) | 2.500(3) |
| Hf(1)—C(5) | 2.530(3) | Hf(1)—C(10) | 2.542(3) |
| Hf(1)—C(11) | 2.545(3) | Hf(1)—C(12) | 2.455(3) |
| Hf(1)—C(13) | 2.482(3) | Hf(1)—C(14) | 2.516(3) |
| Hf(1)—Cl(1) | 2.413(1) | Hf(1)—Cl(2) | 2.414(1) |
| Si(1)—C(6) | 1.867(4) | Si(1)—C(7) | 1.858(4) |
| Si(1)—C(8) | 1.843(5) | Si(1)—C(9) | 1.851(5) |
| Si(2)—C(1) | 1.875(3) | Si(2)—C(21) | 1.853(4) |

TABLE 7-continued

Selected bond lengths (Å) for catalyst 4.

| Si(2)—C(22) | 1.853(4) | Si(3)—C(10) | 1.870(3) |
| Si(3)—C(19) | 1.868(4) | Si(3)—C(20) | 1.868(4) |
| Si(2)—Si(3) | 2.344(2) | | |

Overall, catalysts, catalyst systems, and processes of the present disclosure can provide polyolefins at high productivity values (e.g., 18,000 gP/gCat/hour or greater), high Mw (e.g., 87,000 or greater), Mn values of 28,000 or greater, narrow PDI (e.g., about 3), high Mz values (e.g., 200,000 or greater). Catalysts, catalyst systems, and processes of the present disclosure can provide polymers having a high comonomer content (e.g., 7 wt % or greater), a $g'_{vis}$ value of 0.97 or greater, and a broad orthogonal composition distribution.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A catalyst compound represented by Formula (I):

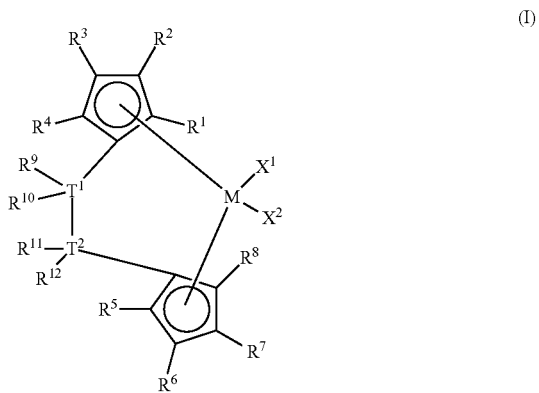

wherein:
M is a group 4 metal;
each of $R^1$, $R^2$, $R^3$, and $R^4$ is independently hydrogen, alkoxide, $C_1$ to $C_{40}$ substituted or unsubstituted hydrocarbyl, —$R^{13}$—$SiR'_3$ or —$R^{13}$—$CR'_3$ where $R^3$ is $C_1$ to $C_4$ hydrocarbylene, and each R' is independently $C_1$ to $C_{20}$ substituted or unsubstituted hydrocarbyl;
each of $R^5$, $R^6$, $R^7$, and $R^8$ is independently hydrogen, alkoxide, $C_1$ to $C_{40}$ substituted or unsubstituted hydrocarbyl, —$R^{13}$—$SiR'_3$ or —$R^{13}$—$CR'_3$ where $10^3$ is $C_1$ to $C_4$ hydrocarbyl, and each R' is independently $C_1$ to $C_{20}$ substituted or unsubstituted hydrocarbyl, or two or more of $R^5$, $R^6$, $R^7$, and $R^8$ form a substituted or unsubstituted, saturated, partially unsaturated or aromatic, cyclic or polycyclic ring; wherein at least one of $R^1$, $R^2$, $R^3$, $R^4$, $R^5$, $R^6$, $R^7$, and $R^8$ is —$R^{13}$—$SiR'_3$ or —$R^{13}$—$CR'_3$ where $10^3$ is $C_1$ to $C_4$ hydrocarbylene, and each R' is independently $C_1$ to $C_{20}$ substituted or unsubstituted hydrocarbyl;
each of $X^1$ and $X^2$ is independently a univalent anionic ligand, a diene ligand, an alkylidene ligand, or $X^1$ and $X^2$ are joined to form a metallocyclic ring;
each of $T^1$ and $T^2$ is independently Si or Ge;
each of $R^9$, $R^{10}$, $R^{11}$, and $R^{12}$ is independently hydrogen or a $C_1$-$C_{20}$ hydrocarbyl, substituted hydrocarbyl, halocarbyl, substituted halocarbyl, silylcarbyl, or germylcarbyl.

2. The catalyst compound of claim 1, wherein M is hafnium.

3. The catalyst compound of claim 1, wherein one or both of $T^1$ and $T^2$ is Si.

4. The catalyst compound of claim 1, wherein each of $T^1$ and $T^2$ is Si.

5. The catalyst compound of claim 1, wherein each of $R^9$, $R^{10}$, $R^{11}$, and $R^{12}$ is independently a $C_1$-$C_{20}$ containing hydrocarbyl.

6. The catalyst compound of claim 1, wherein at least one of $R^1$, $R^2$, $R^3$, and $R^4$ is independently $C_1$ to $C_{40}$ substituted or unsubstituted hydrocarbyl or —$R^{13}$—$SiR'_3$ where $R^{13}$ is $C_1$ to $C_4$ hydrocarbylene, and each R' is independently $C_1$ to $C_{20}$ substituted or unsubstituted hydrocarbyl.

7. The catalyst compound of claim 6, wherein each of $R^1$, $R^2$, $R^3$, and $R^4$ is independently $C_1$ to $C_{40}$ unsubstituted hydrocarbyl.

8. The catalyst compound of claim 7, wherein each of $R^1$, $R^2$, $R^3$, and $R^4$ is methyl.

9. The catalyst compound of claim 1, wherein one of $R^1$, $R^2$, $R^3$, and $R^4$ is $—R^{13}—SiR'_3$, each R' is independently $C_1$ to $C_{20}$ substituted or unsubstituted hydrocarbyl, and three of $R^1$, $R^2$, $R^3$, and $R^4$ are H.

10. The catalyst compound of claim 9, wherein $R^2$ or $R^3$ is $—R^{13}—SiR'_3$ and each R' is independently $C_1$ to $C_{20}$ unsubstituted hydrocarbyl.

11. The catalyst compound of claim 10, wherein each R' is methyl.

12. The catalyst compound of claim 1, wherein at least one of $R^5$, $R^6$, $R^7$, and $R^8$ is $—R^{13}—SiR'_3$ where $R^{13}$ is $C_1$ to $C_4$ hydrocarbylene, each R' is independently $C_1$ to $C_{20}$ substituted or unsubstituted hydrocarbyl, and at least one of $R^5$, $R^6$, $R^7$, and $R^8$ is H.

13. The catalyst compound of claim 12, wherein one of $R^5$, $R^6$, $R^7$, and $R^8$ is $—R^{13}—SiR'_3$ where $R^{13}$ is $C_1$ to $C_4$ hydrocarbylene, each R' is independently $C_1$ to $C_{20}$ substituted or unsubstituted hydrocarbyl, and three of $R^5$, $R^6$, $R^7$, and $R^8$ is H.

14. The catalyst compound of claim 13, wherein $R^6$ or $R^7$ is $—R^{13}—SiR'_3$ and each R' is independently $C_1$ to $C_{20}$ unsubstituted hydrocarbyl.

15. The catalyst compound of claim 14, wherein each R' is methyl.

16. The catalyst compound of claim 1, wherein the catalyst compound is a meso isomer.

17. The catalyst compound of claim 1, wherein the catalyst compound is selected from the group consisting of: Rac/meso-Me$_4$Si$_2$(3-Me$_3$SiCH$_2$Cp)$_2$HfCl$_2$, Rac/meso-Et$_4$Si$_2$(3-Me$_3$SiCH$_2$Cp)$_2$HfCl$_2$, Rac/meso-$^i$Pr$_4$Si$_2$(3-Me$_3$SiCH$_2$Cp)$_2$HfCl$_2$, Rac/meso-Ph$_4$Si$_2$(3-Me$_3$SiCH$_2$Cp)$_2$HfCl$_2$, Rac/meso-Me$_2$Ph$_2$Si$_2$(3-Me$_3$SiCH$_2$Cp)$_2$HfCl$_2$, Rac/meso-Me$_4$Si$_2$(3-Et$_3$SiCH$_2$Cp)$_2$HfCl$_2$, Rac/meso-Et$_4$Si$_2$(3-Et$_3$SiCH$_2$Cp)$_2$HfCl$_2$, Rac/meso-$^i$Pr$_4$Si$_2$(3-Et$_3$SiCH$_2$Cp)$_2$HfCl$_2$, Rac/meso-Ph$_4$Si$_2$(3-Et$_3$SiCH$_2$Cp)$_2$HfCl$_2$, Rac/meso-Me$_2$Ph$_2$Si$_2$(3-Et$_3$SiCH$_2$Cp)$_2$HfCl$_2$, Rac/meso-Me$_4$Si$_2$(3-Cy$_3$SiCH$_2$Cp)$_2$HfCl$_2$, Rac/meso-Et$_4$Si$_2$(3-Cy$_3$SiCH$_2$Cp)$_2$HfCl$_2$, Rac/meso-$^i$Pr$_4$Si$_2$(3-Cy$_3$SiCH$_2$Cp)$_2$HfCl$_2$, Rac/meso-Ph$_4$Si$_2$(3-Cy$_3$SiCH$_2$Cp)$_2$HfCl$_2$, Rac/meso-Me$_2$Ph$_2$Si$_2$(3-Cy$_3$SiCH$_2$Cp)$_2$HfCl$_2$, Rac/meso-Me$_4$Si$_2$(3-Me$_2$PhSiCH$_2$Cp)$_2$HfCl$_2$, Rac/meso-Et$_4$Si$_2$(3-Me$_2$PhSiCH$_2$Cp)$_2$HfCl$_2$, Rac/meso-$^i$Pr$_4$Si$_2$(3-Me$_2$PhSiCH$_2$Cp)$_2$HfCl$_2$, Rac/meso-Ph$_4$Si$_2$(3-Me$_2$PhSiCH$_2$Cp)$_2$HfCl$_2$, Rac/meso-Me$_2$Ph$_2$Si$_2$(3-Me$_2$PhSiCH$_2$Cp)$_2$HfCl$_2$, Rac/meso-Me$_4$Si$_2$(3-MePh$_2$SiCH$_2$Cp)$_2$HfCl$_2$, Rac/meso-Et$_4$Si$_2$(3-MePh$_2$SiCH$_2$Cp)$_2$HfCl$_2$, Rac/meso-$^i$Pr$_4$Si$_2$(3-MePh$_2$SiCH$_2$Cp)$_2$HfCl$_2$, Rac/meso-Ph$_4$Si$_2$(3-MePh$_2$SiCH$_2$Cp)$_2$HfCl$_2$, Rac/meso-Me$_2$Ph$_2$Si$_2$(3-MePh$_2$SiCH$_2$Cp)$_2$HfCl$_2$, Rac/meso-Me$_4$Si$_2$(3-Ph$_3$SiCH$_2$Cp)$_2$HfCl$_2$, Rac/meso-Et$_4$Si$_2$(3-Ph$_3$SiCH$_2$Cp)$_2$HfCl$_2$, Rac/meso-$^i$Pr$_4$Si$_2$(3-Ph$_3$SiCH$_2$Cp)$_2$HfCl$_2$, Rac/meso-Ph$_4$Si$_2$(3-Ph$_3$SiCH$_2$Cp)$_2$HfCl$_2$, Rac/meso-Me$_2$Ph$_2$Si$_2$(3-Ph$_3$SiCH$_2$Cp)$_2$HfCl$_2$, Me$_4$Si$_2$(2,3,4,5-Me$_4$Cp)(3-Me$_3$SiCH$_2$Cp)HfCl$_2$, Et$_4$Si$_2$(2,3,4,5-Me$_4$Cp)(3-Me$_3$SiCH$_2$Cp)HfCl$_2$, $^i$Pr$_4$Si$_2$(2,3,4,5-Me$_4$Cp)(3-Me$_3$SiCH$_2$Cp)HfCl$_2$, Ph$_4$Si$_2$(2,3,4,5-Me$_4$Cp)(3-Me$_3$SiCH$_2$Cp)HfCl$_2$, Me$_2$Ph$_2$Si$_2$(2,3,4,5-Me$_4$Cp)(3-Me$_3$SiCH$_2$Cp)HfCl$_2$, Me$_4$Si$_2$(2,3,4,5-Me$_4$Cp)(3-Et$_3$SiCH$_2$Cp)HfCl$_2$, Et$_4$Si$_2$(2,3,4,5-Me$_4$Cp)(3-Et$_3$SiCH$_2$Cp)HfCl$_2$, $^i$Pr$_4$Si$_2$(2,3,4,5-Me$_4$Cp)(3-Et$_3$SiCH$_2$Cp)HfCl$_2$, Ph$_4$Si$_2$(2,3,4,5-Me$_4$Cp)(3-Et$_3$SiCH$_2$Cp)HfCl$_2$, Me$_2$Ph$_2$Si$_2$(2,3,4,5-Me$_4$Cp)(3-Et$_3$SiCH$_2$Cp)HfCl$_2$, Me$_4$Si$_2$(2,3,4,5-Me$_4$Cp)(3-Cy$_3$SiCH$_2$Cp)HfCl$_2$, Et$_4$Si$_2$(2,3,4,5-Me$_4$Cp)(3-Cy$_3$SiCH$_2$Cp)HfCl$_2$, $^i$Pr$_4$Si$_2$(2,3,4,5-Me$_4$Cp)(3-Cy$_3$SiCH$_2$Cp)HfCl$_2$, Ph$_4$Si$_2$(2,3,4,5-Me$_4$Cp)(3-Cy$_3$SiCH$_2$Cp)HfMe$_2$, Me$_2$Ph$_2$Si$_2$(2,3,4,5-Me$_4$Cp)(3-Cy$_3$SiCH$_2$Cp)HfCl$_2$, Me$_4$Si$_2$(2,3,4,5-Me$_4$Cp)(3-Et$_4$Si$_2$(2,3,4,5-Me$_4$Cp)(3-$^i$Pr$_4$Si$_2$(2,3,4,5-Me$_4$Cp)(3-Ph$_4$Si$_2$(2,3,4,5-Me$_4$Cp)(3-Me$_2$Ph$_2$Si$_2$(2,3,4,5-Me$_4$Cp)(3-Me$_4$Si$_2$(2,3,4,5-Me$_4$Cp)(3-Et$_4$Si$_2$(2,3,4,5-Me$_4$Cp)(3-$^i$Pr$_4$Si$_2$(2,3,4,5-Me$_4$Cp)(3-Ph$_4$Si$_2$(2,3,4,5-Me$_4$Cp)(3-Me$_2$Ph$_2$Si$_2$(2,3,4,5-Me$_4$Cp)(3-Me$_4$Si$_2$(2,3,4,5-Me$_4$Cp)(3-Et$_4$Si$_2$(2,3,4,5-Me$_4$Cp)(3-$^i$Pr$_4$Si$_2$(2,3,4,5-Me$_4$Cp)(3-Ph$_4$Si$_2$(2,3,4,5-Me$_4$Cp)(3-Me$_2$Ph$_2$Si$_2$(2,3,4,5-Me$_4$Cp)(3-Me$_4$Si$_2$(Cp)(3-Me$_3$SiCH$_2$Cp)HfCl$_2$, Et$_4$Si$_2$(Cp)(3-Me$_3$SiCH$_2$Cp)HfCl$_2$, $^i$Pr$_4$Si$_2$(Cp)(3-Me$_3$SiCH$_2$Cp)HfCl$_2$, Ph$_4$Si$_2$(Cp)(3-Me$_3$SiCH$_2$Cp)HfCl$_2$, Me$_2$Ph$_2$Si$_2$(Cp)(3-Me$_3$SiCH$_2$Cp)HfCl$_2$, Me$_4$Si$_2$(Cp)(3-Et$_3$SiCH$_2$Cp)HfCl$_2$, Et$_4$Si$_2$(Cp)(3-Et$_3$SiCH$_2$Cp) HfCl$_2$, $^i$Pr$_4$Si$_2$(Cp)(3-Et$_3$SiCH$_2$Cp)HfCl$_2$, Ph$_4$Si$_2$(Cp)(3-Et$_3$SiCH$_2$Cp)HfCl$_2$, Me$_2$Ph$_2$Si$_2$(Cp)(3-Et$_3$SiCH$_2$Cp)HfCl$_2$, Me$_4$Si$_2$(Cp)(3-Cy$_3$SiCH$_2$Cp)HfCl$_2$, Et$_4$Si$_2$(Cp)(3-Cy$_3$SiCH$_2$Cp)HfCl$_2$, Pr$_4$Si$_2$(Cp)(3-Cy$_3$SiCH$_2$Cp)HfCl$_2$, Ph$_4$Si$_2$(Cp)(3-Cy$_3$SiCH$_2$Cp)HfCl$_2$, Me$_2$Ph$_2$Si$_2$(Cp)(3-Cy$_3$SiCH$_2$Cp)HfCl$_2$, Me$_4$Si$_2$(Cp)(3-Me$_2$PhSiCH$_2$Cp)HfCl$_2$, Et$_4$Si$_2$(Cp)(3-Me$_2$PhSiCH$_2$Cp)HfCl$_2$, $^i$Pr$_4$Si$_2$(Cp)(3-Me$_2$PhSiCH$_2$Cp)HfCl$_2$, Ph$_4$Si$_2$(Cp)(3-Me$_2$PhSiCH$_2$Cp)HfCl$_2$, Me$_2$Ph$_2$Si$_2$(Cp)(3-Me$_2$PhSiCH$_2$Cp)HfCl$_2$, MePh$_2$SiCH$_2$Cp)HfCl$_2$, Me$_4$Si$_2$(Cp)(3-Ph$_3$SiCH$_2$Cp)HfCl$_2$, Et$_4$Si$_2$(Cp)(3-Ph$_3$SiCH$_2$Cp)HfCl$_2$, $^i$Pr$_4$Si$_2$(Cp)(3-Ph$_3$SiCH$_2$Cp)HfCl$_2$, Ph$_4$Si$_2$(Cp)(3-Ph$_3$SiCH$_2$Cp)HfCl$_2$, Me$_2$Ph$_2$Si$_2$(Cp)(3-Ph$_3$SiCH$_2$Cp)HfCl$_2$, Rac/meso-Me$_4$Si$_2$(3-Me$_3$SiCH$_2$Cp)(3-Et$_3$SiCH$_2$Cp)HfCl$_2$, Rac/meso-Et$_4$Si$_2$(3-Me$_3$SiCH$_2$Cp)(3-Et$_3$SiCH$_2$Cp)HfCl$_2$, Rac/meso-$^i$Pr$_4$Si$_2$(3-Me$_3$SiCH$_2$Cp)(3-Et$_3$SiCH$_2$Cp)HfCl$_2$, Rac/meso-Ph$_4$Si$_2$(3-Me$_3$SiCH$_2$Cp)(3-Et$_3$SiCH$_2$Cp)HfCl$_2$, Rac/meso-Me$_2$Ph$_2$Si$_2$(3-Me$_3$SiCH$_2$Cp)(3-Et$_3$SiCH$_2$Cp)HfCl$_2$, Rac/meso-Me$_4$Si$_2$(3-Et$_3$SiCH$_2$Cp)(3-Cy$_3$SiCH$_2$Cp)HfCl$_2$, Rac/meso-Et$_4$Si$_2$(3-Et$_3$SiCH$_2$Cp)(3-Cy$_3$SiCH$_2$Cp)HfCl$_2$, Rac/meso-$^i$Pr$_4$Si$_2$(3-Et$_3$SiCH$_2$Cp)(3-Cy$_3$SiCH$_2$Cp)HfCl$_2$, Rac/meso-Ph$_4$Si$_2$(3-Et$_3$SiCH$_2$Cp)(3-Cy$_3$SiCH$_2$Cp)HfCl$_2$, Rac/meso-Me$_2$Ph$_2$Si$_2$(3-Et$_3$SiCH$_2$Cp)(3-Cy$_3$SiCH$_2$Cp)HfCl$_2$, Rac/meso-Me$_4$Si$_2$(3-Cy$_3$SiCH$_2$Cp)(3-Me$_2$PhSiCH$_2$Cp) HfCl$_2$, Rac/meso-Et$_4$Si$_2$(3-Cy$_3$SiCH$_2$Cp)(3-Me$_2$PhSiCH$_2$Cp)HfCl$_2$, Rac/meso-$^i$Pr$_4$Si$_2$(3-Cy$_3$SiCH$_2$Cp)(3-Me$_2$PhSiCH$_2$Cp)HfCl$_2$, Rac/meso-Ph$_4$Si$_2$(3-Cy$_3$SiCH$_2$Cp)(3-Me$_2$PhSiCH$_2$Cp)HfCl$_2$, Rac/meso-Me$_2$Ph$_2$Si$_2$(3-Cy$_3$SiCH$_2$Cp)(3-Me$_2$PhSiCH$_2$Cp)HfCl$_2$, Rac/meso-Me$_4$Si$_2$(3-Me$_2$PhSiCH$_2$Cp)(3-MePh$_2$SiCH$_2$Cp) HfCl$_2$, Rac/meso-Et$_4$Si$_2$(3-Me$_2$PhSiCH$_2$Cp)(3-MePh$_2$SiCH$_2$Cp)HfCl$_2$, Rac/meso-$^i$Pr$_4$Si$_2$(3-Me$_2$PhSiCH$_2$Cp)(3-MePh$_2$SiCH$_2$Cp)HfCl$_2$, Rac/meso-Ph$_4$Si$_2$(3-Me$_2$PhSiCH$_2$Cp)(3-MePh$_2$SiCH$_2$Cp)HfCl$_2$, Rac/meso-Me$_2$Ph$_2$Si$_2$(3-Me$_2$PhSiCH$_2$Cp)(3-MePh$_2$SiCH$_2$Cp)$_2$HfCl$_2$, Rac/meso-Me$_4$Si$_2$(3-MePh$_2$SiCH$_2$Cp)(3-Ph$_3$SiCH$_2$Cp)HfCl$_2$, Rac/meso-Et$_4$Si$_2$(3-MePh$_2$SiCH$_2$Cp)(3-Ph$_3$SiCH$_2$Cp)HfCl$_2$, Rac/meso-$^i$Pr$_4$Si$_2$(3-MePh$_2$SiCH$_2$Cp)(3-Ph$_3$SiCH$_2$Cp)HfCl$_2$, Rac/meso-Ph$_4$Si$_2$(3-MePh$_2$SiCH$_2$Cp)(3-Ph$_3$SiCH$_2$Cp)HfCl$_2$, Rac/meso-Me$_2$Ph$_2$Si$_2$(3-MePh$_2$SiCH$_2$Cp)(3-Ph$_3$SiCH$_2$Cp)HfCl$_2$, Rac/meso-Me$_4$Si$_2$(3-Ph$_3$SiCH$_2$Cp)$_2$HfCl$_2$, Rac/meso-Et$_4$Si$_2$(3-Ph$_3$SiCH$_2$Cp)$_2$HfCl$_2$, Rac/meso-$^i$Pr$_4$Si$_2$(3-Ph$_3$SiCH$_2$Cp)$_2$HfCl$_2$, Rac/meso-Ph$_4$Si$_2$(3-Ph$_3$SiCH$_2$Cp)$_2$HfCl$_2$ and Rac/meso-Me$_2$Ph$_2$Si$_2$(3-Ph$_3$SiCH$_2$Cp)$_2$HfCl$_2$, Rac/meso-Me$_4$Si$_2$(3-Me$_3$SiCH$_2$Cp)$_2$HfMe$_2$, Rac/meso-Et$_4$Si$_2$(3-Me$_3$SiCH$_2$Cp)$_2$HfMe$_2$, Rac/meso-$^i$Pr$_4$Si$_2$(3-Me$_3$SiCH$_2$ Cp)$_2$HfMe$_2$, Rac/meso-Ph$_4$Si$_2$(3-Me$_3$SiCH$_2$Cp)$_2$HfMe$_2$, Rac/meso-Me$_2$Ph$_2$Si$_2$(3-Me$_3$SiCH$_2$Cp)$_2$HfMe$_2$, Rac/meso-Me$_4$Si$_2$(3-Et$_3$SiCH$_2$Cp)$_2$HfMe$_2$, Rac/meso-Et$_4$Si$_2$(3-Et$_3$SiCH$_2$Cp)$_2$HfMe$_2$, Rac/meso-$^i$Pr$_4$Si$_2$(3-Et$_3$SiCH$_2$Cp)$_2$HfMe$_2$, Rac/meso-Ph$_4$Si$_2$(3-Et$_3$SiCH$_2$Cp)$_2$HfMe$_2$, Rac/meso-Me$_2$Ph$_2$Si$_2$(3-Et$_3$SiCH$_2$Cp)$_2$HfMe$_2$, Rac/meso-Me$_4$Si$_2$(3-Cy$_3$SiCH$_2$Cp)$_2$HfMe$_2$, Rac/meso-Et$_4$Si$_2$(3-Cy$_3$SiCH$_2$Cp)$_2$HfMe$_2$, Rac/meso-$^i$Pr$_4$Si$_2$(3-Cy$_3$SiCH$_2$Cp)$_2$HfMe$_2$, Rac/meso-Ph$_4$Si$_2$(3-Cy$_3$SiCH$_2$Cp)$_2$HfMe$_2$, Rac/meso-Me$_2$Ph$_2$Si$_2$(3-Cy$_3$SiCH$_2$Cp)$_2$HfMe$_2$, Rac/meso-Me$_4$Si$_2$(3-Me$_2$PhSiCH$_2$Cp)$_2$HfMe$_2$, Rac/meso-Et$_4$Si$_2$(3-Me$_2$PhSiCH$_2$Cp)$_2$HfMe$_2$, Rac/meso-$^i$Pr$_4$Si$_2$(3-Me$_2$PhSiCH$_2$Cp)$_2$HfMe$_2$, Rac/meso-Ph$_4$Si$_2$(3-Me$_2$PhSiCH$_2$Cp)$_2$HfMe$_2$, Rac/meso-Me$_2$Ph$_2$Si$_2$(3-Me$_2$PhSiCH$_2$Cp)$_2$HfMe$_2$, Rac/meso-Me$_4$Si$_2$(3-MePh$_2$SiCH$_2$Cp)$_2$HfMe$_2$, Rac/meso-Et$_4$Si$_2$(3-MePh$_2$SiCH$_2$Cp)$_2$HfMe$_2$, Rac/meso-$^i$Pr$_4$Si$_2$(3-MePh$_2$SiCH$_2$Cp)$_2$HfMe$_2$, Rac/meso-Ph$_4$Si$_2$(3-MePh$_2$SiCH$_2$Cp)$_2$HfMe$_2$, Rac/meso-Me$_2$Ph$_2$Si$_2$(3-MePh$_2$SiCH$_2$Cp)$_2$HfMe$_2$, Rac/meso-Me$_4$Si$_2$(3-Ph$_3$SiCH$_2$Cp)$_2$HfMe$_2$, Rac/meso-Et$_4$Si$_2$(3-Ph$_3$SiCH$_2$Cp)$_2$HfMe$_2$, Rac/meso-$^i$Pr$_4$Si$_2$(3-Ph$_3$SiCH$_2$Cp)$_2$HfMe$_2$, Rac/meso-Ph$_4$Si$_2$(3-Ph$_3$SiCH$_2$Cp)$_2$HfMe$_2$, Rac/meso-Me$_2$Ph$_2$Si$_2$(3-Ph$_3$SiCH$_2$Cp)$_2$HfMe$_2$, Me$_4$Si$_2$(2,3,4,5-Me$_4$Cp)(3-Me$_3$SiCH$_2$Cp)HfMe$_2$, Et$_4$Si$_2$(2,3,4,5-Me$_4$Cp)(3-Me$_3$SiCH$_2$Cp)HfMe$_2$, $^i$Pr$_4$Si$_2$(2,3,4,5-Me$_4$Cp)(3-Me$_3$SiCH$_2$Cp)HfMe$_2$, Ph$_4$Si$_2$(2,3,4,5-Me$_4$Cp)(3-Me$_3$SiCH$_2$Cp)HfMe$_2$, Me$_2$Ph$_2$Si$_2$(2,3,4,5-Me$_4$Cp)(3-Me$_3$SiCH$_2$Cp)HfMe$_2$, Me$_4$Si$_2$(2,3,4,5-Me$_4$Cp)(3-Et$_3$SiCH$_2$Cp)HfMe$_2$, Et$_4$Si$_2$(2,3,4,5-Me$_4$Cp)(3-Et$_3$SiCH$_2$Cp)HfMe$_2$, $^i$Pr$_4$Si$_2$(2,3,4,5-Me$_4$Cp)(3-Et$_3$SiCH$_2$Cp)HfMe$_2$, Ph$_4$Si$_2$(2,3,4,5-Me$_4$Cp)(3-Et$_3$SiCH$_2$Cp)HfMe$_2$, Me$_2$Ph$_2$Si$_2$(2,3,4,5-Me$_4$Cp)(3-Et$_3$SiCH$_2$Cp)HfMe$_2$, Me$_4$Si$_2$(2,3,4,5-Me$_4$Cp)(3-Cy$_3$SiCH$_2$Cp)HfMe$_2$, Et$_4$Si$_2$(2,3,4,5-Me$_4$Cp)(3-Cy$_3$SiCH$_2$Cp)HfMe$_2$, $^i$Pr$_4$Si$_2$(2,3,4,5-Me$_4$Cp)(3-Cy$_3$SiCH$_2$Cp)HfMe$_2$, Ph$_4$Si$_2$(2,3,4,5-Me$_4$Cp)(3-Cy$_3$SiCH$_2$Cp)HfMe$_2$, Me$_2$Ph$_2$Si$_2$(2,3,4,5-Me$_4$Cp)(3-Cy$_3$SiCH$_2$Cp)HfMe$_2$, Me$_4$Si$_2$(2,3,4,5-Me$_4$Cp)(3-Me$_2$PhSiCH$_2$Cp)HfMe$_2$, Et$_4$Si$_2$(2,3,4,5-Me$_4$Cp)(3-Me$_2$PhSiCH$_2$Cp)HfMe$_2$, $^i$Pr$_4$Si$_2$(2,3,4,5-Me$_4$Cp)(3-Me$_2$PhSiCH$_2$Cp)HfMe$_2$, Ph$_4$Si$_2$(2,3,4,5-Me$_4$Cp)(3-Me$_2$PhSiCH$_2$Cp)HfMe$_2$, Me$_2$Ph$_2$Si$_2$(2,3,4,5-Me$_4$Cp)(3-Me$_2$PhSiCH$_2$Cp)HfMe$_2$, Me$_4$Si$_2$(2,3,4,5-Me$_4$Cp)(3-MePh$_2$SiCH$_2$Cp)HfMe$_2$, Et$_4$Si$_2$(2,3,4,5-Me$_4$Cp)(3-MePh$_2$SiCH$_2$Cp)HfMe$_2$, $^i$Pr$_4$Si$_2$(2,3,4,5-Me$_4$Cp)(3-MePh$_2$SiCH$_2$Cp)HfMe$_2$, Ph$_4$Si$_2$(2,3,4,5-Me$_4$Cp)(3-MePh$_2$SiCH$_2$Cp)HfMe$_2$, Me$_2$Ph$_2$Si$_2$(2,3,4,5-Me$_4$Cp)(3-MePh$_2$SiCH$_2$Cp)HfMe$_2$, Me$_4$Si$_2$(2,3,4,5-Me$_4$Cp)(3-Ph$_3$SiCH$_2$Cp)HfMe$_2$, Et$_4$Si$_2$(2,3,4,5-Me$_4$Cp)(3-Ph$_3$SiCH$_2$Cp)HfMe$_2$, $^i$Pr$_4$Si$_2$(2,3,4,5-Me$_4$Cp)(3-Ph$_3$SiCH$_2$Cp)HfMe$_2$, Ph$_4$Si$_2$(2,3,4,5-Me$_4$Cp)(3-Ph$_3$SiCH$_2$Cp)HfMe$_2$, Me$_2$Ph$_2$Si$_2$(2,3,4,5-Me$_4$Cp)(3-Ph$_3$SiCH$_2$Cp)HfMe$_2$, Me$_4$Si$_2$(Cp)(3-Me$_3$SiCH$_2$Cp)HfMe$_2$, Et$_4$Si$_2$(Cp)(3-Me$_3$SiCH$_2$Cp)HfMe$_2$, $^i$Pr$_4$Si$_2$(Cp)(3-Me$_3$SiCH$_2$Cp)HfMe$_2$, Ph$_4$Si$_2$(Cp)(3-Me$_3$SiCH$_2$Cp)HfMe$_2$, Me$_2$Ph$_2$Si$_2$(Cp)(3-Me$_3$SiCH$_2$Cp)HfMe$_2$, Me$_4$Si$_2$(Cp)(3-Et$_3$SiCH$_2$Cp)HfMe$_2$, Et$_4$Si$_2$(Cp)(3-Et$_3$SiCH$_2$Cp)HfMe$_2$, $^i$Pr$_4$Si$_2$(Cp)(3-Et$_3$SiCH$_2$Cp)HfMe$_2$, Ph$_4$Si$_2$(Cp)(3-Et$_3$SiCH$_2$Cp)HfMe$_2$, Me$_2$Ph$_2$Si$_2$(Cp)(3-Et$_3$SiCH$_2$Cp)HfMe$_2$, Me$_4$Si$_2$(Cp)(3-Cy$_3$SiCH$_2$Cp)HfMe$_2$, Et$_4$Si$_2$(Cp)(3-Cy$_3$SiCH$_2$Cp)HfMe$_2$, $^i$Pr$_4$Si$_2$(Cp)(3-Cy$_3$SiCH$_2$Cp)HfMe$_2$, Ph$_4$Si$_2$(Cp)(3-Cy$_3$SiCH$_2$Cp)HfMe$_2$, Me$_2$Ph$_2$Si$_2$(Cp)(3-Cy$_3$SiCH$_2$Cp)HfMe$_2$, Me$_4$Si$_2$(Cp)(3-Me$_2$PhSiCH$_2$Cp)HfMe$_2$, Et$_4$Si$_2$(Cp)(3-Me$_2$PhSiCH$_2$Cp)HfMe$_2$, $^i$Pr$_4$Si$_2$(Cp)(3-Me$_2$PhSiCH$_2$Cp)HfMe$_2$, Ph$_4$Si$_2$(Cp)(3-Me$_2$PhSiCH$_2$Cp)HfMe$_2$, Me$_2$Ph$_2$Si$_2$(Cp)(3-Me$_2$PhSiCH$_2$Cp)HfMe$_2$, MePh$_2$SiCH$_2$Cp)HfMe$_2$, Me$_4$Si$_2$(Cp)(3-Ph$_3$SiCH$_2$Cp)HfMe$_2$, Et$_4$Si$_2$(Cp)(3-Ph$_3$SiCH$_2$Cp)HfMe$_2$, $^i$Pr$_4$Si$_2$(Cp)(3-Ph$_3$SiCH$_2$Cp)HfMe$_2$, Ph$_4$Si$_2$(Cp)(3-Ph$_3$SiCH$_2$Cp)HfMe$_2$, Me$_2$Ph$_2$Si$_2$(Cp)(3-Ph$_3$SiCH$_2$Cp)HfMe$_2$, Rac/meso-Me$_4$Si$_2$(3-Me$_3$SiCH$_2$Cp)(3-Et$_3$SiCH$_2$Cp)HfMe$_2$, Rac/meso-Et$_4$Si$_2$(3-Me$_3$SiCH$_2$Cp)(3-Et$_3$SiCH$_2$Cp)HfMe$_2$, Rac/meso-$^i$Pr$_4$Si$_2$(3-Me$_3$SiCH$_2$Cp)(3-Et$_3$SiCH$_2$Cp)HfMe$_2$, Rac/meso-Ph$_4$Si$_2$(3-Me$_3$SiCH$_2$Cp)(3-Et$_3$SiCH$_2$Cp)HfMe$_2$, Rac/meso-Me$_2$Ph$_2$Si$_2$(3-Me$_3$SiCH$_2$Cp)(3-Et$_3$SiCH$_2$Cp)HfMe$_2$, Rac/meso-Me$_4$Si$_2$(3-Et$_3$SiCH$_2$Cp)(3-Cy$_3$SiCH$_2$Cp)HfMe$_2$, Rac/meso-Et$_4$Si$_2$(3-Et$_3$SiCH$_2$Cp)(3-Cy$_3$SiCH$_2$Cp)HfMe$_2$, Rac/meso-$^i$Pr$_4$Si$_2$(3-Et$_3$SiCH$_2$Cp)(3-Cy$_3$SiCH$_2$Cp)HfMe$_2$, Rac/meso-Ph$_4$Si$_2$(3-Et$_3$SiCH$_2$Cp)(3-Cy$_3$SiCH$_2$Cp)HfMe$_2$, Rac/meso-Me$_2$Ph$_2$Si$_2$(3-Et$_3$SiCH$_2$Cp)(3-Cy$_3$SiCH$_2$Cp)HfMe$_2$, Rac/meso-Me$_4$Si$_2$(3-Cy$_3$SiCH$_2$Cp)(3-Me$_2$PhSiCH$_2$Cp)HfMe$_2$, Rac/meso-Et$_4$Si$_2$(3-Cy$_3$SiCH$_2$Cp)(3-Me$_2$PhSiCH$_2$Cp)HfMe$_2$, Rac/meso-$^i$Pr$_4$Si$_2$(3-Cy$_3$SiCH$_2$Cp)(3-Me$_2$PhSiCH$_2$Cp)HfMe$_2$, Rac/meso-Ph$_4$Si$_2$(3-Cy$_3$SiCH$_2$Cp)(3-Me$_2$PhSiCH$_2$Cp)HfMe$_2$, Rac/meso-Me$_2$Ph$_2$Si$_2$(3-Cy$_3$SiCH$_2$Cp)(3-Me$_2$PhSiCH$_2$Cp)HfMe$_2$, Rac/meso-Me$_4$Si$_2$(3-Me$_2$PhSiCH$_2$Cp)(3-MePh$_2$SiCH$_2$Cp)HfMe$_2$, Rac/meso-Et$_4$Si$_2$(3-Me$_2$PhSiCH$_2$Cp)(3-MePh$_2$SiCH$_2$Cp)HfMe$_2$, Rac/meso-$^i$Pr$_4$Si$_2$(3-Me$_2$PhSiCH$_2$Cp)(3-MePh$_2$SiCH$_2$Cp)HfMe$_2$, Rac/meso-Ph$_4$Si$_2$(3-Me$_2$PhSiCH$_2$Cp)(3-MePh$_2$SiCH$_2$Cp)HfMe$_2$, Rac/meso-Me$_2$Ph$_2$Si$_2$(3-Me$_2$PhSiCH$_2$Cp)(3-MePh$_2$SiCH$_2$Cp)HfMe$_2$, Rac/meso-Me$_4$Si$_2$(3-MePh$_2$SiCH$_2$Cp)(3-Ph$_3$SiCH$_2$Cp)HfMe$_2$, Rac/meso-Et$_4$Si$_2$(3-MePh$_2$SiCH$_2$Cp)(3-Ph$_3$SiCH$_2$Cp)HfMe$_2$, Rac/meso-$^i$Pr$_4$Si$_2$(3-MePh$_2$SiCH$_2$Cp)(3-Ph$_3$SiCH$_2$Cp)HfMe$_2$, Rac/meso-Ph$_4$Si$_2$(3-MePh$_2$SiCH$_2$Cp)(3-Ph$_3$SiCH$_2$Cp)HfMe$_2$, Rac/meso-Me$_2$Ph$_2$Si$_2$(3-MePh$_2$SiCH$_2$Cp)(3-Ph$_3$SiCH$_2$Cp)HfMe$_2$, Rac/meso-Me$_4$Si$_2$(3-Ph$_3$SiCH$_2$Cp)$_2$HfMe$_2$, Rac/meso-Et$_4$Si$_2$(3-Ph$_3$SiCH$_2$Cp)$_2$HfMe$_2$, Rac/meso-$^i$Pr$_4$Si$_2$(3-Ph$_3$SiCH$_2$Cp)$_2$HfMe$_2$, Rac/meso-Ph$_4$Si$_2$(3-Ph$_3$SiCH$_2$Cp)$_2$HfMe$_2$ and Rac/meso-Me$_2$Ph$_2$Si$_2$(3-Ph$_3$SiCH$_2$Cp)$_2$HfMe$_2$, Rac/meso-Me$_4$Si$_2$(3-Me$_3$SiCH$_2$Cp)$_2$HfBu$_2$, Rac/meso-Et$_4$Si$_2$(3-Me$_3$SiCH$_2$Cp)$_2$HfBu$_2$, Rac/meso-$^i$Pr$_4$Si$_2$(3-Me$_3$SiCH$_2$Cp)$_2$HfBu$_2$, Rac/meso-Ph$_4$Si$_2$(3-Me$_3$SiCH$_2$Cp)$_2$HfBu$_2$, Rac/meso-Me$_2$Ph$_2$Si$_2$(3-Me$_3$SiCH$_2$Cp)$_2$HfBu$_2$, Rac/meso-Me$_4$Si$_2$(3-Et$_3$SiCH$_2$Cp)$_2$HfBu$_2$, Rac/meso-Et$_4$Si$_2$(3-Et$_3$SiCH$_2$Cp)$_2$HfBu$_2$, Rac/meso-$^i$Pr$_4$Si$_2$(3-Et$_3$SiCH$_2$Cp)$_2$HfBu$_2$, Rac/meso-Ph$_4$Si$_2$(3-Et$_3$SiCH$_2$Cp)$_2$HfBu$_2$, Rac/meso-Me$_2$Ph$_2$Si$_2$(3-Et$_3$SiCH$_2$Cp)$_2$HfBu$_2$, Rac/meso-Me$_4$Si$_2$(3-Cy$_3$SiCH$_2$Cp)$_2$HfBu$_2$, Rac/meso-Et$_4$Si$_2$(3-Cy$_3$SiCH$_2$Cp)$_2$HfBu$_2$, Rac/meso-$^i$Pr$_4$Si$_2$(3-Cy$_3$SiCH$_2$Cp)$_2$HfBu$_2$, Rac/meso-Ph$_4$Si$_2$(3-Cy$_3$SiCH$_2$Cp)$_2$HfBu$_2$, Rac/meso-Me$_2$Ph$_2$Si$_2$(3-Cy$_3$SiCH$_2$Cp)$_2$HfBu$_2$, Rac/meso-Me$_4$Si$_2$(3-Me$_2$PhSiCH$_2$Cp)$_2$HfBu$_2$, Rac/meso-Et$_4$Si$_2$(3-Me$_2$PhSiCH$_2$Cp)$_2$HfBu$_2$, Rac/meso-$^i$Pr$_4$Si$_2$(3-Me$_2$PhSiCH$_2$Cp)$_2$HfBu$_2$, Rac/meso-Ph$_4$Si$_2$(3-Me$_2$PhSiCH$_2$Cp)$_2$HfBu$_2$, Rac/meso-Me$_2$Ph$_2$Si$_2$(3-Me$_2$PhSiCH$_2$Cp)$_2$HfBu$_2$, Rac/meso-Me$_4$Si$_2$(3-MePh$_2$SiCH$_2$Cp)$_2$HfBu$_2$, Rac/meso-Et$_4$Si$_2$(3-MePh$_2$SiCH$_2$Cp)$_2$HfBu$_2$, Rac/meso-$^i$Pr$_4$Si$_2$(3-MePh$_2$SiCH$_2$Cp)$_2$HfBu$_2$, Rac/meso-Ph$_4$Si$_2$(3-MePh$_2$SiCH$_2$Cp)$_2$HfBu$_2$, Rac/meso-Me$_2$Ph$_2$Si$_2$(3-MePh$_2$SiCH$_2$Cp)$_2$HfBu$_2$, Rac/meso-Me$_4$Si$_2$(3-Ph$_3$SiCH$_2$Cp)$_2$HfBu$_2$, Rac/meso-Et$_4$Si$_2$(3-Ph$_3$SiCH$_2$Cp)$_2$HfBu$_2$, Rac/meso-$^i$Pr$_4$Si$_2$(3-Ph$_3$SiCH$_2$Cp)$_2$HfBu$_2$, Rac/meso-Ph$_4$Si$_2$(3-Ph$_3$SiCH$_2$Cp)$_2$HfBu$_2$, Rac/meso-Me$_2$Ph$_2$Si$_2$(3-Ph$_3$SiCH$_2$Cp)$_2$HfBu$_2$, Me$_4$Si$_2$(2,3,4,5-Me$_4$Cp)(3-Me$_3$SiCH$_2$Cp)HfBu$_2$, Et$_4$Si$_2$(2,3,4,5-Me$_4$Cp)(3-Me$_3$SiCH$_2$Cp)HfBu$_2$, $^i$Pr$_4$Si$_2$(2,3,4,5-Me$_4$Cp)(3-Me$_3$SiCH$_2$Cp)HfBu$_2$, Ph$_4$Si$_2$(2,3,4,5-Me$_4$Cp)(3-Me$_3$SiCH$_2$Cp)HfBu$_2$, Me$_2$Ph$_2$Si$_2$(2,3,4,5-Me$_4$Cp)(3-

Me$_3$SiCH$_2$Cp)HfBu$_2$, Me$_4$Si$_2$(2,3,4,5-Me$_4$Cp)(3-Et$_3$SiCH$_2$Cp)HfBu$_2$, Et$_4$Si$_2$(2,3,4,5-Me$_4$Cp)(3-Et$_3$SiCH$_2$Cp)HfBu$_2$, $^i$Pr$_4$Si$_2$(2,3,4,5-Me$_4$Cp)(3-Et$_3$SiCH$_2$Cp)HfBu$_2$, Ph$_4$Si$_2$(2,3,4,5-Me$_4$Cp)(3-Et$_3$SiCH$_2$Cp)HfBu$_2$, Me$_2$Ph$_2$Si$_2$(2,3,4,5-Me$_4$Cp)(3-Et$_3$SiCH$_2$Cp)HfBu$_2$, Me$_4$Si$_2$(2,3,4,5-Me$_4$Cp)(3-Cy$_3$SiCH$_2$Cp)HfBu$_2$, Et$_4$Si$_2$(2,3,4,5-Me$_4$Cp)(3-Cy$_3$SiCH$_2$Cp)HfBu$_2$, $^i$Pr$_4$Si$_2$(2,3,4,5-Me$_4$Cp)(3-Cy$_3$SiCH$_2$Cp)HfBu$_2$, Ph$_4$Si$_2$(2,3,4,5-Me$_4$Cp)(3-Cy$_3$SiCH$_2$Cp)HfBu$_2$, Me$_2$Ph$_2$Si$_2$(2,3,4,5-Me$_4$Cp)(3-Cy$_3$SiCH$_2$Cp)HfBu$_2$, Me$_4$Si$_2$(2,3,4,5-Me$_4$Cp)(3-Me$_2$PhSiCH$_2$Cp)HfBu$_2$, Et$_4$Si$_2$(2,3,4,5-Me$_4$Cp)(3-Me$_2$PhSiCH$_2$Cp)HfBu$_2$, $^i$Pr$_4$Si$_2$(2,3,4,5-Me$_4$Cp)(3-Me$_2$PhSiCH$_2$Cp)HfBu$_2$, Ph$_4$Si$_2$(2,3,4,5-Me$_4$Cp)(3-Me$_2$PhSiCH$_2$Cp)HfBu$_2$, Me$_2$Ph$_2$Si$_2$(2,3,4,5-Me$_4$Cp)(3-Me$_2$PhSiCH$_2$Cp)HfBu$_2$, Me$_4$Si$_2$(2,3,4,5-Me$_4$Cp)(3-MePh$_2$SiCH$_2$Cp)HfBu$_2$, Et$_4$Si$_2$(2,3,4,5-Me$_4$Cp)(3-MePh$_2$SiCH$_2$Cp)HfBu$_2$, $^i$Pr$_4$Si$_2$(2,3,4,5-Me$_4$Cp)(3-MePh$_2$SiCH$_2$Cp)HfBu$_2$, Ph$_4$Si$_2$(2,3,4,5-Me$_4$Cp)(3-MePh$_2$SiCH$_2$Cp)HfBu$_2$, Me$_2$Ph$_2$Si$_2$(2,3,4,5-Me$_4$Cp)(3-MePh$_2$SiCH$_2$Cp)HfBu$_2$, Me$_4$Si$_2$(2,3,4,5-Me$_4$Cp)(3-Ph$_3$SiCH$_2$Cp)HfBu$_2$, Et$_4$Si$_2$(2,3,4,5-Me$_4$Cp)(3-Ph$_3$SiCH$_2$Cp)HfBu$_2$, $^i$Pr$_4$Si$_2$(2,3,4,5-Me$_4$Cp)(3-Ph$_3$SiCH$_2$Cp)HfBu$_2$, Ph$_4$Si$_2$(2,3,4,5-Me$_4$Cp)(3-Ph$_3$SiCH$_2$Cp)HfBu$_2$, Me$_2$Ph$_2$Si$_2$(2,3,4,5-Me$_4$Cp)(3-Ph$_3$SiCH$_2$Cp)HfBu$_2$, Me$_4$Si$_2$(Cp)(3-Me$_3$SiCH$_2$Cp)HfBu$_2$, Et$_4$Si$_2$(Cp)(3-Me$_3$SiCH$_2$Cp)HfBu$_2$, $^i$Pr$_4$Si$_2$(Cp)(3-Me$_3$SiCH$_2$Cp)HfBu$_2$, Ph$_4$Si$_2$(Cp)(3-Me$_3$SiCH$_2$Cp)HfBu$_2$, Me$_2$Ph$_2$Si$_2$(Cp)(3-Me$_3$SiCH$_2$Cp)HfBu$_2$, Me$_4$Si$_2$(Cp)(3-Et$_3$SiCH$_2$Cp)HfBu$_2$, Et$_4$Si$_2$(Cp)(3-Et$_3$SiCH$_2$Cp)HfBu$_2$, $^i$Pr$_4$Si$_2$(Cp)(3-Et$_3$SiCH$_2$Cp)HfBu$_2$, Ph$_4$Si$_2$(Cp)(3-Et$_3$SiCH$_2$Cp)HfBu$_2$, Me$_2$Ph$_2$Si$_2$(Cp)(3-Et$_3$SiCH$_2$Cp)HfBu$_2$, Me$_4$Si$_2$(Cp)(3-Cy$_3$SiCH$_2$Cp)HfBu$_2$, Et$_4$Si$_2$(Cp)(3-Cy$_3$SiCH$_2$Cp)HfBu$_2$, $^i$Pr$_4$Si$_2$(Cp)(3-Cy$_3$SiCH$_2$Cp)HfBu$_2$, Ph$_4$Si$_2$(Cp)(3-Cy$_3$SiCH$_2$Cp)HfBu$_2$, Me$_2$Ph$_2$Si$_2$(Cp)(3-Cy$_3$SiCH$_2$Cp)HfBu$_2$, Me$_4$Si$_2$(Cp)(3-Me$_2$PhSiCH$_2$Cp)HfBu$_2$, Et$_4$Si$_2$(Cp)(3-Me$_2$PhSiCH$_2$Cp)HfBu$_2$, $^i$Pr$_4$Si$_2$(Cp)(3-Me$_2$PhSiCH$_2$Cp)HfBu$_2$, Ph$_4$Si$_2$(Cp)(3-Me$_2$PhSiCH$_2$Cp)HfBu$_2$, Me$_2$Ph$_2$Si$_2$(Cp)(3-Me$_2$PhSiCH$_2$Cp)HfBu$_2$, MePh$_2$SiCH$_2$Cp)HfBu$_2$, Me$_4$Si$_2$(Cp)(3-Ph$_3$SiCH$_2$Cp)HfBu$_2$, Et$_4$Si$_2$(Cp)(3-Ph$_3$SiCH$_2$Cp)HfBu$_2$, $^i$Pr$_4$Si$_2$(Cp)(3-Ph$_3$SiCH$_2$Cp)HfBu$_2$, Ph$_4$Si$_2$(Cp)(3-Ph$_3$SiCH$_2$Cp)HfBu$_2$, Me$_2$Ph$_2$Si$_2$(Cp)(3-Ph$_3$SiCH$_2$Cp)HfBu$_2$, Rac/meso-Me$_4$Si$_2$(3-Me$_3$SiCH$_2$Cp)(3-Et$_3$SiCH$_2$Cp)HfBu$_2$, Rac/meso-Et$_4$Si$_2$(3-Me$_3$SiCH$_2$Cp)(3-Et$_3$SiCH$_2$Cp)HfBu$_2$, Rac/meso-$^i$Pr$_4$Si$_2$(3-Me$_3$SiCH$_2$Cp)(3-Et$_3$SiCH$_2$Cp)HfBu$_2$, Rac/meso-Ph$_4$Si$_2$(3-Me$_3$SiCH$_2$Cp)(3-Et$_3$SiCH$_2$Cp)HfBu$_2$, Rac/meso-Me$_2$Ph$_2$Si$_2$(3-Me$_3$SiCH$_2$Cp)(3-Et$_3$SiCH$_2$Cp)HfBu$_2$, Rac/meso-Me$_4$Si$_2$(3-Et$_3$SiCH$_2$Cp)(3-Cy$_3$SiCH$_2$Cp)HfBu$_2$, Rac/meso-Et$_4$Si$_2$(3-Et$_3$SiCH$_2$Cp)(3-Cy$_3$SiCH$_2$Cp)HfBu$_2$, Rac/meso-$^i$Pr$_4$Si$_2$(3-Et$_3$SiCH$_2$Cp)(3-Cy$_3$SiCH$_2$Cp)HfBu$_2$, Rac/meso-Ph$_4$Si$_2$(3-Et$_3$SiCH$_2$Cp)(3-Cy$_3$SiCH$_2$Cp)HfBu$_2$, Rac/meso-Me$_2$Ph$_2$Si$_2$(3-Et$_3$SiCH$_2$Cp)(3-Cy$_3$SiCH$_2$Cp)HfBu$_2$, Rac/meso-Me$_4$Si$_2$(3-Cy$_3$SiCH$_2$Cp)(3-Me$_2$PhSiCH$_2$Cp)HfBu$_2$, Rac/meso-Et$_4$Si$_2$(3-Cy$_3$SiCH$_2$Cp)(3-Me$_2$PhSiCH$_2$Cp)HfBu$_2$, Rac/meso-$^i$Pr$_4$Si$_2$(3-Cy$_3$SiCH$_2$Cp)(3-Me$_2$PhSiCH$_2$Cp)HfBu$_2$, Rac/meso-Ph$_4$Si$_2$(3-Cy$_3$SiCH$_2$Cp)(3-Me$_2$PhSiCH$_2$Cp)HfBu$_2$, Rac/meso-Me$_2$Ph$_2$Si$_2$(3-Cy$_3$SiCH$_2$Cp)(3-Me$_2$PhSiCH$_2$Cp)HfBu$_2$, Rac/meso-Me$_4$Si$_2$(3-Me$_2$PhSiCH$_2$Cp)(3-MePh$_2$SiCH$_2$Cp)HfBu$_2$, Rac/meso-Et$_4$Si$_2$(3-Me$_2$PhSiCH$_2$Cp)(3-MePh$_2$SiCH$_2$Cp)HfBu$_2$, Rac/meso-$^i$Pr$_4$Si$_2$(3-Me$_2$PhSiCH$_2$Cp)(3-MePh$_2$SiCH$_2$Cp)HfBu$_2$, Rac/meso-Ph$_4$Si$_2$(3-Me$_2$PhSiCH$_2$Cp)(3-MePh$_2$SiCH$_2$Cp)HfBu$_2$, Rac/meso-Me$_2$Ph$_2$Si$_2$(3-Me$_2$PhSiCH$_2$Cp)(3-MePh$_2$SiCH$_2$Cp)HfBu$_2$, Rac/meso-Me$_4$Si$_2$(3-MePh$_2$SiCH$_2$Cp)(3-Ph$_3$SiCH$_2$Cp)HfBu$_2$, Rac/meso-Et$_4$Si$_2$(3-MePh$_2$SiCH$_2$Cp)(3-Ph$_3$SiCH$_2$Cp)HfBu$_2$, Rac/meso-$^i$Pr$_4$Si$_2$(3-MePh$_2$SiCH$_2$Cp)(3-Ph$_3$SiCH$_2$Cp)HfBu$_2$, Rac/meso-Ph$_4$Si$_2$(3-MePh$_2$SiCH$_2$Cp)(3-Ph$_3$SiCH$_2$Cp)HfBu$_2$, Rac/meso-Me$_2$Ph$_2$Si$_2$(3-MePh$_2$SiCH$_2$Cp)(3-Ph$_3$SiCH$_2$Cp)HfBu$_2$, Rac/meso-Me$_4$Si$_2$(3-Ph$_3$SiCH$_2$Cp)$_2$HfBu$_2$, Rac/meso-Et$_4$Si$_2$(3-Ph$_3$SiCH$_2$Cp)$_2$HfBu$_2$, Rac/meso-$^i$Pr$_4$Si$_2$(3-Ph$_3$SiCH$_2$Cp)$_2$HfBu$_2$, Rac/meso-Ph$_4$Si$_2$(3-Ph$_3$SiCH$_2$Cp)$_2$HfBu$_2$ and Rac/meso-Me$_2$Ph$_2$Si$_2$(3-Ph$_3$SiCH$_2$Cp)$_2$HfBu$_2$, Rac/meso-Me$_4$Si$_2$(3-Me$_3$SiCH$_2$Cp)$_2$HfPh$_2$, Rac/meso-Et$_4$Si$_2$(3-Me$_3$SiCH$_2$Cp)$_2$HfPh$_2$, Rac/meso-$^i$Pr$_4$Si$_2$(3-Me$_3$SiCH$_2$Cp)$_2$HfPh$_2$, Rac/meso-Ph$_4$Si$_2$(3-Me$_3$SiCH$_2$Cp)$_2$HfPh$_2$, Rac/meso-Me$_2$Ph$_2$Si$_2$(3-Me$_3$SiCH$_2$Cp)$_2$HfPh$_2$, Rac/meso-Me$_4$Si$_2$(3-Et$_3$SiCH$_2$Cp)$_2$HfPh$_2$, Rac/meso-Et$_4$Si$_2$(3-Et$_3$SiCH$_2$Cp)$_2$HfPh$_2$, Rac/meso-$^i$Pr$_4$Si$_2$(3-Et$_3$SiCH$_2$Cp)$_2$HfPh$_2$, Rac/meso-Ph$_4$Si$_2$(3-Et$_3$SiCH$_2$Cp)$_2$HfPh$_2$, Rac/meso-Me$_2$Ph$_2$Si$_2$(3-Et$_3$SiCH$_2$Cp)$_2$HfPh$_2$, Rac/meso-Me$_4$Si$_2$(3-Cy$_3$SiCH$_2$Cp)$_2$HfPh$_2$, Rac/meso-Et$_4$Si$_2$(3-Cy$_3$SiCH$_2$Cp)$_2$HfPh$_2$, Rac/meso-$^i$Pr$_4$Si$_2$(3-Cy$_3$SiCH$_2$Cp)$_2$HfPh$_2$, Rac/meso-Ph$_4$Si$_2$(3-Cy$_3$SiCH$_2$Cp)$_2$HfPh$_2$, Rac/meso-Me$_2$Ph$_2$Si$_2$(3-Cy$_3$SiCH$_2$Cp)$_2$HfPh$_2$, Rac/meso-Me$_4$Si$_2$(3-Me$_2$PhSiCH$_2$Cp)$_2$HfPh$_2$, Rac/meso-Et$_4$Si$_2$(3-Me$_2$PhSiCH$_2$Cp)$_2$HfPh$_2$, Rac/meso-$^i$Pr$_4$Si$_2$(3-Me$_2$PhSiCH$_2$Cp)$_2$HfPh$_2$, Rac/meso-Ph$_4$Si$_2$(3-Me$_2$PhSiCH$_2$Cp)$_2$HfPh$_2$, Rac/meso-Me$_2$Ph$_2$Si$_2$(3-Me$_2$PhSiCH$_2$Cp)$_2$HfPh$_2$, Rac/meso-Me$_4$Si$_2$(3-MePh$_2$SiCH$_2$Cp)$_2$HfPh$_2$, Rac/meso-Et$_4$Si$_2$(3-MePh$_2$SiCH$_2$Cp)$_2$HfPh$_2$, Rac/meso-$^i$Pr$_4$Si$_2$(3-MePh$_2$SiCH$_2$Cp)$_2$HfPh$_2$, Rac/meso-Ph$_4$Si$_2$(3-MePh$_2$SiCH$_2$Cp)$_2$HfPh$_2$, Rac/meso-Me$_2$Ph$_2$Si$_2$(3-MePh$_2$SiCH$_2$Cp)$_2$HfPh$_2$, Rac/meso-Me$_4$Si$_2$(3-Ph$_3$SiCH$_2$Cp)$_2$HfPh$_2$, Rac/meso-Et$_4$Si$_2$(3-Ph$_3$SiCH$_2$Cp)$_2$HfPh$_2$, Rac/meso-$^i$Pr$_4$Si$_2$(3-Ph$_3$SiCH$_2$Cp)$_2$HfPh$_2$, Rac/meso-Ph$_4$Si$_2$(3-Ph$_3$SiCH$_2$Cp)$_2$HfPh$_2$, Rac/meso-Me$_2$Ph$_2$Si$_2$(3-Ph$_3$SiCH$_2$Cp)$_2$HfPh$_2$, Me$_4$Si$_2$(2,3,4,5-Me$_4$Cp)(3-Me$_3$SiCH$_2$Cp)HfPh$_2$, Et$_4$Si$_2$(2,3,4,5-Me$_4$Cp)(3-Me$_3$SiCH$_2$Cp)HfPh$_2$, $^i$Pr$_4$Si$_2$(2,3,4,5-Me$_4$Cp)(3-Me$_3$SiCH$_2$Cp)HfPh$_2$, Ph$_4$Si$_2$(2,3,4,5-Me$_4$Cp)(3-Me$_3$SiCH$_2$Cp)HfPh$_2$, Me$_2$Ph$_2$Si$_2$(2,3,4,5-Me$_4$Cp)(3-Me$_3$SiCH$_2$Cp)HfPh$_2$, Me$_4$Si$_2$(2,3,4,5-Me$_4$Cp)(3-Et$_3$SiCH$_2$Cp)HfPh$_2$, Et$_4$Si$_2$(2,3,4,5-Me$_4$Cp)(3-Et$_3$SiCH$_2$Cp)HfPh$_2$, $^i$Pr$_4$Si$_2$(2,3,4,5-Me$_4$Cp)(3-Et$_3$SiCH$_2$Cp)HfPh$_2$, Ph$_4$Si$_2$(2,3,4,5-Me$_4$Cp)(3-Et$_3$SiCH$_2$Cp)HfPh$_2$, Me$_2$Ph$_2$Si$_2$(2,3,4,5-Me$_4$Cp)(3-Et$_3$SiCH$_2$Cp)HfPh$_2$, Me$_4$Si$_2$(2,3,4,5-Me$_4$Cp)(3-Cy$_3$SiCH$_2$Cp)HfPh$_2$, Et$_4$Si$_2$(2,3,4,5-Me$_4$Cp)(3-Cy$_3$SiCH$_2$Cp)HfPh$_2$, $^i$Pr$_4$Si$_2$(2,3,4,5-Me$_4$Cp)(3-Cy$_3$SiCH$_2$Cp)HfPh$_2$, Ph$_4$Si$_2$(2,3,4,5-Me$_4$Cp)(3-Cy$_3$SiCH$_2$Cp)HfPh$_2$, Me$_2$Ph$_2$Si$_2$(2,3,4,5-Me$_4$Cp)(3-Cy$_3$SiCH$_2$Cp)HfPh$_2$, Me$_4$Si$_2$(2,3,4,5-Me$_4$Cp)(3-Me$_2$PhSiCH$_2$Cp)HfPh$_2$, Et$_4$Si$_2$(2,3,4,5-Me$_4$Cp)(3-Me$_2$PhSiCH$_2$Cp)HfPh$_2$, $^i$Pr$_4$Si$_2$(2,3,4,5-Me$_4$Cp)(3-Me$_2$PhSiCH$_2$Cp)HfPh$_2$, Ph$_4$Si$_2$(2,3,4,5-Me$_4$Cp)(3-Me$_2$PhSiCH$_2$Cp)HfPh$_2$, Me$_2$Ph$_2$Si$_2$(2,3,4,5-Me$_4$Cp)(3-Me$_2$PhSiCH$_2$Cp)HfPh$_2$, Me$_4$Si$_2$(2,3,4,5-Me$_4$Cp)(3-MePh$_2$SiCH$_2$Cp)HfPh$_2$, Et$_4$Si$_2$(2,3,4,5-Me$_4$Cp)(3-MePh$_2$SiCH$_2$Cp)HfPh$_2$, $^i$Pr$_4$Si$_2$(2,3,4,5-Me$_4$Cp)(3-MePh$_2$SiCH$_2$Cp)HfPh$_2$, Ph$_4$Si$_2$(2,3,4,5-Me$_4$Cp)(3-MePh$_2$SiCH$_2$Cp)HfPh$_2$, Me$_2$Ph$_2$Si$_2$(2,3,4,5-Me$_4$Cp)(3-MePh$_2$SiCH$_2$Cp)HfPh$_2$, Me$_4$Si$_2$(2,3,4,5-Me$_4$Cp)(3-Ph$_3$SiCH$_2$Cp)HfPh$_2$, Et$_4$Si$_2$(2,3,4,5-Me$_4$Cp)(3-Ph$_3$SiCH$_2$Cp)HfPh$_2$, $^i$Pr$_4$Si$_2$(2,3,4,5-Me$_4$Cp)(3-Ph$_3$SiCH$_2$Cp)HfPh$_2$, Ph$_4$Si$_2$(2,3,4,5-Me$_4$Cp)(3-Ph$_3$SiCH$_2$Cp)HfPh$_2$, Me$_2$Ph$_2$Si$_2$(2,3,4,5-Me$_4$Cp)(3-Ph$_3$SiCH$_2$Cp)HfPh$_2$, Me$_4$Si$_2$(Cp)(3-Me$_3$SiCH$_2$Cp)HfPh$_2$, Et$_4$Si$_2$(Cp)(3-Me$_3$SiCH$_2$Cp)HfPh$_2$, $^i$Pr$_4$Si$_2$(Cp)(3-Me$_3$SiCH$_2$Cp)HfPh$_2$, Ph$_4$Si$_2$(Cp)(3-Me$_3$SiCH$_2$Cp)HfPh$_2$, Me$_2$Ph$_2$Si$_2$(Cp)(3-Me$_3$SiCH$_2$Cp)HfPh$_2$, Me$_4$Si$_2$(Cp)(3-

Et₃SiCH₂Cp)HfPh₂, Et₄Si₂(Cp)(3-Et₃SiCH₂Cp)HfPh₂, ⁱPr₄Si₂(Cp)(3-Et₃SiCH₂Cp)HfPh₂, Ph₄Si₂(Cp)(3-Et₃SiCH₂Cp)HfPh₂, Me₂Ph₂Si₂(Cp)(3-Et₃SiCH₂Cp)HfPh₂, Me₄Si₂(Cp)(3-Cy₃SiCH₂Cp)HfPh₂, Et₄Si₂(Cp)(3-Cy₃SiCH₂Cp)HfPh₂, ⁱPr₄Si₂(Cp)(3-Cy₃SiCH₂Cp)HfPh₂, Ph₄Si₂(Cp)(3-Cy₃SiCH₂Cp)HfPh₂, Me₂Ph₂Si₂(Cp)(3-Cy₃SiCH₂Cp)HfMe₂, Me₄Si₂(Cp)(3-Me₂PhSiCH₂Cp)HfMe₂, Et₄Si₂(Cp)(3-Me₂PhSiCH₂Cp)HfPh₂, ⁱPr₄Si₂(Cp)(3-Me₂PhSiCH₂Cp)HfPh₂, Ph₄Si₂(Cp)(3-Me₂PhSiCH₂Cp)HfPh₂, Me₂Ph₂Si₂(Cp)(3-Me₂PhSiCH₂Cp)HfPh₂, MePh₂SiCH₂Cp)HfPh₂, Me₄Si₂(Cp)(3-Ph₃SiCH₂Cp)HfPh₂, Et₄Si₂(Cp)(3-Ph₃SiCH₂Cp)HfPh₂, ⁱPr₄Si₂(Cp)(3-Ph₃SiCH₂Cp)HfPh₂, Ph₄Si₂(Cp)(3-Ph₃SiCH₂Cp)HfPh₂, Me₂Ph₂Si₂(Cp)(3-Ph₃SiCH₂Cp)HfPh₂, Rac/meso-Me₄Si₂(3-Me₃SiCH₂Cp)(3-Et₃SiCH₂Cp)HfPh₂, Rac/meso-Et₄Si₂(3-Me₃SiCH₂Cp)(3-Et₃SiCH₂Cp)HfPh₂, Rac/meso-ⁱPr₄Si₂(3-Me₃SiCH₂Cp)(3-Et₃SiCH₂Cp)HfPh₂, Rac/meso-Ph₄Si₂(3-Me₃SiCH₂Cp)(3-Et₃SiCH₂Cp)HfPh₂, Rac/meso-Me₂Ph₂Si₂(3-Me₃SiCH₂Cp)(3-Et₃SiCH₂Cp)HfPh₂, Rac/meso-Me₄Si₂(3-Et₃SiCH₂Cp)(3-Cy₃SiCH₂Cp)HfPh₂, Rac/meso-Et₄Si₂(3-Et₃SiCH₂Cp)(3-Cy₃SiCH₂Cp)HfPh₂, Rac/meso-ⁱPr₄Si₂(3-Et₃SiCH₂Cp)(3-Cy₃SiCH₂Cp)HfPh₂, Rac/meso-Ph₄Si₂(3-Et₃SiCH₂Cp)(3-Cy₃SiCH₂Cp)HfPh₂, Rac/meso-Me₂Ph₂Si₂(3-Et₃SiCH₂Cp)(3-Cy₃SiCH₂Cp)HfPh₂, Rac/meso-Me₄Si₂(3-Cy₃SiCH₂Cp)(3-Me₂PhSiCH₂Cp)HfPh₂, Rac/meso-Et₄Si₂(3-Cy₃SiCH₂Cp)(3-Me₂PhSiCH₂Cp)HfPh₂, Rac/meso-ⁱPr₄Si₂(3-Cy₃SiCH₂Cp)(3-Me₂PhSiCH₂Cp)HfPh₂, Rac/meso-Ph₄Si₂(3-Cy₃SiCH₂Cp)(3-Me₂PhSiCH₂Cp)HfPh₂, Rac/meso-Me₂Ph₂Si₂(3-Cy₃SiCH₂Cp)(3-Me₂PhSiCH₂Cp)HfPh₂, Rac/meso-Me₄Si₂(3-Me₂PhSiCH₂Cp)(3-MePh₂SiCH₂Cp)HfPh₂, Rac/meso-Et₄Si₂(3-Me₂PhSiCH₂Cp)(3-MePh₂SiCH₂Cp)HfPh₂, Rac/meso-ⁱPr₄Si₂(3-Me₂PhSiCH₂Cp)(3-MePh₂SiCH₂Cp)HfPh₂, Rac/meso-Ph₄Si₂(3-Me₂PhSiCH₂Cp)(3-MePh₂SiCH₂Cp)HfPh₂, Rac/meso-Me₂Ph₂Si₂(3-Me₂PhSiCH₂Cp)(3-MePh₂SiCH₂Cp)HfPh₂, Rac/meso-Me₄Si₂(3-MePh₂SiCH₂Cp)(3-Ph₃SiCH₂Cp)HfPh₂, Rac/meso-Et₄Si₂(3-MePh₂SiCH₂Cp)(3-Ph₃SiCH₂Cp)HfPh₂, Rac/meso-ⁱPr₄Si₂(3-MePh₂SiCH₂Cp)(3-Ph₃SiCH₂Cp)HfPh₂, Rac/meso-Ph₄Si₂(3-MePh₂SiCH₂Cp)(3-Ph₃SiCH₂Cp)HfPh₂, Rac/meso-Me₂Ph₂Si₂(3-MePh₂SiCH₂Cp)(3-Ph₃SiCH₂Cp)HfPh₂, Rac/meso-Me₄Si₂(3-Ph₃SiCH₂Cp)₂HfPh₂, Rac/meso-Et₄Si₂(3-Ph₃SiCH₂Cp)₂HfPh₂, Rac/meso-ⁱPr₄Si₂(3-Ph₃SiCH₂Cp)₂HfPh₂, Rac/meso-Ph₄Si₂(3-Ph₃SiCH₂Cp)₂HfPh₂ and Rac/meso-Me₂Ph₂Si₂(3-Ph₃SiCH₂Cp)₂HfPh₂, Rac/meso-Me₄Si₂(3-Me₃SiCH₂Cp)₂HfBn₂, Rac/meso-Et₄Si₂(3-Me₃SiCH₂Cp)₂HfBn₂, Rac/meso-ⁱPr₄Si₂(3-Me₃SiCH₂Cp)₂HfBn₂, Rac/meso-Ph₄Si₂(3-Me₃SiCH₂Cp)₂HfBn₂, Rac/meso-Me₂Ph₂Si₂(3-Me₃SiCH₂Cp)₂HfBn₂, Rac/meso-Me₄Si₂(3-Et₃SiCH₂Cp)₂HfBn₂, Rac/meso-Et₄Si₂(3-Et₃SiCH₂Cp)₂HfBn₂, Rac/meso-ⁱPr₄Si₂(3-Et₃SiCH₂Cp)₂HfBn₂, Rac/meso-Ph₄Si₂(3-Et₃SiCH₂Cp)₂HfBn₂, Rac/meso-Me₂Ph₂Si₂(3-Et₃SiCH₂Cp)₂HfBn₂, Rac/meso-Me₄Si₂(3-Cy₃SiCH₂Cp)₂HfBn₂, Rac/meso-Et₄Si₂(3-Cy₃SiCH₂Cp)₂HfBn₂, Rac/meso-ⁱPr₄Si₂(3-Cy₃SiCH₂Cp)₂HfBn₂, Rac/meso-Ph₄Si₂(3-Cy₃SiCH₂Cp)₂HfBn₂, Rac/meso-Me₂Ph₂Si₂(3-Cy₃SiCH₂Cp)₂HfBn₂, Rac/meso-Me₄Si₂(3-Me₂PhSiCH₂Cp)₂HfBn₂, Rac/meso-Et₄Si₂(3-Me₂PhSiCH₂Cp)₂HfBn₂, Rac/meso-ⁱPr₄Si₂(3-Me₂PhSiCH₂Cp)₂HfBn₂, Rac/meso-Ph₄Si₂(3-Me₂PhSiCH₂Cp)₂HfBn₂, Rac/meso-Me₂Ph₂Si₂(3-Me₂PhSiCH₂Cp)₂HfBn₂, Rac/meso-Me₄Si₂(3-MePh₂SiCH₂Cp)₂HfBn₂, Rac/meso-Et₄Si₂(3-MePh₂SiCH₂Cp)₂HfBn₂, Rac/meso-ⁱPr₄Si₂(3-MePh₂SiCH₂Cp)₂HfBn₂, Rac/meso-Ph₄Si₂(3-MePh₂SiCH₂Cp)₂HfBn₂, Rac/meso-Me₂Ph₂Si₂(3-MePh₂SiCH₂Cp)₂HfBn₂, Rac/meso-Me₄Si₂(3-Ph₃SiCH₂Cp)₂HfBn₂, Rac/meso-Et₄Si₂(3-Ph₃SiCH₂Cp)₂HfBn₂, Rac/meso-ⁱPr₄Si₂(3-Ph₃SiCH₂Cp)₂HfBn₂, Rac/meso-Ph₄Si₂(3-Ph₃SiCH₂Cp)₂HfBn₂, Rac/meso-Me₂Ph₂Si₂(3-Ph₃SiCH₂Cp)₂HfBn₂, Me₄Si₂(2,3,4,5-Me₄Cp)(3-Me₃SiCH₂Cp)HfBn₂, Et₄Si₂(2,3,4,5-Me₄Cp)(3-Me₃SiCH₂Cp)HfBn₂, ⁱPr₄Si₂(2,3,4,5-Me₄Cp)(3-Me₃SiCH₂Cp)HfBn₂, Ph₄Si₂(2,3,4,5-Me₄Cp)(3-Me₃SiCH₂Cp)HfBn₂, Me₂Ph₂Si₂(2,3,4,5-Me₄Cp)(3-Me₃SiCH₂Cp)HfBn₂, Me₄Si₂(2,3,4,5-Me₄Cp)(3-Et₃SiCH₂Cp)HfBn₂, Et₄Si₂(2,3,4,5-Me₄Cp)(3-Et₃SiCH₂Cp)HfBn₂, ⁱPr₄Si₂(2,3,4,5-Me₄Cp)(3-Et₃SiCH₂Cp)HfBn₂, Ph₄Si₂(2,3,4,5-Me₄Cp)(3-Et₃SiCH₂Cp)HfBn₂, Me₂Ph₂Si₂(2,3,4,5-Me₄Cp)(3-Et₃SiCH₂Cp)HfBn₂, Me₄Si₂(2,3,4,5-Me₄Cp)(3-Cy₃SiCH₂Cp)HfBn₂, Et₄Si₂(2,3,4,5-Me₄Cp)(3-Cy₃SiCH₂Cp)HfBn₂, ⁱPr₄Si₂(2,3,4,5-Me₄Cp)(3-Cy₃SiCH₂Cp)HfBn₂, Ph₄Si₂(2,3,4,5-Me₄Cp)(3-Cy₃SiCH₂Cp)HfBn₂, Me₂Ph₂Si₂(2,3,4,5-Me₄Cp)(3-Cy₃SiCH₂Cp)HfBn₂, Me₄Si₂(2,3,4,5-Me₄Cp)(3-Me₂PhSiCH₂Cp)HfBn₂, Et₄Si₂(2,3,4,5-Me₄Cp)(3-Me₂PhSiCH₂Cp)HfBn₂, ⁱPr₄Si₂(2,3,4,5-Me₄Cp)(3-Me₂PhSiCH₂Cp)HfBn₂, Ph₄Si₂(2,3,4,5-Me₄Cp)(3-Me₂PhSiCH₂Cp)HfBn₂, Me₂Ph₂Si₂(2,3,4,5-Me₄Cp)(3-Me₂PhSiCH₂Cp)HfBn₂, Me₄Si₂(2,3,4,5-Me₄Cp)(3-MePh₂SiCH₂Cp)HfBn₂, Et₄Si₂(2,3,4,5-Me₄Cp)(3-MePh₂SiCH₂Cp)HfBn₂, ⁱPr₄Si₂(2,3,4,5-Me₄Cp)(3-MePh₂SiCH₂Cp)HfBn₂, Ph₄Si₂(2,3,4,5-Me₄Cp)(3-MePh₂SiCH₂Cp)HfBn₂, Me₂Ph₂Si₂(2,3,4,5-Me₄Cp)(3-MePh₂SiCH₂Cp)HfBn₂, Me₄Si₂(2,3,4,5-Me₄Cp)(3-Ph₃SiCH₂Cp)HfBn₂, Et₄Si₂(2,3,4,5-Me₄Cp)(3-Ph₃SiCH₂Cp)HfBn₂, ⁱPr₄Si₂(2,3,4,5-Me₄Cp)(3-Ph₃SiCH₂Cp)HfBn₂, Ph₄Si₂(2,3,4,5-Me₄Cp)(3-Ph₃SiCH₂Cp)HfBn₂, Me₂Ph₂Si₂(2,3,4,5-Me₄Cp)(3-Ph₃SiCH₂Cp)HfBn₂, Me₄Si₂(Cp)(3-Me₃SiCH₂Cp)HfBn₂, Et₄Si₂(Cp)(3-Me₃SiCH₂Cp)HfBn₂, ⁱPr₄Si₂(Cp)(3-Me₃SiCH₂Cp)HfBn₂, Ph₄Si₂(Cp)(3-Me₃SiCH₂Cp)HfBn₂, Me₂Ph₂Si₂(Cp)(3-Me₃SiCH₂Cp)HfBn₂, Me₄Si₂(Cp)(3-Et₃SiCH₂Cp)HfBn₂, Et₄Si₂(Cp)(3-Et₃SiCH₂Cp)HfBn₂, ⁱPr₄Si₂(Cp)(3-Et₃SiCH₂Cp)HfBn₂, Ph₄Si₂(Cp)(3-Et₃SiCH₂Cp)HfBn₂, Me₂Ph₂Si₂(Cp)(3-Et₃SiCH₂Cp)HfBn₂, Me₄Si₂(Cp)(3-Cy₃SiCH₂Cp)HfBn₂, Et₄Si₂(Cp)(3-Cy₃SiCH₂Cp)HfBn₂, ⁱPr₄Si₂(Cp)(3-Cy₃SiCH₂Cp)HfBn₂, Ph₄Si₂(Cp)(3-Cy₃SiCH₂Cp)HfBn₂, Me₂Ph₂Si₂(Cp)(3-Cy₃SiCH₂Cp)HfBn₂, Me₄Si₂(Cp)(3-Me₂PhSiCH₂Cp)HfBn₂, Et₄Si₂(Cp)(3-Me₂PhSiCH₂Cp)HfBn₂, ⁱPr₄Si₂(Cp)(3-Me₂PhSiCH₂Cp)HfBn₂, Ph₄Si₂(Cp)(3-Me₂PhSiCH₂Cp)HfBn₂, Me₂Ph₂Si₂(Cp)(3-Me₂PhSiCH₂Cp)HfBn₂, MePh₂SiCH₂Cp)HfBn₂, Me₄Si₂(Cp)(3-Ph₃SiCH₂Cp)HfBn₂, Et₄Si₂(Cp)(3-Ph₃SiCH₂Cp)HfBn₂, ⁱPr₄Si₂(Cp)(3-Ph₃SiCH₂Cp)HfBn₂, Ph₄Si₂(Cp)(3-Ph₃SiCH₂Cp)HfBn₂, Me₂Ph₂Si₂(Cp)(3-Ph₃SiCH₂Cp)HfBn₂, Rac/meso-Me₄Si₂(3-Me₃SiCH₂Cp)(3-Et₃SiCH₂Cp)HfBn₂, Rac/meso-Et₄Si₂(3-Me₃SiCH₂Cp)(3-Et₃SiCH₂Cp)HfBn₂, Rac/meso-ⁱPr₄Si₂(3-Me₃SiCH₂Cp)(3-Et₃SiCH₂Cp)HfBn₂, Rac/meso-Ph₄Si₂(3-Me₃SiCH₂Cp)(3-Et₃SiCH₂Cp)HfBn₂, Rac/meso-Me₂Ph₂Si₂(3-Me₃SiCH₂Cp)(3-Et₃SiCH₂Cp)HfBn₂, Rac/meso-Me₄Si₂(3-Et₃SiCH₂Cp)(3-Cy₃SiCH₂Cp)HfBn₂, Rac/meso-Et₄Si₂(3-Et₃SiCH₂Cp)(3-Cy₃SiCH₂Cp)HfBn₂, Rac/meso-ⁱPr₄Si₂(3-Et₃SiCH₂Cp)(3-Cy₃SiCH₂Cp)HfBn₂, Rac/meso-Ph₄Si₂(3-Et₃SiCH₂Cp)(3-Cy₃SiCH₂Cp)HfBn₂, Rac/meso-Me₂Ph₂Si₂(3-Et₃SiCH₂Cp)(3-Cy₃SiCH₂Cp)HfBn₂, Rac/meso-Me₄Si₂(3-Cy₃SiCH₂Cp)(3-Me₂PhSiCH₂Cp)HfBn₂, Rac/meso-Et₄Si₂(3-Cy₃SiCH₂Cp)(3-Me₂PhSiCH₂Cp)HfBn₂, Rac/meso-ⁱPr₄Si₂(3-Cy₃SiCH₂Cp)(3-Me₂PhSiCH₂Cp)HfBn₂, Rac/meso-Ph₄Si₂(3-Cy₃SiCH₂Cp)(3-Me₂PhSiCH₂Cp)HfBn₂, Rac/ meso-Me$_2$Ph$_2$Si$_2$(3-Cy$_3$SiCH$_2$Cp)(3-Me$_2$PhSiCH$_2$Cp)HfBn$_2$, Rac/meso-Me$_4$Si$_2$(3-Me$_2$PhSiCH$_2$Cp)(3-MePh$_2$SiCH$_2$Cp)HfBn$_2$, Rac/meso-Et$_4$Si$_2$(3-Me$_2$PhSiCH$_2$Cp)(3-MePh$_2$SiCH$_2$Cp)HfBn$_2$, Rac/meso-$^i$Pr$_4$Si$_2$(3-Me$_2$PhSiCH$_2$Cp)(3-MePh$_2$SiCH$_2$Cp)HfBn$_2$, Rac/meso-Ph$_4$Si$_2$(3-Me$_2$PhSiCH$_2$Cp)(3-MePh$_2$SiCH$_2$Cp)HfBn$_2$, Rac/meso-Me$_2$Ph$_2$Si$_2$(3-Me$_2$PhSiCH$_2$Cp)(3-MePh$_2$SiCH$_2$Cp)HfBn$_2$, Rac/meso-Me$_4$Si$_2$(3-MePh$_2$SiCH$_2$Cp)(3-Ph$_3$SiCH$_2$Cp)HfBn$_2$, Rac/meso-Et$_4$Si$_2$(3-MePh$_2$SiCH$_2$Cp)(3-Ph$_3$SiCH$_2$Cp)HfBn$_2$, Rac/meso-$^i$Pr$_4$Si$_2$(3-MePh$_2$SiCH$_2$Cp)(3-Ph$_3$SiCH$_2$Cp)HfBn$_2$, Rac/meso-Ph$_4$Si$_2$(3-MePh$_2$SiCH$_2$Cp)(3-Ph$_3$SiCH$_2$Cp)HfBn$_2$, Rac/meso-Me$_2$Ph$_2$Si$_2$(3-MePh$_2$SiCH$_2$Cp)(3-Ph$_3$SiCH$_2$Cp)HfBn$_2$, Rac/meso-Me$_4$Si$_2$(3-Ph$_3$SiCH$_2$Cp)$_2$HfBn$_2$, Rac/meso-Et$_4$Si$_2$(3-Ph$_3$SiCH$_2$Cp)$_2$HfBn$_2$, Rac/meso-$^i$Pr$_4$Si$_2$(3-Ph$_3$SiCH$_2$Cp)$_2$HfBn$_2$, Rac/meso-Ph$_4$Si$_2$(3-Ph$_3$SiCH$_2$Cp)$_2$HfBn$_2$ and Rac/meso-Me$_2$Ph$_2$Si$_2$(3-Ph$_3$SiCH$_2$Cp)$_2$HfBn$_2$.

18. The catalyst compound of claim 1, wherein the catalyst compound is compound 1 or compound 2:

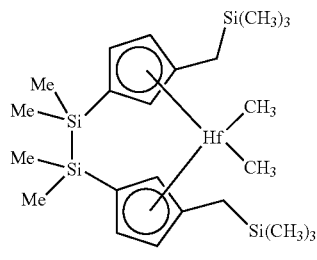

1

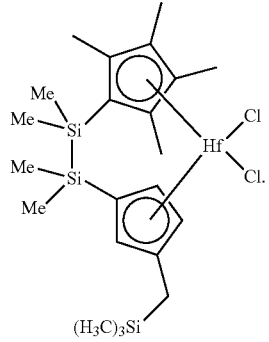

2

19. A catalyst system comprising an activator and the catalyst compound of claim 1.

20. The catalyst system of claim 19, further comprising a support material.

21. The catalyst system of claim 20, wherein the support material is selected from Al$_2$O$_3$, ZrO$_2$, SiO$_2$, SiO$_2$/Al$_2$O$_3$, SiO$_2$/TiO$_2$, silica clay, silicon oxide/clay, or mixtures thereof.

22. The catalyst system of any of claim 19, wherein the activator comprises an alkylalumoxane.

23. A process for the production of an ethylene alpha-olefin copolymer comprising: polymerizing ethylene and at least one C$_3$-C$_{20}$ alpha-olefin by contacting the ethylene and the at least one C$_3$-C$_{20}$ alpha-olefin with a catalyst system of claim 19 in at least one gas phase reactor at a reactor pressure of from 0.7 to 70 bar and a reactor temperature of from 20° C. to 150° C. to form an ethylene alpha-olefin copolymer.

24. The process of claim 23, wherein the catalyst system has an activity from 100,000 gP/mmolCat/hour to 1,500,000 gP/mmolCat/hour.

25. The process of claim 23, wherein the catalyst system has a productivity from 10,000 gPgcat$^{-1}$hr$^{-1}$ to 50,000 gPgcat$^{-1}$hr$^{-1}$.

26. The process of claim 24, wherein the catalyst system has a productivity from 15,000 gPgcat$^{-1}$ hr$^{-1}$ to 25,000 gPgcat$^{-1}$hr$^{-1}$.

27. A process for the production of an ethylene alpha-olefin copolymer comprising: polymerizing ethylene and at least one C$_3$-C$_{20}$ alpha-olefin by contacting the ethylene and the at least one C$_3$-C$_{20}$ alpha-olefin with a catalyst system of claim 20 in at least one slurry phase reactor at a reactor pressure of from 0.7 to 70 bar and a reactor temperature of from 20° C. to 150° C. to form an ethylene alpha-olefin copolymer.

28. The process of claim 27, wherein the catalyst system has an activity from 100,000 gP/mmolCat/hour to 1,500,000 gP/mmolCat/hour.

29. The process of claim 27, wherein the catalyst system has a productivity from 10,000 gPgcat$^{-1}$hr$^{-1}$ to 50,000 gPgcat$^{-1}$hr$^{-1}$.

30. The process of claim 29, wherein the catalyst system has a productivity from 15,000 gPgcat$^{-1}$hr$^{-1}$ to 25,000 gPgcat$^{-1}$hr$^{-1}$.

31. An ethylene alpha-olefin copolymer obtained by contacting ethylene, at least one C$_3$-C$_{20}$ alpha-olefin, and a catalyst system of claim 20 in at least one gas-phase reactor, wherein the copolymer has a Mw value of from 50,000 to 120,000, a Mn value of from 20,000 to 40,000, a Mw/Mn value of from 1 to 5, a Mz value of from 150,000 to 250,000, a comonomer content of from 7 wt % to 12 wt %, and a g'vis value of 0.97 or greater.

32. The ethylene alpha-olefin copolymer of claim 31, wherein the copolymer has a broad orthogonal composition distribution.

33. A catalyst system comprising an activator and the catalyst compound of claim 1, wherein M is hafnium, each of T$^1$ and T$^2$ is Si, each of R$^9$, R$^{10}$, R$^{11}$, and R$^{12}$ is independently a C$_1$-C$_{20}$ hydrocarbyl, at least one of R$^1$, R$^2$, R$^3$, and R$^4$ is independently C$_1$ to C$_{40}$ substituted or unsubstituted hydrocarbyl or —R$^{13}$—SiR'$_3$ where R$^{13}$ is C$_1$ to C$_4$ hydrocarbylene, and each R' is independently C$_1$ to C$_{20}$ substituted or unsubstituted hydrocarbyl.

34. The catalyst system of claim 33, further comprising a support material.

35. The catalyst system of claim 33, further comprising a support material selected from Al$_2$O$_3$, ZrO$_2$, SiO$_2$, SiO$_2$/Al$_2$O$_3$, SiO$_2$/TiO$_2$, silica clay, silicon oxide/clay, or mixtures thereof.

36. The catalyst system of any of claim 35, wherein the activator comprises an alkylalumoxane.

37. A process for the production of an ethylene alpha-olefin copolymer comprising: polymerizing ethylene and at least one C$_3$-C$_{20}$ alpha-olefin by contacting the ethylene and the at least one C$_3$-C$_{20}$ alpha-olefin with a catalyst system of claim 33 in at least one gas phase reactor at a reactor pressure of from 0.7 to 70 bar and a reactor temperature of from 20° C. to 150° C. to form an ethylene alpha-olefin copolymer.

38. The process of claim 37, wherein the catalyst system has an activity from 100,000 gP/mmolCat/hour to 1,500,000 gP/mmolCat/hour and/or a productivity from 10,000 gPgcat$^{-1}$hr$^{-1}$ to 50,000 gPgcat$^{-1}$hr$^{-1}$.

39. A process for the production of an ethylene alpha-olefin copolymer comprising: polymerizing ethylene and at least one C$_3$-C$_{20}$ alpha-olefin by contacting the ethylene and the at least one C$_3$-C$_{20}$ alpha-olefin with a catalyst system of claim 33 in at least one slurry phase reactor at a reactor pressure of from 0.7 to 70 bar and a reactor temperature of from 20° C. to 150° C. to form an ethylene alpha-olefin copolymer.

40. The process of claim 39, wherein the catalyst system has an activity from 100,000 gP/mmolCat/hour to 1,500,000 gP/mmolCat/hour and/or a productivity from 10,000 gPgcat$^{-1}$hr$^{-1}$ to 50,000 gPgcat$^{-1}$hr$^{-1}$.

41. A catalyst system comprising an activator and the catalyst compound of claim 17.

42. The catalyst system of claim 41, further comprising a support material selected from $Al_2O_3$, $ZrO_2$, $SiO_2$, $SiO_2/Al_2O_3$, $SiO_2/TiO_2$, silica clay, silicon oxide/clay, or mixtures thereof.

43. The catalyst system of any of claim 41, wherein the activator comprises an alkylalumoxane.

44. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of claim 41 in at least one gas phase reactor at a reactor pressure of from 0.7 to 70 bar and a reactor temperature of from 20° C. to 150° C. to form an ethylene alpha-olefin copolymer.

45. The process of claim 44, wherein the catalyst system has an activity from 100,000 gP/mmolCat/hour to 1,500,000 gP/mmolCat/hour and/or a productivity from 10,000 gPgcat$^{-1}$hr$^{-1}$ to 50,000 gPgcat$^{-1}$hr$^{-1}$.

46. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of claim 41 in at least one slurry phase reactor at a reactor pressure of from 0.7 to 70 bar and a reactor temperature of from 20° C. to 150° C. to form an ethylene alpha-olefin copolymer.

47. The process of claim 46, wherein the catalyst system has an activity from 100,000 gP/mmolCat/hour to 1,500,000 gP/mmolCat/hour and/or a productivity from 10,000 gPgcat$^{-1}$hr$^{-1}$ to 50,000 gPgcat$^{-1}$hr$^{-1}$.

* * * * *